United States Patent
Brown et al.

(10) Patent No.: US 12,441,777 B2
(45) Date of Patent: Oct. 14, 2025

(54) GLP-1 RECEPTOR ANTAGONISTS

(71) Applicant: NXERA PHARMA UK LIMITED, Cambridge (GB)

(72) Inventors: Giles Albert Brown, Cambridge (GB); Miles Stuart Congreve, Cambridge (GB); Conor Scully, Cambridge (GB)

(73) Assignee: Nxera Pharma UK Limited, Cambridge (GB)

( * ) Notice: Subject to any disclaimer, the term of this patent is extended or adjusted under 35 U.S.C. 154(b) by 189 days.

(21) Appl. No.: 17/284,351

(22) PCT Filed: Oct. 14, 2019

(86) PCT No.: PCT/GB2019/052915
§ 371 (c)(1),
(2) Date: Apr. 9, 2021

(87) PCT Pub. No.: WO2020/074927
PCT Pub. Date: Apr. 16, 2020

(65) Prior Publication Data
US 2021/0355186 A1    Nov. 18, 2021

(30) Foreign Application Priority Data
Oct. 12, 2018 (GB) ..................... 1816639

(51) Int. Cl.
C07K 14/605  (2006.01)
A61K 38/00   (2006.01)

(52) U.S. Cl.
CPC .......... C07K 14/605 (2013.01); *A61K 38/00* (2013.01)

(58) Field of Classification Search
None
See application file for complete search history.

(56) References Cited

U.S. PATENT DOCUMENTS

| | | | |
|---|---|---|---|
| 2006/0069029 A1 | 3/2006 | Kolterman et al. | |
| 2010/0009904 A1 | 1/2010 | Lv et al. | |
| 2012/0087863 A1* | 4/2012 | Saji | A61K 51/08 424/9.1 |

FOREIGN PATENT DOCUMENTS

| | | | |
|---|---|---|---|
| CN | 102532301 A | 7/2012 | |
| EP | 2335739 A1 | 6/2011 | |
| EP | 2423223 A1 | 2/2012 | |
| EP | 2474326 A1 * | 7/2012 | ........... A61K 51/088 |
| JP | 2008-526899 A | 7/2008 | |
| WO | 2007/139941 A2 | 12/2007 | |
| WO | 2010/120476 A2 | 10/2010 | |

OTHER PUBLICATIONS

Hou et al., Long-term treatment with EXf, a peptide analog of Exendin-4, improves β-cell function and survival in diabetic KKAy mice. Peptides. Feb. 2013;40:123-32.
Kimura et al., Development of 111In-labeled exendin(9-39) derivatives for single-photon emission computed tomography imaging of insulinoma. Bioorg Med Chem. Feb. 15, 2017;25(4):1406-1412.
Kimura et al., Evaluation of 18F-labeled exendin(9-39) derivatives targeting glucagon-like peptide-1 receptor for pancreatic beta-cell imaging. Bioorg Med Chem. Jan. 15, 2018;26(2):463-469.
Montrose-Rafizadeh et al., High potency antagonists of the pancreatic glucagon-like peptide-1 receptor. J Biol Chem. Aug. 22, 1997;272(34):21201-6.
Runge et al., Differential structural properties of GLP-1 and exendin-4 determine their relative affinity for the GLP-1 receptor N-terminal extracellular domain. Biochemistry. May 15, 2007;46(19):5830-40.
Song et al., Biological activity of EXf, a peptide analogue of exendin-4. Eur J Pharmacol. Feb. 25, 2010;628 (1-3):261-7.
Great Britain Search Report for Application No. GB1816639.7, dated Apr. 10, 2019, 4 pages.
International Search Report and Written Opinion for Application No. PCT/GB2019/052915, dated Nov. 20, 2020, 20 pages.
Meurer et al., Properties of native and in vitro glycosylated forms of the glucagon-like peptide-1 receptor antagonist exendin(9-39). Metabolism. Jun. 1999;48(6):716-24.

\* cited by examiner

*Primary Examiner* — Melissa L Fisher
*Assistant Examiner* — Joseph Fischer
(74) *Attorney, Agent, or Firm* — Barnes & Thornburg; Amy H. Fix

(57) ABSTRACT

The disclosures herein relate to novel compounds of formula (1): and salts thereof, wherein $R^1$, $AA^1$, AA2, LysR, X and Y are defined herein, and their use in treating, preventing, ameliorating, controlling or reducing the risk of disorders associated with Glucagon-like peptide-1 (GLP-1) receptors.

(1)

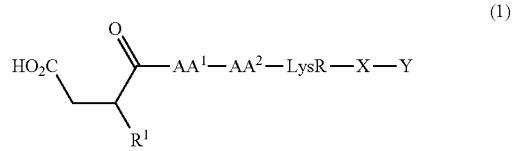

Figure 1:
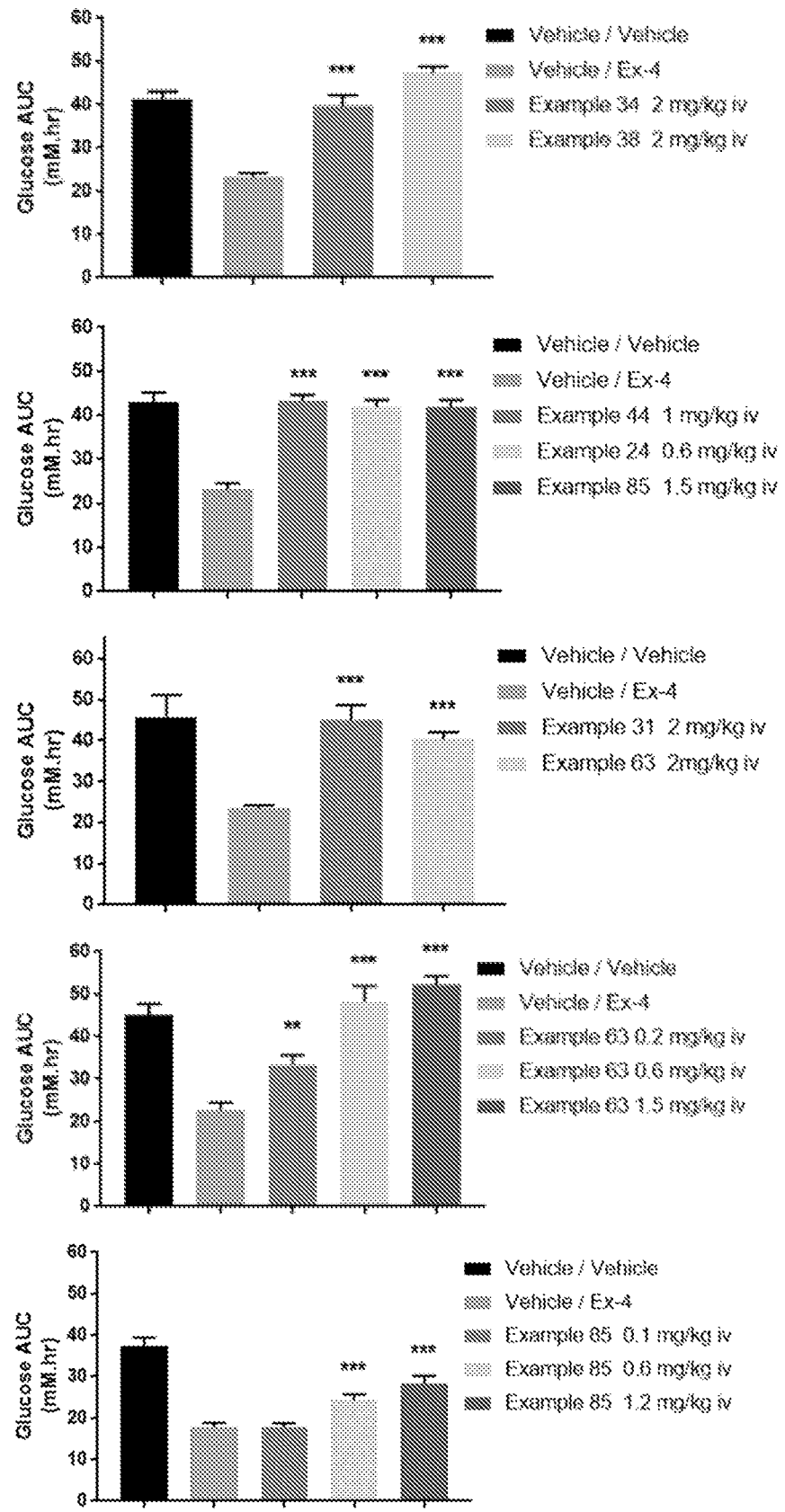

17 Claims, 2 Drawing Sheets
Specification includes a Sequence Listing.

SEQUENCE LISTING

<160> NUMBER OF SEQ ID NOS: 2

<210> SEQ ID NO 1
<211> LENGTH: 17
<212> TYPE: PRT
<213> ORGANISM: Artificial Sequence
<220> FEATURE:
<223> OTHER INFORMATION: synthetic construct
<220> FEATURE:
<221> NAME/KEY: VARIANT
<222> LOCATION: (2)..(2)
<223> OTHER INFORMATION: replace Met or Nle
<220> FEATURE:
<221> NAME/KEY: VARIANT
<222> LOCATION: (4)..(4)
<223> OTHER INFORMATION: replace="Glu" or "Gln"

```
<220> FEATURE:
<221> NAME/KEY: VARIANT
<222> LOCATION: (6)..(6)
<223> OTHER INFORMATION: replace="Ser" or "Ala"
<220> FEATURE:
<221> NAME/KEY: VARIANT
<222> LOCATION: (8)..(8)
<223> OTHER INFORMATION: replace="Arg" or "DArg"
<220> FEATURE:
<221> NAME/KEY: VARIANT
<222> LOCATION: (11)..(11)
<223> OTHER INFORMATION: replace= "X" with "-NHCHR5CO" where R5 is a
      C1-C6 alkyl group.
<220> FEATURE:
<221> NAME/KEY: VARIANT
<222> LOCATION: (16)..(16)
<223> OTHER INFORMATION: replace= "Gly" or "Ser" or "DAla" or "beta-
      alanine"
<220> FEATURE:
<221> NAME/KEY: misc_feature
<222> LOCATION: (17)..(17)
<223> OTHER INFORMATION: Xaa can be any naturally occurring amino acid

<400> SEQUENCE: 1

Gln Xaa Glu Xaa Glu Xaa Val Xaa Leu Phe Xaa Glu Trp Leu Lys Asn
1               5                   10                  15

Xaa

<210> SEQ ID NO 2
<211> LENGTH: 31
<212> TYPE: PRT
<213> ORGANISM: Artificial Sequence
<220> FEATURE:
<223> OTHER INFORMATION: synthetic construct
<220> FEATURE:
<221> NAME/KEY: VARIANT
<222> LOCATION: (4)..(4)
<223> OTHER INFORMATION: This X can be a Lys with no modification or a
      Lys with a single structure extending from the epsilon amino group
      of the lysine at position 4, first a gamma-Glu, then bonded to
      this 2xOEG C18 diacid.

<400> SEQUENCE: 2

Asp Leu Ser Xaa Gln Met Glu Glu Glu Ala Val Arg Leu Phe Ile Glu
1               5                   10                  15

Trp Leu Lys Asn Gly Gly Pro Ser Ser Gly Ala Pro Pro Pro Ser
                20                  25                  30
```

GLP-1 RECEPTOR ANTAGONISTS

CROSS-REFERENCE TO RELATED APPLICATIONS

This application is a 35 U.S.C. § 371 national stage filing of International Application No. PCT/GB2019/052915, filed on Oct. 14, 2019, which claims priority to United Kingdom Application No. 1816639.7, filed on Oct. 12, 2018, the entire contents of each of which are incorporated herein by reference.

STATEMENT REGARDING SEQUENCE LISTING

The Sequence Listing associated with this application is provided in text format in lieu of paper copy, and is hereby incorporated by reference into the specification. The name of the text file containing the Sequence Listing is "2025-03-04 17284351 20250224 ST25." The text file is 1.7 KB, was created on Feb. 24, 2025, and is submitted electronically via Patent Center.

This invention relates to a class of novel peptide compounds, their salts, pharmaceutical compositions containing them and their use in therapy of the human body. In particular, the invention is directed to a class of compounds which are antagonists of Glucagon-like peptide (GLP) receptors. More particularly, the invention is directed to compounds that are antagonists of the Glucagon-like peptide-1 (GLP-1) receptor. The invention also relates to the manufacture and use of these compounds and compositions in the prevention or treatment of such diseases in which GLP receptors are involved.

BACKGROUND OF THE INVENTION

The gastrointestinal hormone, glucagon-like peptide-1 (GLP-1) is released post-prandially (after a meal) from the L-cells of the gut and exerts a direct and potent glucose-dependent insulinotropic effect on the pancreatic b-cell.

GLP-1 is synthesised by posttranslational processing of proglucagon in the intestine. Cleavage of proglucagon by prohormone convertase 1/3 expressed only in the intestinal L-cells releases the incretin peptides GLP-1 and GLP-2. Secreted GLP-1 is rapidly degraded by the ubiquitous enzyme dipeptidyl peptides IV, resulting in an extremely short half-life for GLP-1 of ~2 min.

GLP-1 acts via a specific receptor, glucagon-like peptide-1 receptor (GLP-1R), which belongs to the ClassB G protein-coupled receptor family. The GLP-1 receptor is widely distributed in pancreatic islets, brain, heart, kidney and the gastrointestinal tract. Binding of GLP-1 to its cognate receptor causes activation via the stimulatory G-protein Gas to activate adenylate cyclase resulting in the formation of intracellular cAMP levels, membrane depolarisation, elevation of intracellular calcium concentrations and enhanced exocytosis of insulin-containing granules located in the pancreatic b-cell. GLP-1 mediated sustained elevation of cAMP concentrations also stimulates pancreatic b-cell proliferation and enhances the differentiation of new beta cells from progenitor cells in the pancreatic duct epithelium.

GLP-1 also directly influences secretion of other hormones critical for control of plasma glucose. The pancreatic a-cell is under tonic inhibitory control of GLP-1 which strongly suppresses glucagon secretion through a paracrine action of somatostatin. Inhibition of glucagon via GLP-1 activity results in reduced hepatic production of glucose contributing to the overall GLP-1 effects on controlling postprandial glucose excursions.

In summary GLP-1 has been demonstrated to have profound antidiabetic effects through increased pancreatic glucose-stimulated insulin secretion resulting in increased glucose uptake in peripheral tissues. GLP-1 also plays key roles in inhibition of gastric emptying and antroduodenal motility, decrease satiety and food intake and weight loss.

The significant effects of GLP-1 described above have led to the hypothesis that clinical indications associated with exaggerated plasma concentrations of GLP-1, increased GLP-1 signalling and/or increased GLP-1R levels would result in hyperinsulinemia (excessive glucose-dependent insulin secretion) resulting on hypoglycaemia and evidence of gastrointestinal dysfunction. Therefore conditions such as hyperinsulinemia and hypoglycaemia could be treated by blocking/antagonising activation of the GLP-1R.

The specific GLP-1 receptor antagonist exendin(9-39) amide [Ex(9-39)] was initially isolated from the venom of the lizard *Heloderma suspectum* and shares a degree of sequence homology with GLP-1. Ex(9-39) is a selective, competitive peptide antagonist of the GLP-1 receptor that blocks GLP-1 mediated insulin secretion in vitro and in vivo and impairs glucose tolerance in response to endogenous and exogenous administration of GLP-1 in humans and rodent models. Ex(9-39) also inhibits insulin secretion in the absence of increased GLP-1 levels suggesting that Ex(9-39) is an inverse agonist of the GLP-1 receptor. These data suggest that the presence of the GLP-1 receptor alone is important for maintaining the glucose-competent status of pancreatic p-cells.

The influences of GLP-1 on islet p-cells are profound. GLP-1 promotes insulin release, the expression of proinsulin, insulin biosynthesis and mRNA stability. GLP-1 will also trigger somatostatin secretion from islet δ-cells and suppress glucagon secretion from islet α-cells. Glucagons' effects oppose that of insulin raising the concentration of glucose in the bloodstream via effects directly on the liver increasing glycogenolysis and gluconeogenesis. This suggests that blocking the GLP-1 system will not only have direct effects on insulin secretion but will also release the suppression on glucagon secretion driving increased glucose production by the liver.

Under healthy conditions the insulin-secreting actions of GLP-1 are normally highly glucose-dependent such that excessive GLP-1 secretion or sensitivity will not lead to hypoglycaemia. However clinical studies using administration of GLP-1 in the presence of a non glucose-dependent insulin secretagogue (e.g. a sulphonylurea that acts on the KATP channel) or even directly infusing supraphysiological levels of GLP-1 into normal subjects is associated with an increased risk of hypoglycaemia.

Hypoglycemia not associated with diabetes is an uncommon clinical disorder. It is usually diagnosed when venous plasma glucose is <55 mg/ml and supported by the presence of Whipple's triad. The subject of this application, a GLP-1R antagonists would have potential to treat a range of conditions associated with exaggerated plasma concentrations of GLP-1, increased GLP-1 signalling and/or increased GLP-1R levels resulting in hyperinsulinemia and/or hypoglycaemia and/or evidence of gastrointestinal dysfunction. These conditions would include both symptomatic treatment of hypoglycaemia, and, based on effects of GLP-1 on cell growth and differentiation, include the potential to influence the course of disease progression.

No new medicines have gained regulatory approval for the treatment of hyperinsulinemia hypoglycaemia (HH) in more than 20 years and there are significant short-comings associated with all current treatments. This has created a significant unmet medical need that spans from rare disease indications, to short-term requirements in approximately 10% of term admissions to neonatal units through to 0.2-1% of adults undergoing gastric bypass surgery. The validity of specifically targeting this mechanism has recently been clinically validated using the GLP-1 receptor antagonist peptide Ex9-39 in two distinct clinical populations.

Congenital hyperinsulinism (CHI) represents the most frequent cause of severe, persistent HH in newborn babies and children occurring in the UK in approximately 1/40,000 live births. The potential benefits of GLP-1R antagonists in CHI were demonstrated in rodent models of hyperinsulinism. These findings have been extended to testing Ex9-39 in human adult subjects with CHI owing to inactivating mutations in the KATP channel. The introduction of GLP-1 receptor antagonist treatment is predicted to relieve the pressure to perform irreversible pancreatectomy for many CHI patients. This will include patients with CHI in which there is growing evidence that GLP-1 hypersecretion is the underlying cause of inappropriate insulin release. GLP-1 antagonist treatment is predicted to have a sustained response profile, be effective in all patients and could be continued in adults without the need for dose titration or the adjustment for drug interactions resulting from the introduction of other pharmacological treatments.

Post bariatric surgery hypoglycaemia (PBHS). Gastric bypass surgery is being used increasingly in the treatment of morbidly obese type 2 diabetics and has been demonstrated to profoundly increase the levels of GLP-1 secretion. In a relatively small but clinically important number of patients this treatment can lead to a profound post-prandial hyperinsulinaemic hypoglycaemic state that can emerge after surgery with glucose concentrations low enough (20-40 mg/dL) to cause seizures, altered mental status, loss of consciousness, cognitive dysfunction, disability, and death. There is no effective treatment for those patients exhibiting severe symptoms. The present invention provides a therapeutic intervention opportunity that can largely protect them should they suffer from post-bariatric hyperinsulinemia. Recently Salehi and colleagues have reported that this severe post-prandial hypoglycaemia in gastric bypass patients can be corrected by infusion of the GLP-1 antagonist Ex(9-39) consistent with a fundamental role for GLP-1 and its receptor in this mechanism.

The unmet medical need for the symptomatic treatment of hypoglycaemia extends beyond CHI and PBSH. Hyperinsulinism-induced hypoglycaemia encompasses a number of heterogeneous disorders principally characterised by the dysregulation of insulin secretion and resulting hypoglycaemia from pancreatic β-cells that may be effectively treated with a GLP1-R antagonist. These include but are not limited to indications of hypoglycaemia in children (e.g. neonatal hypoglycaemia, hypoglycaemia secondary to gastrostomy insertion, post prandial hypoglycaemia of uncertain aetiology) and adults (e.g. insulinomas, gastric bypass surgery-induced hypoglycaemia).

Transient unexplained hypoglycemia is one of the most common and important healthcare problems encountered in neonatology. In the UK, internal audits in our treatment centers suggest that approximately 10% of term baby admissions to neonatal units are solely due to hypoglycaemia with unknown causes. Given a live birth number of 800,000 in 2012, this suggests an incidence of ~8,000 new cases per year. A similar figure can also be derived from a USA-based study of neonatal hypoglycaemia in babies with extreme weights. A safe and effective treatment such as described in this invention would provide potential therapeutic benefit in this patient population.

Hyperinsulinemia and/or hypoglycaemia is observed in a subset of 'dumping syndrome' patients (e.g. as a complication of gastric bypass surgery and surgical procedures such as gastric/oesophageal surgery) that exhibit a very rapid gastric emptying and an exaggerated release of insulin and current hypotheses suggest a link between the rapid postprandial glucose flux, GLP-1 secretion and hyperinsulinemia.

Tumour induced hypoglycaemia (TH) is a rare clinical condition that may occur as a result of eutopic insulin secretion by a pancreatic islet b-cell tumour (insulinoma) or ectopic tumour insulin secretion by a non-islet-cell tumour (examples include, but are not limited to, bronchial carcinoids and gastrointestinal stroma tumours). Insulinoma is a rare tumour with an incidence of ~0.4/100,000 person-years and are usually small, sporadic intrapancreatic benign tumours.

Finally clinical data using the antagonist Ex(9-39) has consistently demonstrated the ability to block the consequences of raised GLP-1 levels and insulin levels. Other embodiments of this invention include the treatment of unexplained symptomatic hyperinsulinemia and/or associated hypoglycaemia in a range of conditions such as hypoglycemia due to hyperinsulinism associated with leucine sensitivity, hypoglycemia due to hyperinsulinism associated with non-malignant insulinomas, inoperable islet cell adenoma or carcinoma, or extrapancreatic malignancy, hyperinsulinmia and hypoglycaemia in polycystic ovary syndrome, sulphonylurea-induced toxicity in T2DM, Prader-Willi syndrome, Adrenal Insufficiency and Addison's Disease, Beckwith-Wiedemann syndrome, Soto's Syndrome, Costello Syndrome, Timothy Syndrome, Kabuki Syndrome, Congenital Disorders of Glycosylation, Late dumping syndrome, Reactive hypoglycaemia infants of diabetic mothers, Trisomy 13, Central hypoventilation syndrome, Leprechaunism (insulin resistance syndrome), Mosaic Turner Syndrome, Usher Syndrome, Non-insulinoma pancreatogenous hypoglycaemia, Factitious hypoglycaemia, Insulin gene receptor mutations, Insulin autoimmune syndrome, Non-islet cells tumor hypoglycemia (NICTH) and withdrawal from alcoholic and other addictive substances.

SUMMARY OF THE INVENTION

The present invention relates to novel compounds with antagonist activity at the GLP-1 receptor, pharmaceutical compositions comprising these, and use of the compounds for the manufacture of medicaments for treatment of diseases.

Accordingly, in one embodiment the invention provides a compound of the formula (1):

A compound comprising a sequence of formula (1):

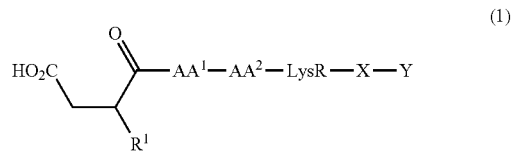

(1)

wherein;

$R^1$ is H, $NHR^2$ or $CH_2R^2$; where $R^2$ is selected from: H, $C_{1-6}$ alkyl, $(CH_2)_n$aryl and $(CH_2)_n$heteroaryl; where n is 1 to 6;

$AA^1$ is -Leu- or -Nle-;

$AA^2$ is —$NHCR^{3a}R^{3b}CO$—; wherein $R^{3a}$ is hydrogen or a $C_{1-3}$ alkyl group, or is joined to $R^{3b}$ to form a 3-6 membered ring optionally containing one or more heteroatoms selected from N and O; and $R^{3b}$ is $C_{1-6}$ alkyl, $(CH_2)_n$aryl, $(CH_2)_n$OH or $(CH_2)_n$OR$^4$, or is joined to $R^{3a}$ to form a 3-6 membered ring optionally containing one or more heteroatoms selected from N and O; where $R^4$ is $C_{1-6}$ alkyl and n is 1 to 6;

LysR is an optionally N-substituted substituted Lysine residue;

X is a sequence: -Gln-$AA^3$-Glu-$AA^4$-Glu-$AA^5$-Val-$AA^6$-Leu-Phe-$AA^7$-Glu-Trp-Leu-Lys-Asn-$AA^8$-(SEQ ID NO: 1);

wherein $AA^3$ is -Met- or -Nle-; where when $AA^3$ is -Met-, LysR is an N-substituted lysine residue;

$AA^4$ is -Glu- or -Gln-;

$AA^5$ is -Ser- or -Ala-;

$AA^6$ is -Arg- or -DArg-;

$AA^7$ is a group —$NHCHR^5CO$—; where $R^5$ is a $C_{1-6}$ alkyl group;

$AA^8$ is -Gly-, -Ser-, -DAla- or -βAla-;

Y is absent or is a sequence -$AA^9$-$AA^{10}$-$AA^{11}$-$AA^{12}$-$AA^{13}$-$AA^{14}$-$AA^{15}$-$AA^{16}$-$AA^{17}$-$AA^{18}$-$AA^{19}$- wherein $AA^9$ is -Gly- or -Ser-;

$AA^{10}$ is -Pro- or -Ser-;

$AA^{11}$ is -Ser-, -DSer- or -Lys-;

$AA^{12}$ is -Ser-, -DSer-, -Lys- or -Phe-;

$AA^{13}$ is absent or is -Ser-, -DSer-, -Gly-, -Glu- or -Lys-;

$AA^{14}$ is absent or is -Ser-, -DSer-, -Ala-, -Lys- or -Tyr-;

$AA^{15}$ is absent or is -Ser-, -DSer-, -Pro-, -Glu- or -Lys-;

$AA^{16}$ is absent or is -Ser-, -DSer-, -Pro-, -Lys- or -LysR-;

$AA^{17}$ is absent or is -Pro- or -Glu-;

$AA^{18}$ is absent or is -Ser- or -Tyr-;

$AA^{19}$ is absent or is -Glu-;

wherein the X or Y C-terminus is a carboxyl group or a carboxamide group, or is adjoined to any natural or non-natural amino acid sequence or any other moiety, functional group or groups;

or a tautomeric or stereochemically isomeric form thereof or a prodrug, salt or zwitterion thereof.

Particular compounds also include compounds of formula (1a):

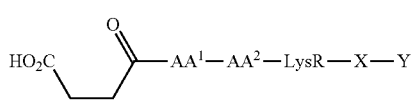

(1a)

or a tautomeric or stereochemically isomeric form thereof or a prodrug, salt or zwitterion thereof, wherein $AA^1$, $AA^2$, LysR, X and Y are as defined above.

Particular compounds also include compounds of formula (1 b):

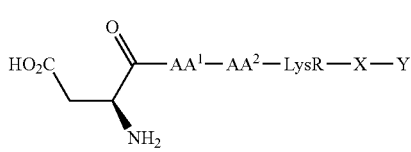

(1b)

or a tautomeric or stereochemically isomeric form thereof or a prodrug, salt or zwitterion thereof, wherein $AA^1$, $AA^2$, LysR, X and Y are as defined above.

Particular compounds also include compounds of formula (1c):

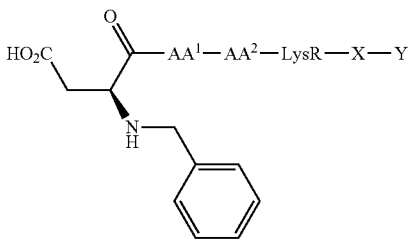

(1c)

or a tautomeric or stereochemically isomeric form thereof or a prodrug, salt or zwitterion thereof, wherein $AA^1$, $AA^2$, LysR, X and Y are as defined above.

Particular compounds also include compounds of formula (1d):

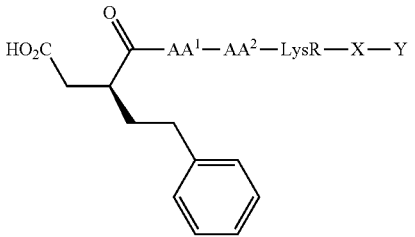

(1d)

or a tautomeric or stereochemically isomeric form thereof or a prodrug, salt or zwitterion thereof, wherein $AA^1$, $AA^2$, LysR, X and Y are as defined above.

The compounds herein may be used as antagonists of the Glucagon-like peptide-1 (GLP-1) receptor. The compounds may be used in the manufacture of medicaments. The compounds or medicaments may be for use in treating, preventing, ameliorating, controlling or reducing the risk of disorders associated with GLP-1 receptors including unexplained symptomatic hyperinsulinemia and/or associated hypoglycaemia in a range of conditions such as hypoglycemia due to hyperinsulinism associated with leucine sensitivity, hypoglycemia due to hyperinsulinism associated with non-malignant insulinomas, inoperable islet cell adenoma or carcinoma, or extrapancreatic malignancy, hyperinsulinmia and hypoglycaemia in polycystic ovary syndrome, sulphonylurea-induced toxicity in T2DM, Prader-Willi syndrome, Adrenal Insufficiency and Addison's Disease, Beckwith-Wiedemann syndrome, Soto's Syndrome, Costello Syndrome, Timothy Syndrome, Kabuki Syndrome, Congenital Disorders of Glycosylation, Late dumping syndrome, Reactive hypoglycaemia infants of diabetic mothers, Trisomy 13, Central hypoventilation syndrome, Leprechaunism (insulin resistance syndrome), Mosaic Turner Syndrome, Usher Syndrome, Non-insulinoma pancreatogenous hypoglycaemia, Factitious hypoglycaemia, Insulin gene receptor mutations, Insulin autoimmune syndrome, Non-islet cells tumor hypoglycemia (NICTH) and withdrawal from alcoholic and other addictive substances.

DETAILED DESCRIPTION OF THE INVENTION

This invention relates to novel compounds. The invention also relates to the use of novel compounds as antagonists of GLP-1 receptors. The invention further relates to the use of novel compounds in the manufacture of medicaments for use as GLP-1 receptor antagonists or for the treatment of disorders associated with GLP-1 receptors. The invention further relates to compounds, compositions and medicaments which are selective antagonists of the GLP-1 receptor with respect to other GLP receptor sub-types.

The invention further relates to compounds, compositions and medicaments useful for the treatment of unexplained symptomatic hyperinsulinemia conditions and/or associated hypoglycaemia conditions such as hypoglycemia due to hyperinsulinism associated with leucine sensitivity, hypoglycemia due to hyperinsulinism associated with non-malignant insulinomas, inoperable islet cell adenoma or carcinoma, or extrapancreatic malignancy, hyperinsulinmia and hypoglycaemia in polycystic ovary syndrome, sulphonylurea-induced toxicity in T2DM, Prader-Willi syndrome, Adrenal Insufficiency and Addison's Disease, Beckwith-Wiedemann syndrome, Soto's Syndrome, Costello Syndrome, Timothy Syndrome, Kabuki Syndrome, Congenital Disorders of Glycosylation, Late dumping syndrome, Reactive hypoglycaemia infants of diabetic mothers, Trisomy 13, Central hypoventilation syndrome, Leprechaunism (insulin resistance syndrome), Mosaic Turner Syndrome, Usher Syndrome, Non-insulinoma pancreatogenous hypoglycaemia, Factitious hypoglycaemia, Insulin gene receptor mutations, Insulin autoimmune syndrome, Non-islet cells tumor hypoglycemia (NICTH) and withdrawal from alcoholic and other addictive substances.

Accordingly, in one embodiment the invention provides a compound comprising a sequence of formula (1):

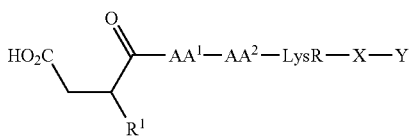

(1)

wherein;
$R^1$ is H, $NHR^2$ or $CH_2R^2$; where $R^2$ is selected from: H, $C_{1-6}$ alkyl, $(CH_2)_n$aryl and $(CH_2)_n$heteroaryl; where n is 1 to 6;
$AA^1$ is -Leu- or -Nle-;
$AA^2$ is —$NHCR^{3a}R^{3b}CO$—; wherein $R^{3a}$ is hydrogen or a $C_{1-3}$ alkyl group, or is joined to $R^{3b}$ to form a 3-6 membered ring optionally containing one or more heteroatoms selected from N and O; and $R^{3b}$ is $C_{1-6}$ alkyl, $(CH_2)_n$aryl, $(CH_2)_n$OH or $(CH_2)_n OR^4$, or is joined to $R^{3a}$ to form a 3-6 membered ring optionally containing one or more heteroatoms selected from N and O; where $R^4$ is $C_{1-6}$ alkyl and n is 1 to 6;
LysR is an optionally N-substituted substituted Lysine residue;
X is a sequence: -Gln-$AA^3$-Glu-$AA^4$-Glu-$AA^5$-Val-$AA^6$-Leu-Phe-$AA^7$-Glu-Trp-Leu-Lys-Asn-$AA^8$-(SEQ ID NO: 1);
wherein $AA^3$ is -Met- or -Nle-; where when $AA^3$ is -Met-, LysR is an N-substituted lysine residue;
$AA^4$ is -Glu- or -Gln-;
$AA^5$ is -Ser- or -Ala-;
$AA^6$ is -Arg- or -DArg-;
$AA^7$ is a group —$NHCHR^5CO$—; where $R^5$ is a $C_{1-6}$ alkyl group;
$AA^8$ is -Gly-, -Ser-, -DAla- or -βAla-;
Y is absent or is a sequence -$AA^9$-$AA^{10}$-$AA^{11}$-$AA^{12}$-$AA^{13}$-$AA^{14}$-$AA^{15}$-$AA^{16}$-$AA^{17}$-$AA^{18}$-$AA^{19}$-
wherein $AA^9$ is -Gly- or -Ser-;
$AA^{10}$ is -Pro- or -Ser-;
$AA^{11}$ is -Ser-, -DSer- or -Lys-;
$AA^{12}$ is -Ser-, -DSer-, -Lys- or -Phe-;
$AA^{13}$ is absent or is -Ser-, -DSer-, -Gly-, -Glu- or -Lys-;
$AA^{14}$ is absent or is -Ser-, -DSer-, -Ala-, -Lys- or -Tyr-;
$AA^{15}$ is absent or is -Ser-, -DSer-, -Pro-, -Glu- or -Lys-;
$AA^{16}$ is absent or is -Ser-, -DSer-, -Pro-, -Lys- or -LysR-;
$AA^{17}$ is absent or is -Pro- or -Glu-;
$AA^{18}$ is absent or is -Ser- or -Tyr-;
$AA^{19}$ is absent or is -Glu-;
wherein the X or Y C-terminus is a carboxyl group or a carboxamide group, or is adjoined to any natural or non-natural amino acid sequence or any other moiety, functional group or groups;
or a tautomeric or stereochemically isomeric form thereof or a prodrug, salt or zwitterion thereof.

$R^1$ can be H, $NH_2$, NHBn or $CH_2Bn$. $R^1$ can be H. $R^1$ can be hydrogen. $R^1$ can be $NH_2$. $R^1$ can be NHBn. $R^1$ can be $CH_2Bn$. $R^1$ can be NH-benzyl. $R^1$ can be $CH_2$-benzyl.

$R^2$ can be H. $R^2$ can be hydrogen. $R^2$ can be Bn. $R^2$ can be benzyl.

$AA^1$ can be -Leu-. $AA^1$ can be -Nle-.

$AA^2$ can be —$NHCR^{3a}R^{3b}CO$—; wherein $R^{3a}$ is hydrogen or methyl, and $R^{3b}$ is selected from methyl, ethyl, isobutyl, n-butyl, $CH_2OH$, $CH_2CH_2OH$, $CH_2OCH_3$, $CH_2$-cyclopropyl, Bn, $CH_2Bn$ or $CH_2CH_2Bn$.

$R^{3a}$ can be hydrogen or methyl. $R^{3a}$ can be hydrogen. $R^{3a}$ can be methyl.

$R^{3b}$ can be selected from methyl, ethyl, isobutyl, n-butyl, $CH_2OH$, $CH_2CH_2OH$, $CH_2OCH_3$, $CH_2$-cyclopropyl, Bn, $CH_2Bn$ or $CH_2CH_2Bn$.

$R^{3a}$ and $R^{3b}$ can be joined to form a ring. $R^{3a}$ and $R^{3b}$ can be joined to form a cyclobutyl or an oxetanyl ring.

$AA^2$ can be selected from:

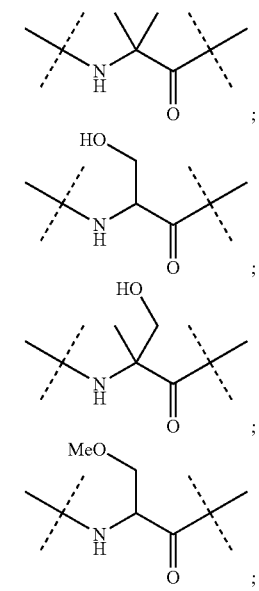

-continued
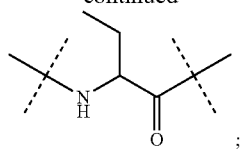;
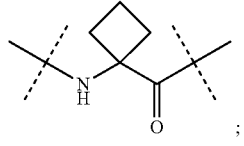;
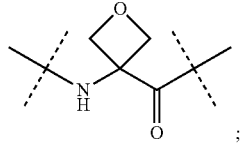;
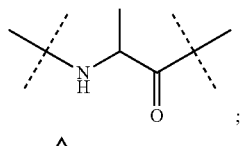;
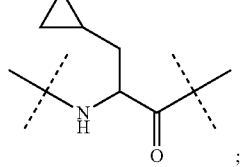;
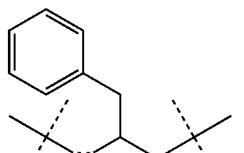;
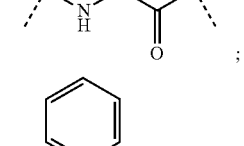;
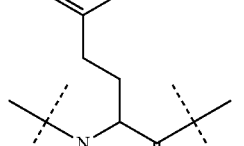;
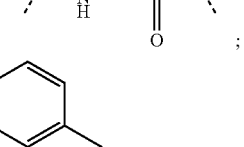;
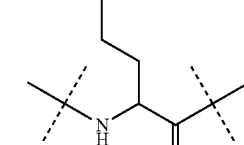;
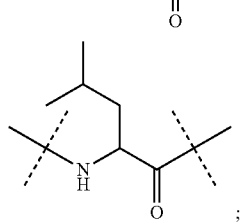
-continued
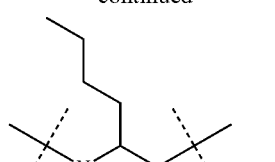; and
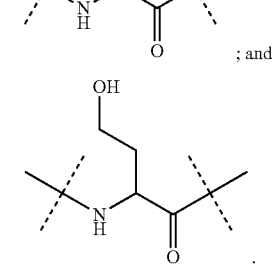.
$AA^2$ can be selected from:
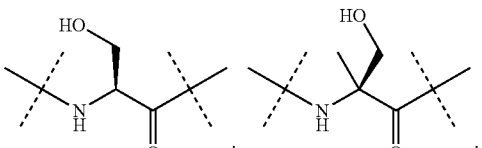
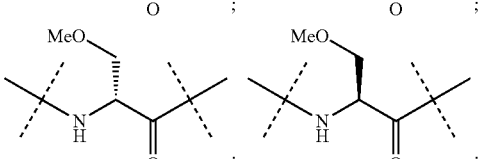
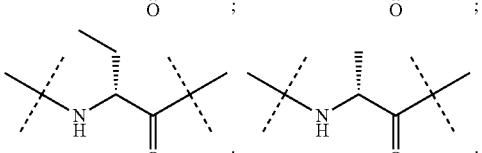
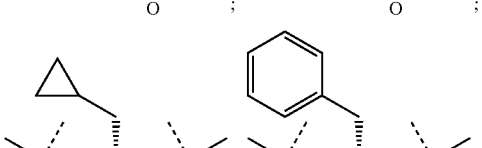
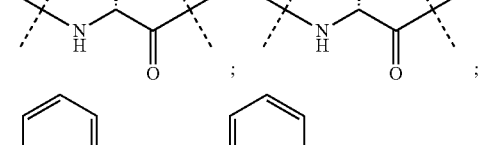
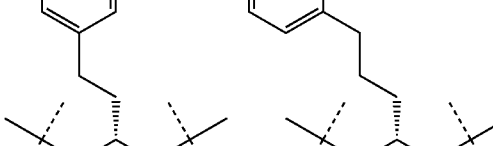
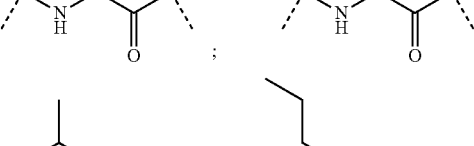
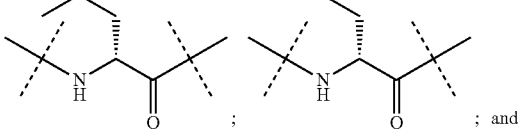; and -continued

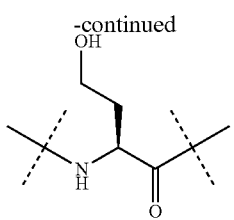

LysR can be an unsubstituted lysine residue.

LysR can be an N-substituted Lysine residue, wherein the N-substituent is selected from: —CO(CH$_2$)$_q$CH$_3$; —CO(CH$_2$)$_q$CO$_2$H; —CO(CH$_2$)$_q$CHCH$_2$; —COO(CH$_2$)$_q$CH$_3$; —COO(CH$_2$)$_q$CO$_2$H and —COO(CH$_2$)$_q$CHCH$_2$; where q is 1 to 22.

LysR can be an N-substituted Lysine residue, wherein the N-substituent is —COO(CH$_2$)$_q$CHCH$_2$; where q is 1 to 22.

LysR can be an N-substituted Lysine residue, wherein the N-substituent is —COO(CH$_2$)$_q$CHCH$_2$; where q is 1.

LysR can be an N-substituted Lysine residue, wherein the N-substituent is —COOCH$_2$CHCH$_2$.

Lys R can be

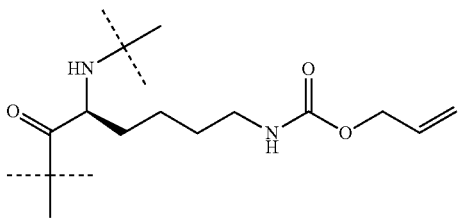

LysR can be an N-substituted Lysine residue, wherein the N-substituent is a group -L-G; wherein L is selected from the group consisting of:

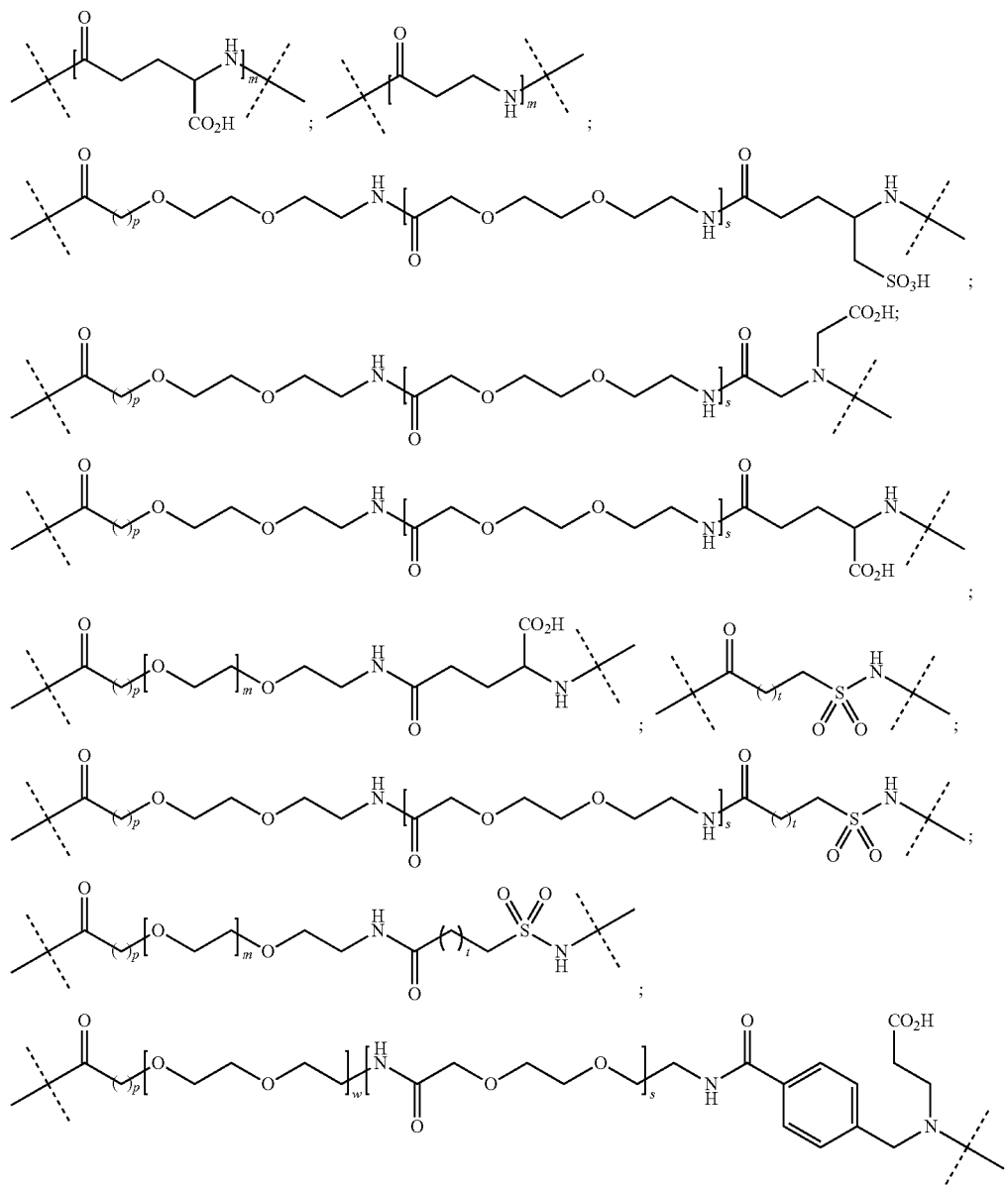

-continued

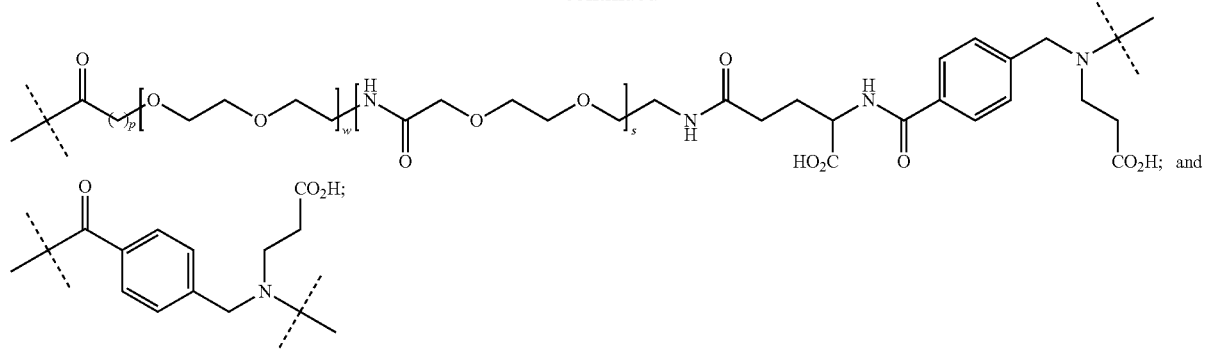

and G is selected from the group consisting of:

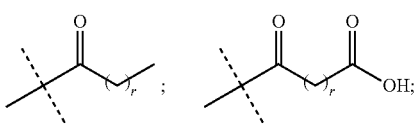

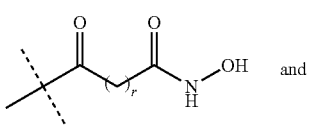

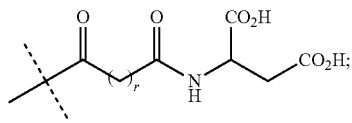

where m is 1 to 23;
p is 1 to 3;
r is 1 to 20;
s is 0 to 3;
t is 0 to 4;
and w is 0 to 4.
LysR can be LysR can be

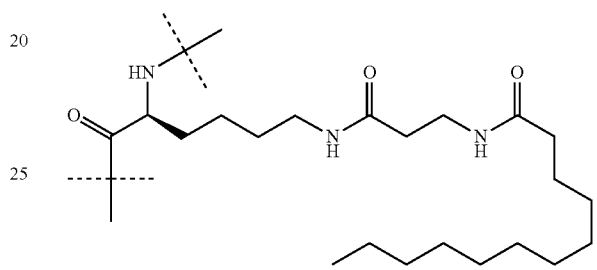

$AA^3$ can be -Met-. $AA^3$ can be -Nle-. When $AA^3$ is -Met-, LysR is an N-substituted lysine residue.
$AA^4$ can be -Glu-. $AA^4$ can be -Gln-.
$AA^5$ can be -Ser-. $AA^5$ can be -Ala-.
$AA^6$ can be -Arg-. $AA^6$ can be -DArg-.
$AA^7$ can be a group —NHCHR$^5$CO—; where $R^5$ is selected from isopropyl, sec-butyl and neopentyl. $R^5$ can be isopropyl. $R^5$ can be sec-butyl. $R^5$ can be neopentyl.
$AA^7$ can be -Ile-. $AA^7$ can be -Val-. $AA^7$ can be a tert-butyl alanine residue.
$AA^8$ can be -Gly-. $AA^8$ can be -Ser-. $AA^8$ can be -DAla-. $AA^8$ can be -βAla-.
Y can be absent or present. Y can be absent. Y can be present.
$AA^9$ can be -Gly-. $AA^9$ can be -Ser-.
$AA^w$ can be -Pro-. $AA^{10}$ can be -Ser-.
$AA^{11}$ can be -Ser-. $AA^{11}$ can be -DSer-. $AA^{11}$ can be -Lys-.
$AA^{12}$ can be -Ser-. $AA^{12}$ can be -DSer-. $AA^{12}$ can be -Lys-. $AA^{12}$ can be -Phe-.
$AA^{13}$ can be absent. $AA^{13}$ can be -Ser-. $AA^{13}$ can be -DSer-. $AA^{13}$ can be -Gly-. $AA^{13}$ can be -Glu-. $AA^{13}$ can be -Lys-.

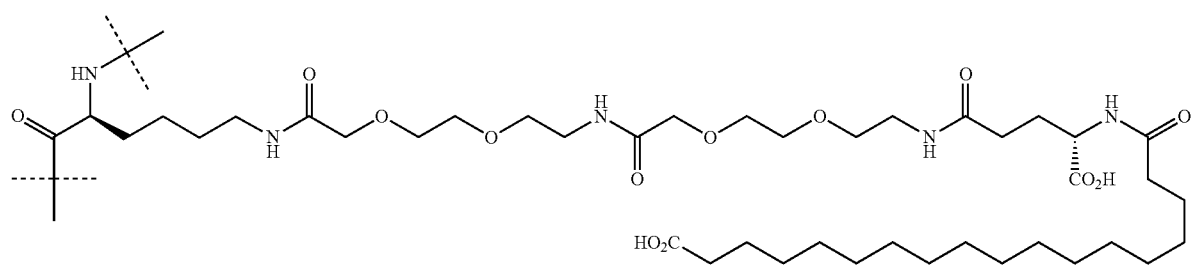

AA$^{14}$ can be absent. AA$^{14}$ can be -Ser-. AA$^{14}$ can be -DSer-. AA$^{14}$ can be -Ala-. AA$^{14}$ can be -Lys-. AA$^{14}$ can be -Tyr-.

AA$^{15}$ can be absent. AA$^{15}$ can be -Ser-. AA$^{15}$ can be -DSer-. AA$^{15}$ can be -Pro-. AA$^{15}$ can be -Glu-. AA$^{15}$ can be -Lys-.

AA$^{16}$ can be absent. AA$^{16}$ can be -Ser-. AA$^{16}$ can be -DSer-. AA$^{16}$ can be -Pro-. AA$^{16}$ can be -Lys-. AA$^{16}$ can be -LysR-.

AA$^{17}$ can be absent. AA$^{17}$ can be -Pro-. AA$^{17}$ can be -Glu-.

AA$^{18}$ can be absent. AA$^{18}$ can be -Ser-. AA$^{18}$ can be -Tyr-.

AA$^{19}$ can be absent. AA$^{19}$ can be -Glu-.

When Y is absent, the X C-terminus can be a carboxamide group. When Y is absent, the X C-terminus can be a carboxyl group. When Y is absent, the X C-terminus can be adjoined to any natural or non-natural amino acid sequence or any other moiety, functional group or groups.

The Y C-terminus can be a carboxamide group. The Y C-terminus can be a carboxyl group. the Y C-terminus can be adjoined to any natural or non-natural amino acid sequence or any other moiety, functional group or groups.

The compound can be a compound wherein R$^1$ is NHBn, AA$^1$ is -Leu-, AA$^2$ is -D-HomoPhe-, LysR is -Lys-, AA$^3$ is -Nle-, AA$^4$ is -Glu-, AA$^5$ is -Ala-, AA$^6$ is -Arg-, AA$^7$ is -Ile- and AA$^8$ is -DAla-, where Y is absent and the X C-terminus is a carboxamide group.

The compound can be a compound wherein R$^1$ is NHBn, AA$^1$ is -Leu-, AA$^2$ is -DAla-, LysR is -Lys-, AA$^3$ is -Nle-, AA$^4$ is -Glu-, AA$^5$ is -Ala-, AA$^6$ is -DArg-, AA$^7$ is -Ile- and AA$^8$ is -DAla-, where Y is absent and the X C-terminus is a carboxamide group.

The compound can be a compound wherein R$^1$ is H, AA$^1$ is -Leu-, AA$^2$ is -D-CyclopropylAla-, LysR is -Lys-, AA$^3$ is -Nle-, AA$^4$ is -Glu-, AA$^5$ is -Ala-, AA$^6$ is -DArg-, AA$^7$ is -Ile- and AA$^8$ is -DAla-, where Y is absent and the X C-terminus is a carboxamide group.

The compound can be a compound wherein R$^1$ is NHBn, AA$^1$ is -Leu-, AA$^2$ is -Aib-, LysR is -Lys-, AA$^3$ is -Nle-, AA$^4$ is -Glu-, AA$^5$ is -Ala-, AA$^6$ is -DArg-, AA$^7$ is -Ile- and AA$^8$ is -DAla-, where Y is absent and the X C-terminus is a carboxamide group.

The compound can be a compound wherein R$^1$ is NHBn, AA$^1$ is -Nle-, AA$^2$ is -Aib-, LysR is -Lys-, AA$^3$ is -Nle-, AA$^4$ is -Glu-, AA$^5$ is -Ala-, AA$^6$ is -DArg-, AA$^7$ is -Ile- and AA$^8$ is -DAla-, where Y is absent and the X C-terminus is a carboxamide group.

The compound can be a compound wherein R$^1$ is NHBn, AA$^1$ is -Leu-, AA$^2$ is -D-HomoPhe-, LysR is -Lys-, AA$^3$ is -Nle-, AA$^4$ is -Glu-, AA$^5$ is -Ala-, AA$^6$ is -Arg-, AA$^7$ is -Ile-, AA$^8$ is -DAla-, AA$^9$ is -Gly-, AA$^{10}$ is -Pro-, AA$^{11}$ is -Ser-, AA$^{12}$ is -Ser-, AA$^{13}$ is -Ser-, AA$^{14}$ is -Ser-, AA$^{15}$ is -Ser- and AA$^{16}$ is -Ser-, where AA$^{17}$, AA$^{18}$ and AA$^{19}$ are absent and the Y C-terminus is a carboxamide group.

The compound can be a compound wherein R$^1$ is NHBn, AA$^1$ is -Nle-, AA$^2$ is -Aib-, LysR is -Lys-, AA$^3$ is -Nle-, AA$^4$ is -Glu-, AA$^5$ is -Ala-, AA$^6$ is -DArg-, AA$^7$ is -Ile-, AA$^8$ is -DAla-, AA$^9$ is -Gly-, AA$^{10}$ is -Pro-, AA$^{11}$ is -DSer-, AA$^{12}$ is -DSer-, AA$^{13}$ is -DSer-, AA$^{14}$ is -DSer-, AA$^{15}$ is -DSer- and AA$^{16}$ is -DSer-, where AA$^{17}$, AA$^{18}$ and AA$^{19}$ are absent and the Y C-terminus is a carboxamide group.

The compound can be a compound of formula (1a):

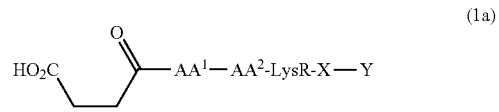

(1a)

or a tautomeric or stereochemically isomeric form thereof or a prodrug, salt or zwitterion thereof, wherein AA$^1$, AA$^2$, LysR, X and Y are as defined above.

The compound can be a compound of formula (1b):

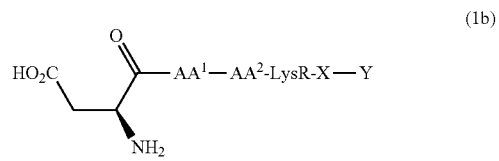

(1b)

or a tautomeric or stereochemically isomeric form thereof or a prodrug, salt or zwitterion thereof, wherein AA$^1$, AA$^2$, LysR, X and Y are as defined above.

The compound can be a compound of formula (1c):

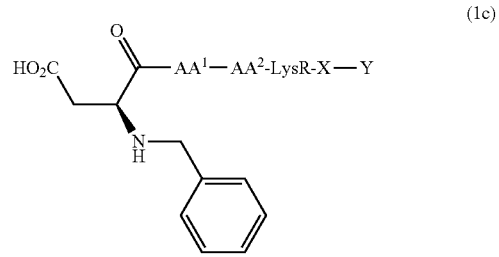

(1c)

or a tautomeric or stereochemically isomeric form thereof or a prodrug, salt or zwitterion thereof, wherein AA$^1$, AA$^2$, LysR, X and Y are as defined above.

The compound can be a compound of formula (1d):

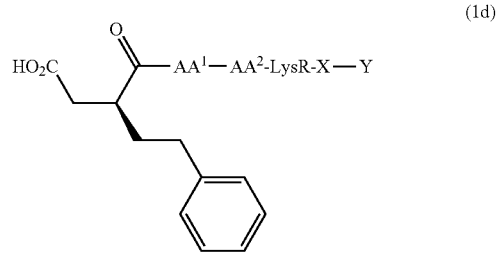

(1d)

or a tautomeric or stereochemically isomeric form thereof or a prodrug, salt or zwitterion thereof, wherein AA$^1$, AA$^2$, LysR, X and Y are as defined above.

The compound can be a compound selected from any one of the group consisting of:
Example 24
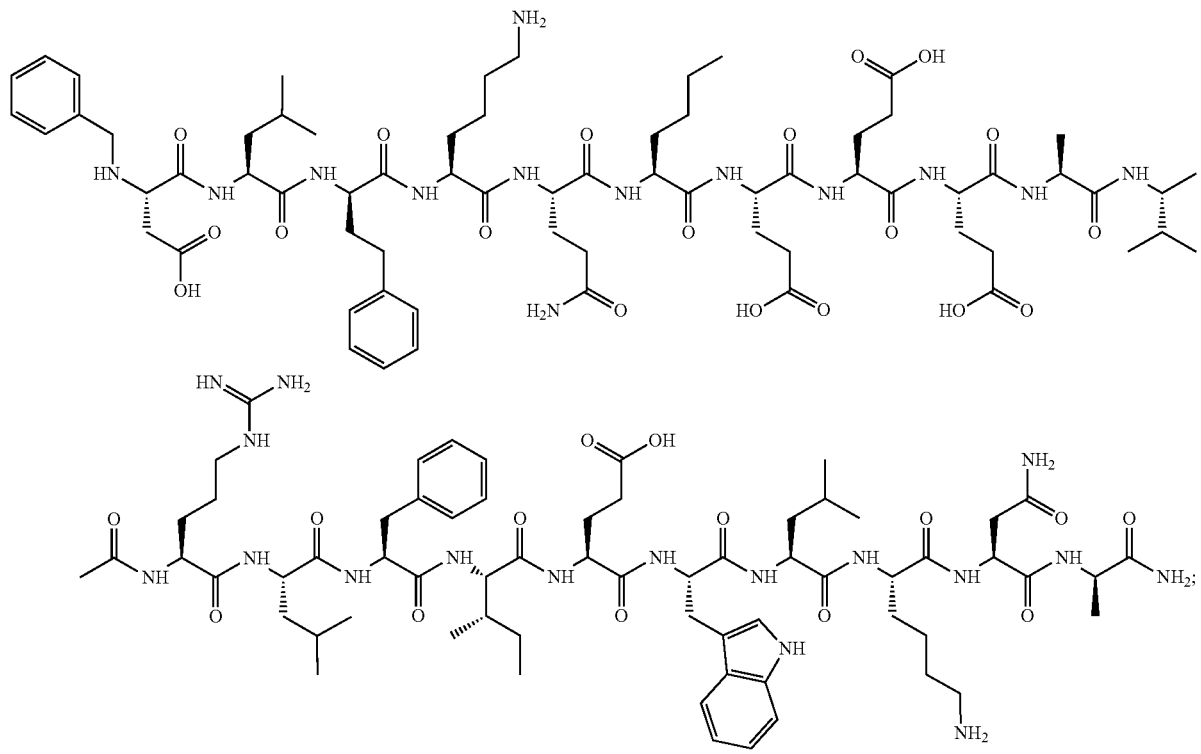
Example 34
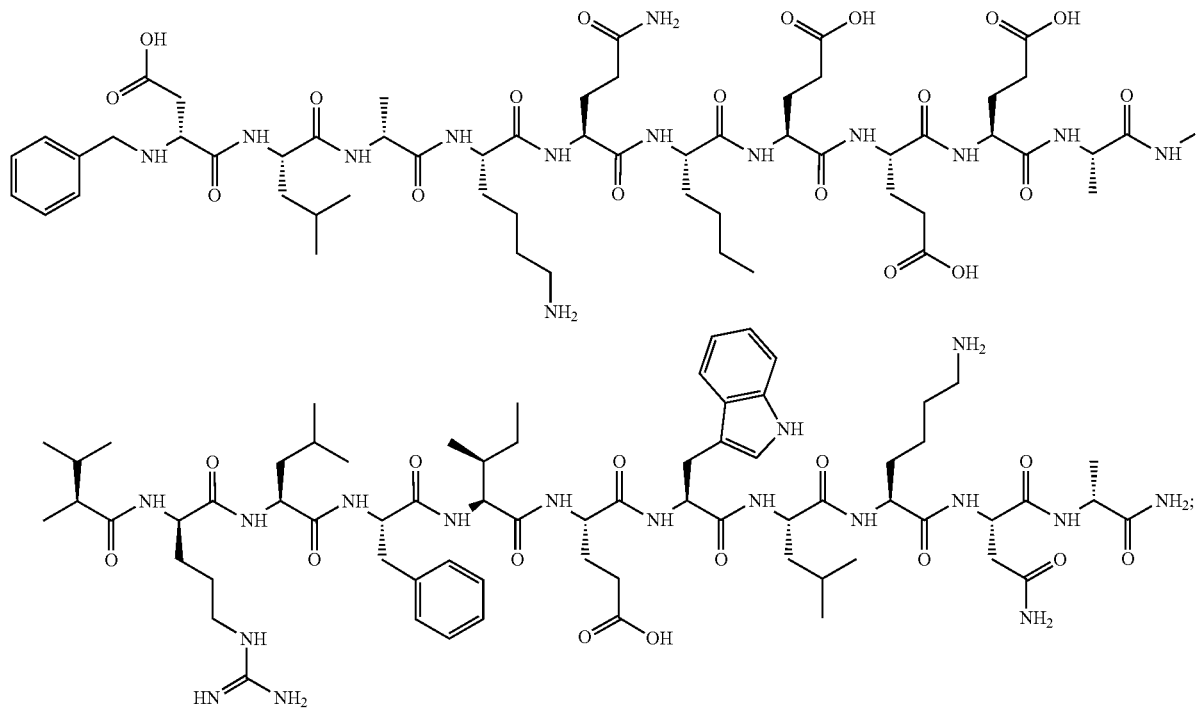

Example 38
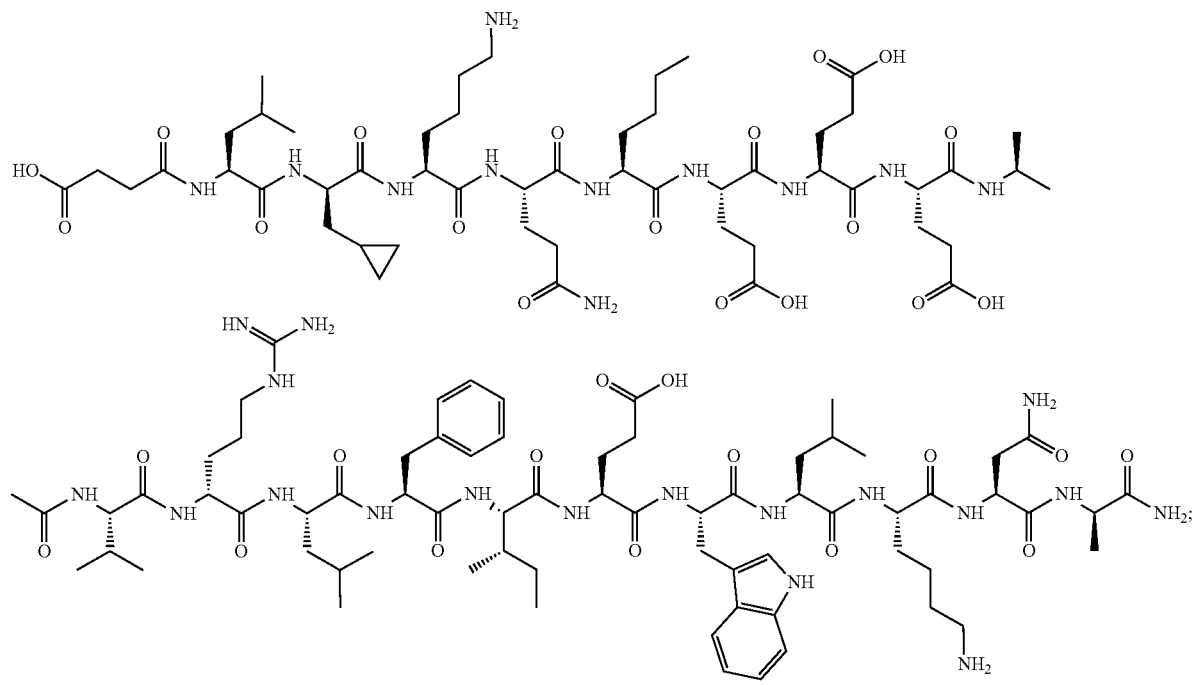
Example 44
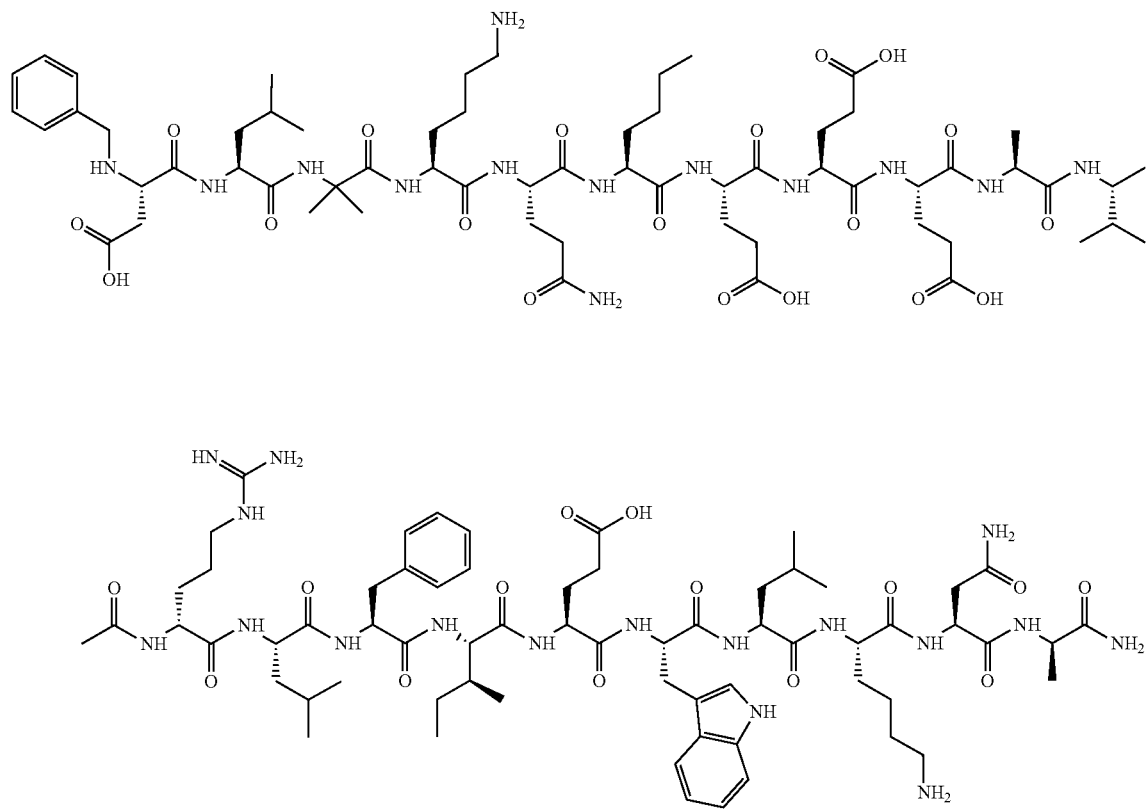

Example 53
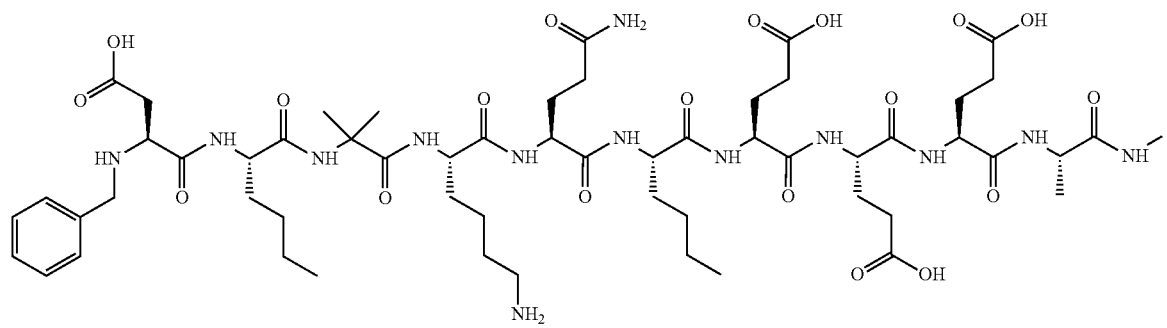
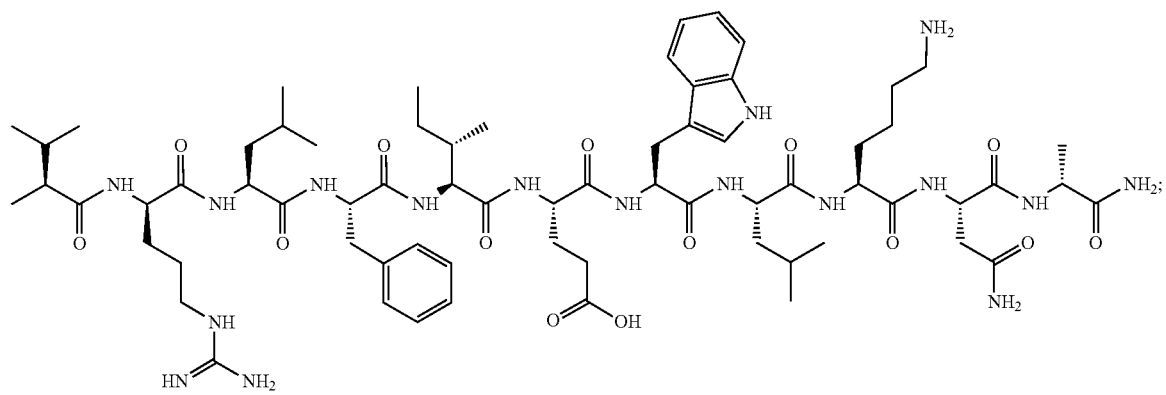
Example 63
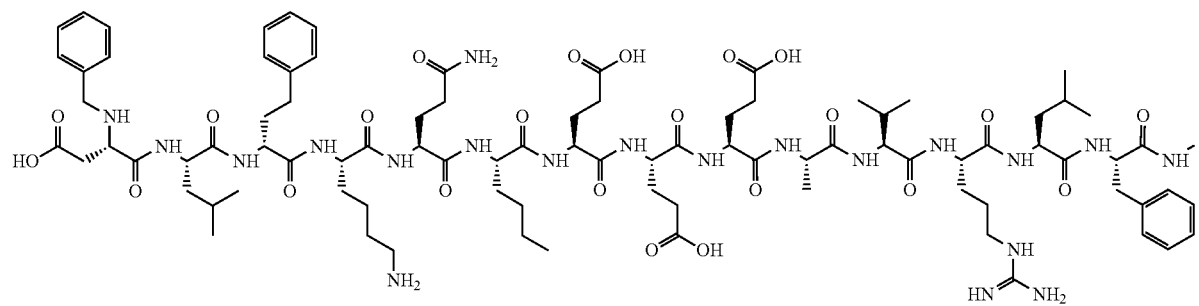
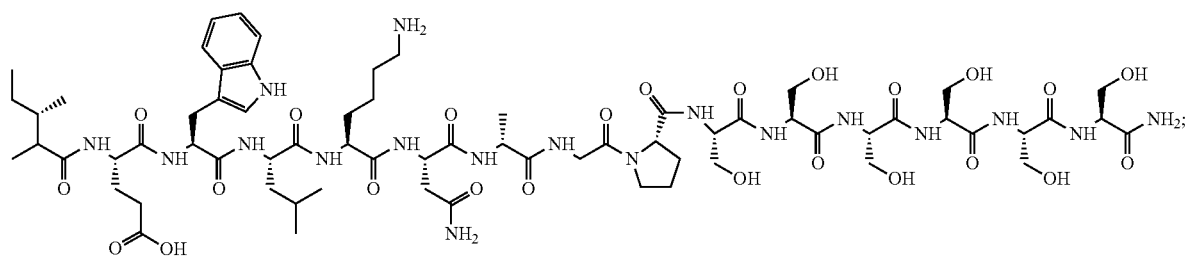

Example 85

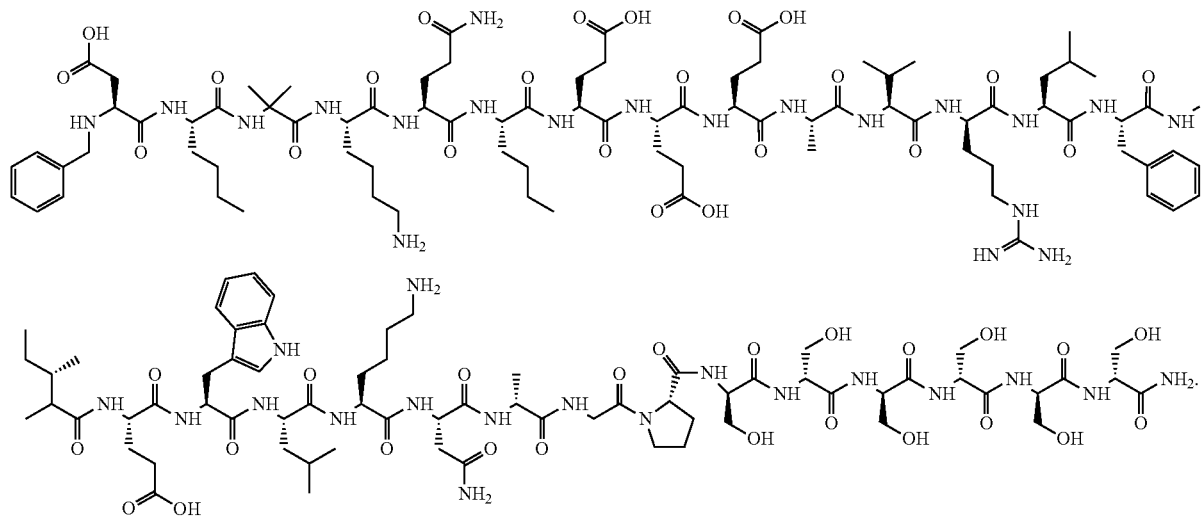

or a tautomeric or stereochemically isomeric form thereof or a prodrug, salt or zwitterion thereof.

The compound can be selected from any one of Examples 1 to 85 shown in Table 1:

TABLE 1

|  | AA1 | AA2 | LysR |  | AA3 | NLE | GLU | GLU | GLU | ALA | VAL |
|---|---|---|---|---|---|---|---|---|---|---|---|
| Example 1 | ASP | LEU | D-PHE | LYS | GLN | NLE | GLU | GLU | GLU | ALA | VAL |
| Example 2 | ASP | LEU | D-HomoPHE | LYS | GLN | NLE | GLU | GLU | GLU | ALA | VAL |
| Example 3 | ASP | LEU | D-PHE | LYS | GLN | NLE | GLU | GLU | GLU | ALA | VAL |
| Example 4 | Bn-ASP | LEU | D-PHE | LYS | GLN | NLE | GLU | GLU | GLU | ALA | VAL |
| Example 5 | succinate | LEU | D-HomoPHE | LYS | GLN | NLE | GLU | GLU | GLU | ALA | VAL |
| Example 6 | succinate | LEU | D-HomoPHE | allocLYS | GLN | NLE | GLU | GLU | GLU | ALA | VAL |
| Example 7 | succinate | NLE | D-HomoPHE | LYS | GLN | NLE | GLU | GLU | GLU | ALA | VAL |
| Example 8 | succinate | LEU | D-HomoPHE | LYS-γGlu-2xOEG C18 diacid | GLN | NLE | GLU | GLU | GLU | ALA | VAL |
| Example 9 | Bn-ASP | LEU | D-HomoPHE | LYS | GLN | NLE | GLU | GLU | GLU | ALA | VAL |
| Example 10 | succinate | NLE | D-HomoPHE | allocLYS | GLN | NLE | GLU | GLU | GLU | ALA | VAL |
| Example 11 | succinate | NLE | D-HomoPHE | LYS-γGlu-2xOEG C18 diacid | GLN | NLE | GLU | GLU | GLU | ALA | VAL |
| Example 12 | succinate | LEU | D-HomoPHE | LYS | GLN | NLE | GLU | GLU | GLU | ALA | VAL |
| Example 13 | succinate | LEU | D-HomoPHE | LYS | GLN | NLE | GLU | GLU | GLU | ALA | VAL |
| Example 14 | succinate | LEU | D-homohomoPHE | LYS | GLN | NLE | GLU | GLU | GLU | ALA | VAL |
| Example 15 | succinate | LEU | D-PHE | LYS-γGlu-2xOEG C18 diacid | GLN | NLE | GLU | GLU | GLU | ALA | VAL |
| Example 16 | succinate | NLE | D-PHE | LYS-γGlu-2xOEG C18 diacid | GLN | NLE | GLU | GLU | GLU | ALA | VAL |
| Example 17 | ASP | LEU | D-HomoPHE | LYS | GLN | NLE | GLU | GLU | GLU | ALA | VAL |
| Example 18 | succinate | LEU | D-HomoPHE | LYS | GLN | NLE | GLU | GLU | GLU | ALA | VAL |
| Example 19 | succinate | LEU | D-HomoPHE | LYS-γGlu-2xOEG C18 diacid | GLN | NLE | GLU | GLU | GLU | ALA | VAL |
| Example 20 | ASP | LEU | D-HomoPHE | LYS | GLN | NLE | GLU | GLU | GLU | ALA | VAL |
| Example 21 | succinate | LEU | D-PHE | LYS-γGlu-2xOEG C18 diacid | GLN | NLE | GLU | GLN | GLU | ALA | VAL |
| Example 22 | succinate | LEU | D-HomoPHE | LYS | GLN | NLE | GLU | GLN | GLU | ALA | VAL |
| Example 23 | 2-(S)-phenethylbutanate | LEU | D-HomoPHE | LYS | GLN | NLE | GLU | GLU | GLU | ALA | VAL |
| Example 24 | Bn-ASP | LEU | D-HomoPHE | LYS | GLN | NLE | GLU | GLU | GLU | ALA | VAL |
| Example 25 | Bn-ASP | LEU | D-HomoPHE | LYS | GLN | NLE | GLU | GLU | GLU | ALA | VAL |
| Example 26 | Bn-ASP | LEU | D-HomoPHE | LYS-γGlu-2xOEG C18 diacid | GLN | NLE | GLU | GLU | GLU | ALA | VAL |
| Example 27 | ASP | LEU | D-NLE | LYS | GLN | NLE | GLU | GLU | GLU | ALA | VAL |
| Example 28 | Bn-ASP | LEU | SER | LYS | GLN | NLE | GLU | GLU | GLU | ALA | VAL |
| Example 29 | Bn-ASP | LEU | D-HomoPHE | LYS | GLN | NLE | GLU | GLU | GLU | ALA | VAL |

TABLE 1-continued

| | | | | | | | | | | | |
|---|---|---|---|---|---|---|---|---|---|---|---|
| Example 30 | Bn-ASP | NLE | D-HomoPHE | LYS | GLN | NLE | GLU | GLU | GLU | ALA | VAL |
| Example 31 | Bn-ASP | LEU | SER | LYS | GLN | NLE | GLU | GLU | GLU | ALA | VAL |
| Example 32 | Bn-ASP | LEU | D-NLE | LYS | GLN | NLE | GLU | GLU | GLU | ALA | VAL |
| Example 33 | Bn-ASP | LEU | D-HomoPHE | LYS-γGlu-2xOEG C18 diacid | GLN | NLE | GLU | GLU | GLU | ALA | VAL |
| Example 34 | Bn-ASP | LEU | D-ALA | LYS | GLN | NLE | GLU | GLU | GLU | ALA | VAL |
| Example 35 | Bn-ASP | LEU | D-LEU | LYS | GLN | NLE | GLU | GLU | GLU | ALA | VAL |
| Example 36 | succinate | LEU | D-LEU | LYS | GLN | NLE | GLU | GLU | GLU | ALA | VAL |
| Example 37 | Bn-ASP | LEU | D-CyclopropylALA | LYS | GLN | NLE | GLU | GLU | GLU | ALA | VAL |
| Example 38 | succinate | LEU | D-CyclopropylALA | LYS | GLN | NLE | GLU | GLU | GLU | ALA | VAL |
| Example 39 | Bn-ASP | LEU | D-CyclopropylALA | LYS | GLN | NLE | GLU | GLU | GLU | ALA | VAL |
| Example 40 | succinate | LEU | D-CyclopropylALA | LYS | GLN | NLE | GLU | GLU | GLU | ALA | VAL |
| Example 41 | succinate | LEU | D-HomoPHE | LYS | GLN | NLE | GLU | GLU | GLU | ALA | VAL |
| Example 42 | succinate | LEU | D-HomoPHE | LYS | GLN | NLE | GLU | GLU | GLU | SER | VAL |
| Example 43 | Bn-ASP | LEU | D-ABU | LYS | GLN | NLE | GLU | GLU | GLU | ALA | VAL |
| Example 44 | Bn-ASP | LEU | AIB | LYS | GLN | NLE | GLU | GLU | GLU | ALA | VAL |
| Example 45 | Bn-ASP | LEU | HomoSER | LYS | GLN | NLE | GLU | GLU | GLU | ALA | VAL |
| Example 46 | Bn-ASP | LEU | D-Ser(Me)—OH | LYS | GLN | NLE | GLU | GLU | GLU | ALA | VAL |
| Example 47 | Bn-ASP | LEU | Ser(Me)—OH | LYS | GLN | NLE | GLU | GLU | GLU | ALA | VAL |
| Example 48 | Bn-ASP | NLE | D-ALA | LYS | GLN | NLE | GLU | GLU | GLU | ALA | VAL |
| Example 49 | Bn-ASP | NLE | D-ABU | LYS | GLN | NLE | GLU | GLU | GLU | ALA | VAL |
| Example 50 | Bn-ASP | LEU | D-ALA | LYS | GLN | NLE | GLU | GLU | GLU | ALA | VAL |
| Example 51 | Bn-ASP | LEU | α-MeSER | LYS | GLN | NLE | GLU | GLU | GLU | ALA | VAL |
| Example 52 | Bn-ASP | LEU | Cyclobutyl | LYS | GLN | NLE | GLU | GLU | GLU | ALA | VAL |
| Example 53 | Bn-ASP | NLE | AIB | LYS | GLN | NLE | GLU | GLU | GLU | ALA | VAL |
| Example 54 | Bn-ASP | LEU | Oxetane | LYS | GLN | NLE | GLU | GLU | GLU | ALA | VAL |
| Example 55 | ASP | NLE | D-PHE | LYS | GLN | NLE | GLU | GLU | GLU | ALA | VAL |
| Example 56 | ASP | NLE | D-HomoPHE | LYS | GLN | NLE | GLU | GLU | GLU | ALA | VAL |
| Example 57 | succinate | NLE | D-PHE | LYS | GLN | NLE | GLU | GLU | GLU | ALA | VAL |
| Example 58 | succinate | NLE | D-PHE | LYS | GLN | NLE | GLU | GLU | GLU | ALA | VAL |
| Example 59 | ASP | LEU | D-PHE | LYS | GLN | NLE | GLU | GLU | GLU | ALA | VAL |
| Example 60 | ASP | LEU | D-PHE | LYS | GLN | NLE | GLU | GLU | GLU | ALA | VAL |
| Example 61 | Bn-ASP | LEU | D-HomoPHE | LYS | GLN | NLE | GLU | GLU | GLU | ALA | VAL |
| Example 62 | Bn-ASP | LEU | D-HomoPHE | LYS | GLN | NLE | GLU | GLU | GLU | ALA | VAL |
| Example 63 | Bn-ASP | LEU | D-HomoPHE | LYS | GLN | NLE | GLU | GLU | GLU | ALA | VAL |
| Example 64 | succinate | LEU | D-HomoPHE | LYS | GLN | NLE | GLU | GLU | GLU | ALA | VAL |
| Example 65 | succinate | LEU | D-HomoPHE | LYS | GLN | NLE | GLU | GLU | GLU | ALA | VAL |
| Example 66 | succinate | LEU | D-HomoPHE | LYS | GLN | NLE | GLU | GLU | GLU | ALA | VAL |
| Example 67 | Bn-ASP | LEU | SER | LYS | GLN | NLE | GLU | GLU | GLU | ALA | VAL |
| Example 68 | Bn-ASP | LEU | D-ALA | LYS | GLN | NLE | GLU | GLU | GLU | ALA | VAL |
| Example 69 | ASP | LEU | SER | LYS-γGlu-2xOEG C18 diacid | GLN | MET | GLU | GLU | GLU | ALA | VAL |
| Example 70 | Bn-ASP | LEU | SER | LYS | GLN | NLE | GLU | GLU | GLU | ALA | VAL |
| Example 71 | Bn-ASP | LEU | SER | LYS-γGlu-2xOEG C18 diacid | GLN | NLE | GLU | GLU | GLU | ALA | VAL |
| Example 72 | Bn-ASP | LEU | D-ABU | LYS | GLN | NLE | GLU | GLU | GLU | ALA | VAL |
| Example 73 | Bn-ASP | NLE | D-ALA | LYS | GLN | NLE | GLU | GLU | GLU | ALA | VAL |
| Example 74 | Bn-ASP | NLE | D-ABU | LYS | GLN | NLE | GLU | GLU | GLU | ALA | VAL |
| Example 75 | Bn-ASP | NLE | D-ALA | LYS | GLN | NLE | GLU | GLU | GLU | ALA | VAL |
| Example 76 | Bn-ASP | NLE | D-ABU | LYS | GLN | NLE | GLU | GLU | GLU | ALA | VAL |
| Example 77 | Bn-ASP | LEU | D-ALA | LYS | GLN | NLE | GLU | GLU | GLU | ALA | VAL |
| Example 78 | Bn-ASP | LEU | D-ALA | LYS | GLN | NLE | GLU | GLU | GLU | ALA | VAL |
| Example 79 | Bn-ASP | LEU | D-ABU | LYS | GLN | NLE | GLU | GLU | GLU | ALA | VAL |
| Example 80 | Bn-ASP | LEU | D-ALA | LYS | GLN | NLE | GLU | GLU | GLU | ALA | VAL |
| Example 81 | Bn-ASP | LEU | D-ALA | LYS | GLN | NLE | GLU | GLU | GLU | ALA | VAL |
| Example 82 | Bn-ASP | LEU | SER | LYS | GLN | NLE | GLU | GLU | GLU | ALA | VAL |
| Example 83 | Bn-ASP | LEU | AIB | LYS | GLN | NLE | GLU | GLU | GLU | ALA | VAL |
| Example 84 | Bn-ASP | LEU | AIB | LYS | GLN | NLE | GLU | GLU | GLU | ALA | VAL |
| Example 85 | Bn-ASP | NLE | AIB | LYS | GLN | NLE | GLU | GLU | GLU | ALA | VAL |

| | AA6 | | | AA7 | | | | | AA8 | AA9 | AA10 | AA11 |
|---|---|---|---|---|---|---|---|---|---|---|---|---|
| Example 1 | ARG | LEU | PHE | ILE | | GLU | TRP | LEU | LYS | ASN | GLY | NH2 | |
| Example 2 | ARG | LEU | PHE | ILE | | GLU | TRP | LEU | LYS | ASN | GLY | NH2 | |
| Example 3 | ARG | LEU | PHE | ILE | | GLU | TRP | LEU | LYS | ASN | D-ALA | NH2 | |
| Example 4 | ARG | LEU | PHE | ILE | | GLU | TRP | LEU | LYS | ASN | GLY | NH2 | |
| Example 5 | ARG | LEU | PHE | tBuALA | | GLU | TRP | LEU | LYS | ASN | GLY | NH2 | |
| Example 6 | D-ARG | LEU | PHE | tBuALA | | GLU | TRP | LEU | LYS | ASN | betaALA | NH2 | |
| Example 7 | ARG | LEU | PHE | ILE | | GLU | TRP | LEU | LYS | ASN | GLY | NH2 | |
| Example 8 | D-ARG | LEU | PHE | tBuALA | | GLU | TRP | LEU | LYS | ASN | betaALA | NH2 | |
| Example 9 | ARG | LEU | PHE | ILE | | GLU | TRP | LEU | LYS | ASN | GLY | NH2 | |
| Example 10 | D-ARG | LEU | PHE | tBuALA | | GLU | TRP | LEU | LYS | ASN | betaALA | NH2 | |
| Example 11 | D-ARG | LEU | PHE | tBuALA | | GLU | TRP | LEU | LYS | ASN | betaALA | NH2 | |
| Example 12 | ARG | LEU | PHE | ILE | | GLU | TRP | LEU | LYS | ASN | GLY | NH2 | |
| Example 13 | ARG | LEU | PHE | ILE | | GLU | TRP | LEU | LYS | ASN | betaALA | NH2 | |
| Example 14 | ARG | LEU | PHE | ILE | | GLU | TRP | LEU | LYS | ASN | GLY | NH2 | |
| Example 15 | ARG | LEU | PHE | ILE | | GLU | TRP | LEU | LYS | ASN | D-ALA | NH2 | |

TABLE 1-continued

| | | | | | | | | | | | | | |
|---|---|---|---|---|---|---|---|---|---|---|---|---|---|
| Example 16 | ARG | LEU | PHE | ILE | GLU | TRP | LEU | LYS | ASN | D-ALA | NH2 | | |
| Example 17 | ARG | LEU | PHE | ILE | GLU | TRP | LEU | LYS | ASN | D-ALA | NH2 | | |
| Example 18 | ARG | LEU | PHE | ILE | GLU | TRP | LEU | LYS | ASN | D-ALA | NH2 | | |
| Example 19 | ARG | LEU | PHE | ILE | GLU | TRP | LEU | LYS | ASN | D-ALA | NH2 | | |
| Example 20 | D-ARG | LEU | PHE | ILE | GLU | TRP | LEU | LYS | ASN | D-ALA | NH2 | | |
| Example 21 | D-ARG | LEU | PHE | tBuALA | GLU | TRP | LEU | LYS | ASN | D-ALA | NH2 | | |
| Example 22 | ARG | LEU | PHE | ILE | GLU | TRP | LEU | LYS | ASN | D-ALA | NH2 | | |
| Example 23 | ARG | LEU | PHE | ILE | GLU | TRP | LEU | LYS | ASN | GLY | NH2 | | |
| Example 24 | ARG | LEU | PHE | ILE | GLU | TRP | LEU | LYS | ASN | D-ALA | NH2 | | |
| Example 25 | ARG | LEU | PHE | tBuALA | GLU | TRP | LEU | LYS | ASN | GLY | NH2 | | |
| Example 26 | ARG | LEU | PHE | ILE | GLU | TRP | LEU | LYS | ASN | GLY | NH2 | | |
| Example 27 | ARG | LEU | PHE | ILE | GLU | TRP | LEU | LYS | ASN | D-ALA | NH2 | | |
| Example 28 | ARG | LEU | PHE | ILE | GLU | TRP | LEU | LYS | ASN | D-ALA | NH2 | | |
| Example 29 | D-ARG | LEU | PHE | ILE | GLU | TRP | LEU | LYS | ASN | D-ALA | NH2 | | |
| Example 30 | D-ARG | LEU | PHE | ILE | GLU | TRP | LEU | LYS | ASN | D-ALA | NH2 | | |
| Example 31 | D-ARG | LEU | PHE | ILE | GLU | TRP | LEU | LYS | ASN | D-ALA | NH2 | | |
| Example 32 | D-ARG | LEU | PHE | ILE | GLU | TRP | LEU | LYS | ASN | D-ALA | NH2 | | |
| Example 33 | D-ARG | LEU | PHE | ILE | GLU | TRP | LEU | LYS | ASN | D-ALA | NH2 | | |
| Example 34 | D-ARG | LEU | PHE | ILE | GLU | TRP | LEU | LYS | ASN | D-ALA | NH2 | | |
| Example 35 | D-ARG | LEU | PHE | ILE | GLU | TRP | LEU | LYS | ASN | D-ALA | NH2 | | |
| Example 36 | D-ARG | LEU | PHE | ILE | GLU | TRP | LEU | LYS | ASN | D-ALA | NH2 | | |
| Example 37 | D-ARG | LEU | PHE | ILE | GLU | TRP | LEU | LYS | ASN | D-ALA | NH2 | | |
| Example 38 | D-ARG | LEU | PHE | ILE | GLU | TRP | LEU | LYS | ASN | D-ALA | NH2 | | |
| Example 39 | D-ARG | LEU | PHE | tBuALA | GLU | TRP | LEU | LYS | ASN | D-ALA | NH2 | | |
| Example 40 | D-ARG | LEU | PHE | tBuALA | GLU | TRP | LEU | LYS | ASN | D-ALA | NH2 | | |
| Example 41 | ARG | LEU | PHE | ILE | GLU | TRP | LEU | LYS | ASN | SER | NH2 | | |
| Example 42 | ARG | LEU | PHE | ILE | GLU | TRP | LEU | LYS | ASN | D-ALA | NH2 | | |
| Example 43 | D-ARG | LEU | PHE | ILE | GLU | TRP | LEU | LYS | ASN | D-ALA | NH2 | | |
| Example 44 | D-ARG | LEU | PHE | ILE | GLU | TRP | LEU | LYS | ASN | D-ALA | NH2 | | |
| Example 45 | D-ARG | LEU | PHE | ILE | GLU | TRP | LEU | LYS | ASN | D-ALA | NH2 | | |
| Example 46 | D-ARG | LEU | PHE | ILE | GLU | TRP | LEU | LYS | ASN | D-ALA | NH2 | | |
| Example 47 | D-ARG | LEU | PHE | ILE | GLU | TRP | LEU | LYS | ASN | D-ALA | NH2 | | |
| Example 48 | D-ARG | LEU | PHE | ILE | GLU | TRP | LEU | LYS | ASN | D-ALA | NH2 | | |
| Example 49 | D-ARG | LEU | PHE | ILE | GLU | TRP | LEU | LYS | ASN | D-ALA | NH2 | | |
| Example 50 | ARG | LEU | PHE | VAL | GLU | TRP | LEU | LYS | ASN | D-ALA | NH2 | | |
| Example 51 | D-ARG | LEU | PHE | ILE | GLU | TRP | LEU | LYS | ASN | D-ALA | NH2 | | |
| Example 52 | D-ARG | LEU | PHE | ILE | GLU | TRP | LEU | LYS | ASN | D-ALA | NH2 | | |
| Example 53 | D-ARG | LEU | PHE | ILE | GLU | TRP | LEU | LYS | ASN | D-ALA | NH2 | | |
| Example 54 | D-ARG | LEU | PHE | ILE | GLU | TRP | LEU | LYS | ASN | D-ALA | NH2 | | |
| Example 55 | ARG | LEU | PHE | ILE | GLU | TRP | LEU | LYS | ASN | GLY | GLY | PRO | SER |
| Example 56 | ARG | LEU | PHE | ILE | GLU | TRP | LEU | LYS | ASN | GLY | GLY | PRO | SER |
| Example 57 | ARG | LEU | PHE | ILE | GLU | TRP | LEU | LYS | ASN | GLY | GLY | PRO | SER |
| Example 58 | ARG | LEU | PHE | ILE | GLU | TRP | LEU | LYS | ASN | GLY | GLY | PRO | SER |
| Example 59 | ARG | LEU | PHE | ILE | GLU | TRP | LEU | LYS | ASN | GLY | GLY | PRO | SER |
| Example 60 | ARG | LEU | PHE | ILE | GLU | TRP | LEU | LYS | ASN | BetaALA | GLY | PRO | SER |
| Example 61 | ARG | LEU | PHE | ILE | GLU | TRP | LEU | LYS | ASN | GLY | SER | SER | SER |
| Example 62 | D-ARG | LEU | PHE | tBuALA | GLU | TRP | LEU | LYS | ASN | D-ALA | GLY | PRO | SER |
| Example 63 | ARG | LEU | PHE | ILE | GLU | TRP | LEU | LYS | ASN | D-ALA | GLY | PRO | SER |
| Example 64 | ARG | LEU | PHE | ILE | GLU | TRP | LEU | LYS | ASN | D-ALA | GLY | PRO | SER |
| Example 65 | ARG | LEU | PHE | ILE | GLU | TRP | LEU | LYS | ASN | D-ALA | SER | SER | SER |
| Example 66 | D-ARG | LEU | PHE | tBuALA | GLU | TRP | LEU | LYS | ASN | D-ALA | GLY | PRO | SER |
| Example 67 | D-ARG | LEU | PHE | tBuALA | GLU | TRP | LEU | LYS | ASN | D-ALA | GLY | PRO | SER |
| Example 68 | D-ARG | LEU | PHE | ILE | GLU | TRP | LEU | LYS | ASN | D-ALA | GLY | PRO | SER |
| Example 69 | ARG | LEU | PHE | ILE | GLU | TRP | LEU | LYS | ASN | GLY | GLY | PRO | SER |
| Example 70 | D-ARG | LEU | PHE | ILE | GLU | TRP | LEU | LYS | ASN | D-ALA | GLY | PRO | SER |
| Example 71 | D-ARG | LEU | PHE | ILE | GLU | TRP | LEU | LYS | ASN | D-ALA | GLY | PRO | SER |
| Example 72 | D-ARG | LEU | PHE | ILE | GLU | TRP | LEU | LYS | ASN | D-ALA | GLY | PRO | SER |
| Example 73 | D-ARG | LEU | PHE | ILE | GLU | TRP | LEU | LYS | ASN | D-ALA | GLY | PRO | SER |
| Example 74 | D-ARG | LEU | PHE | ILE | GLU | TRP | LEU | LYS | ASN | D-ALA | GLY | PRO | SER |
| Example 75 | D-ARG | LEU | PHE | ILE | GLU | TRP | LEU | LYS | ASN | D-ALA | GLY | PRO | D-SER |
| Example 76 | D-ARG | LEU | PHE | ILE | GLU | TRP | LEU | LYS | ASN | D-ALA | GLY | PRO | D-SER |
| Example 77 | D-ARG | LEU | PHE | ILE | GLU | TRP | LEU | LYS | ASN | D-ALA | GLY | PRO | SER |
| Example 78 | D-ARG | LEU | PHE | ILE | GLU | TRP | LEU | LYS | ASN | D-ALA | GLY | PRO | D-SER |
| Example 79 | D-ARG | LEU | PHE | ILE | GLU | TRP | LEU | LYS | ASN | D-ALA | GLY | PRO | D-SER |
| Example 80 | D-ARG | LEU | PHE | ILE | GLU | TRP | LEU | LYS | ASN | D-ALA | GLY | PRO | LYS |
| Example 81 | D-ARG | LEU | PHE | ILE | GLU | TRP | LEU | LYS | ASN | D-ALA | GLY | PRO | SER |
| Example 82 | D-ARG | LEU | PHE | ILE | GLU | TRP | LEU | LYS | ASN | D-ALA | GLY | PRO | SER |
| Example 83 | D-ARG | LEU | PHE | ILE | GLU | TRP | LEU | LYS | ASN | D-ALA | GLY | PRO | SER |
| Example 84 | D-ARG | LEU | PHE | ILE | GLU | TRP | LEU | LYS | ASN | D-ALA | GLY | PRO | D-SER |
| Example 85 | D-ARG | LEU | PHE | ILE | GLU | TRP | LEU | LYS | ASN | D-ALA | GLY | PRO | D-SER |

| | AA12 | AA13 | AA14 | AA15 | AA16 | AA17 | AA18 | AA19 |
|---|---|---|---|---|---|---|---|---|
| Example 1 | | | | | | | | |
| Example 2 | | | | | | | | |
| Example 3 | | | | | | | | |
| Example 4 | | | | | | | | |
| Example 5 | | | | | | | | |
| Example 6 | | | | | | | | |
| Example 7 | | | | | | | | |

TABLE 1-continued

| | | | | | | | | | |
|---|---|---|---|---|---|---|---|---|---|
| Example 8 | | | | | | | | | |
| Example 9 | | | | | | | | | |
| Example 10 | | | | | | | | | |
| Example 11 | | | | | | | | | |
| Example 12 | | | | | | | | | |
| Example 13 | | | | | | | | | |
| Example 14 | | | | | | | | | |
| Example 15 | | | | | | | | | |
| Example 16 | | | | | | | | | |
| Example 17 | | | | | | | | | |
| Example 18 | | | | | | | | | |
| Example 19 | | | | | | | | | |
| Example 20 | | | | | | | | | |
| Example 21 | | | | | | | | | |
| Example 22 | | | | | | | | | |
| Example 23 | | | | | | | | | |
| Example 24 | | | | | | | | | |
| Example 25 | | | | | | | | | |
| Example 26 | | | | | | | | | |
| Example 27 | | | | | | | | | |
| Example 28 | | | | | | | | | |
| Example 29 | | | | | | | | | |
| Example 30 | | | | | | | | | |
| Example 31 | | | | | | | | | |
| Example 32 | | | | | | | | | |
| Example 33 | | | | | | | | | |
| Example 34 | | | | | | | | | |
| Example 35 | | | | | | | | | |
| Example 36 | | | | | | | | | |
| Example 37 | | | | | | | | | |
| Example 38 | | | | | | | | | |
| Example 39 | | | | | | | | | |
| Example 40 | | | | | | | | | |
| Example 41 | | | | | | | | | |
| Example 42 | | | | | | | | | |
| Example 43 | | | | | | | | | |
| Example 44 | | | | | | | | | |
| Example 45 | | | | | | | | | |
| Example 46 | | | | | | | | | |
| Example 47 | | | | | | | | | |
| Example 48 | | | | | | | | | |
| Example 49 | | | | | | | | | |
| Example 50 | | | | | | | | | |
| Example 51 | | | | | | | | | |
| Example 52 | | | | | | | | | |
| Example 53 | | | | | | | | | |
| Example 54 | | | | | | | | | |
| Example 55 | SER | NH2 | | | | | | | |
| Example 56 | SER | NH2 | | | | | | | |
| Example 57 | SER | NH2 | | | | | | | |
| Example 58 | PHE | NH2 | | | | | | | |
| Example 59 | SER | NH2 | | | | | | | |
| Example 60 | SER | NH2 | | | | | | | |
| Example 61 | SER | NH2 | | | | | | | |
| Example 62 | SER | GLU | TYR | GLU | LYS-β-ALA-C12 | GLU | TYR | GLU | NH2 |
| Example 63 | SER | SER | SER | SER | SER | NH2 | | | |
| Example 64 | SER | SER | SER | SER | SER | NH2 | | | |
| Example 65 | SER | NH2 | | | | | | | |
| Example 66 | SER | GLU | TYR | GLU | LYS-β-ALA-C12 | GLU | TYR | GLU | NH2 |
| Example 67 | SER | GLU | TYR | GLU | LYS-β-ALA-C12 | GLU | TYR | GLU | NH2 |
| Example 68 | SER | SER | SER | SER | SER | NH2 | | | |
| Example 69 | SER | GLY | ALA | PRO | PRO | PRO | SER | NH2 | |
| Example 70 | SER | GLY | ALA | PRO | PRO | PRO | SER | NH2 | |
| Example 71 | SER | GLY | ALA | PRO | PRO | PRO | SER | NH2 | |
| Example 72 | SER | SER | SER | SER | SER | NH2 | | | |
| Example 73 | SER | SER | SER | SER | SER | NH2 | | | |
| Example 74 | SER | SER | SER | SER | SER | NH2 | | | |
| Example 75 | D-SER | D-SER | D-SER | D-SER | D-SER | NH2 | | | |
| Example 76 | D-SER | D-SER | D-SER | D-SER | D-SER | NH2 | | | |
| Example 77 | SER | GLY | ALA | PRO | PRO | NH2 | | | |
| Example 78 | D-SER | D-SER | D-SER | D-SER | D-SER | NH2 | | | |
| Example 79 | D-SER | D-SER | D-SER | D-SER | D-SER | NH2 | | | |
| Example 80 | LYS | LYS | LYS | LYS | LYS | NH2 | | | |
| Example 81 | SER | GLU | TYR | GLU | LYS-γGlu-2xOEG C18 diacid | GLU | TYR | GLU | NH2 |

TABLE 1-continued
| | | | | | | | | | |
|---|---|---|---|---|---|---|---|---|---|
| Example 82 | SER | GLU | TYR | GLU | LYS-γGlu-2xOEG C18 diacid | GLU | TYR | GLU | NH2 |
| Example 83 | SER | SER | SER | SER | SER | NH2 | | | |
| Example 84 | D-SER | D-SER | D-SER | D-SER | D-SER | NH2 | | | |
| Example 85 | D-SER | D-SER | D-SER | D-SER | D-SER | NH2 | | | |
Standard amino acid symbols are used in Table 1 where appropriate. In cases where a standard symbol is not available, the following representations are used:
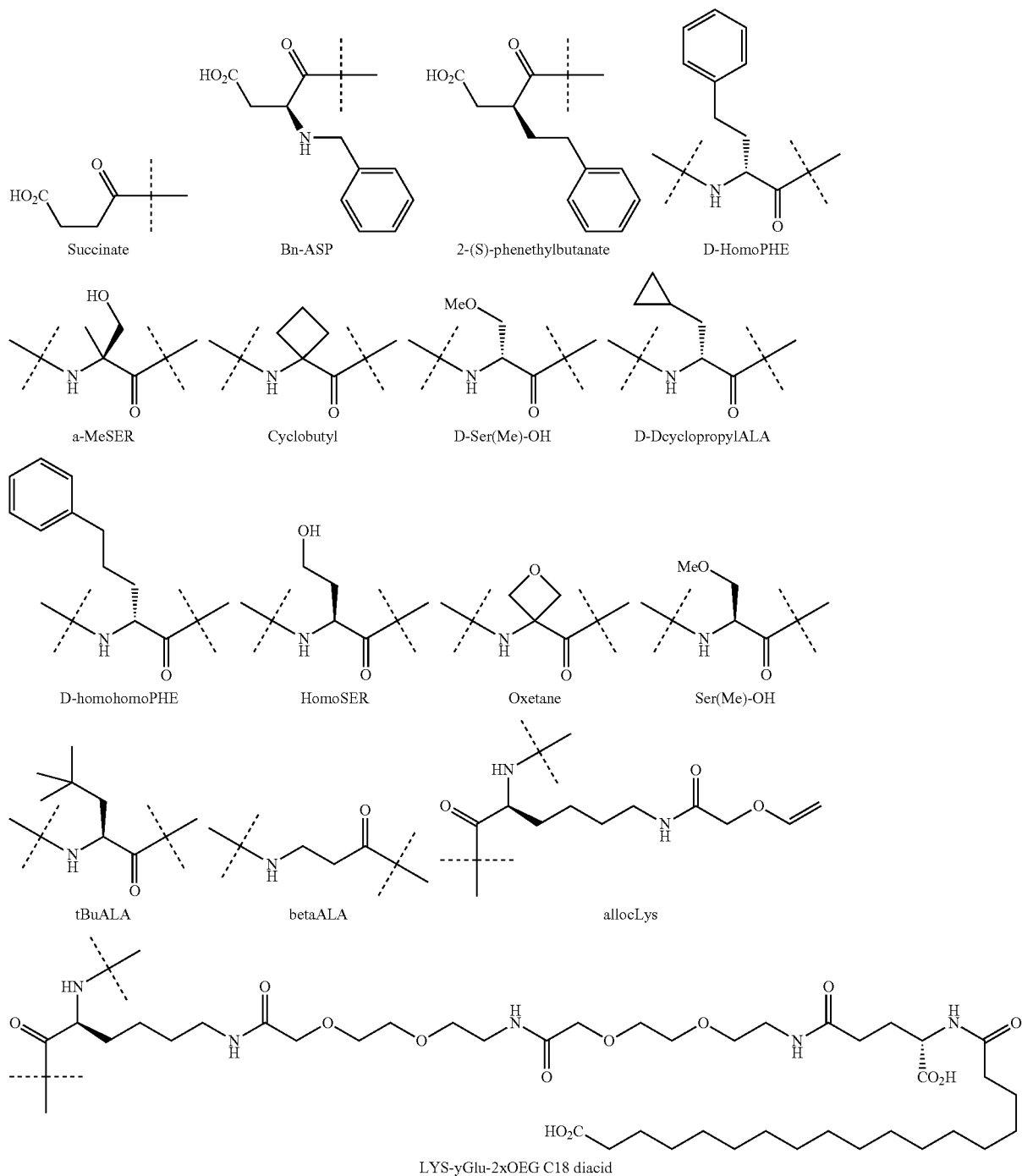

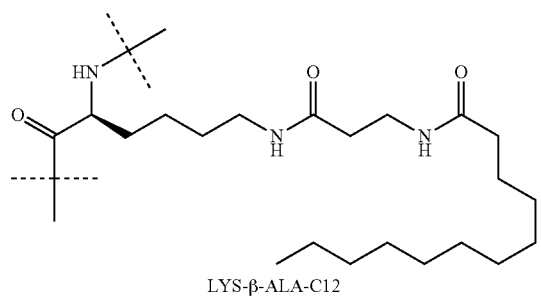

LYS-β-ALA-C12

Specific examples of compounds include compounds having GLP-1 receptor antagonist activity.

The compounds of the invention may be used in a pharmaceutical composition comprising a compound of the invention and a pharmaceutically acceptable excipient.

The compounds of the invention may be used in medicine.

The compounds of the invention may be used in the treatment of disorders associated with GLP-1 receptors.

The compounds of the invention may be used in the treatment of unexplained symptomatic hyperinsulinemia conditions and/or associated hypoglycaemia conditions such as hypoglycemia due to hyperinsulinism associated with leucine sensitivity, hypoglycemia due to hyperinsulinism associated with non-malignant insulinomas, inoperable islet cell adenoma or carcinoma, or extrapancreatic malignancy, hyperinsulinmia and hypoglycaemia in polycystic ovary syndrome, sulphonylurea-induced toxicity in T2DM, Prader-Willi syndrome, Adrenal Insufficiency and Addison's Disease, Beckwith-Wiedemann syndrome, Soto's Syndrome, Costello Syndrome, Timothy Syndrome, Kabuki Syndrome, Congenital Disorders of Glycosylation, Late dumping syndrome, Reactive hypoglycaemia infants of diabetic mothers, Trisomy 13, Central hypoventilation syndrome, Leprechaunism (insulin resistance syndrome), Mosaic Turner Syndrome, Usher Syndrome, Non-insulinoma pancreatogenous hypoglycaemia, Factitious hypoglycaemia, Insulin gene receptor mutations, Insulin autoimmune syndrome, Non-islet cells tumor hypoglycemia (NICTH) and withdrawal from alcoholic and other addictive substances, Definitions In this application, the following definitions apply, unless indicated otherwise.

The term "alkyl", "aryl", and "heteroaryl" are used in their conventional sense (e.g. as defined in the IUPAC Gold Book) unless indicated otherwise.

The term "treatment", in relation to the uses of any of the compounds described herein, including those of the formula (1), is used to describe any form of intervention where a compound is administered to a subject suffering from, or at risk of suffering from, or potentially at risk of suffering from the disease or disorder in question. Thus, the term "treatment" covers both preventative (prophylactic) treatment and treatment where measurable or detectable symptoms of the disease or disorder are being displayed.

The term "effective therapeutic amount" as used herein (for example in relation to methods of treatment of a disorder, disease or condition) refers to an amount of the compound which is effective to produce a desired therapeutic effect. For example, if the condition is pain, then the effective therapeutic amount is an amount sufficient to provide a desired level of pain relief. The desired level of pain relief may be, for example, complete removal of the pain or a reduction in the severity of the pain.

To the extent that any of the compounds described have chiral centres, the present invention extends to all optical isomers of such compounds, whether in the form of racemates or resolved enantiomers. The invention described herein relates to all crystal forms, solvates and hydrates of any of the disclosed compounds however so prepared. To the extent that any of the compounds disclosed herein have acid or basic centres such as carboxylates or amino groups, then all salt forms of said compounds are included herein. In the case of pharmaceutical uses, the salt should be seen as being a pharmaceutically acceptable salt.

Salts or pharmaceutically acceptable salts that may be mentioned include acid addition salts and base addition salts. Such salts may be formed by conventional means, for example by reaction of a free acid or a free base form of a compound with one or more equivalents of an appropriate acid or base, optionally in a solvent, or in a medium in which the salt is insoluble, followed by removal of said solvent, or said medium, using standard techniques (e.g. in vacuo, by freeze-drying or by filtration). Salts may also be prepared by exchanging a counter-ion of a compound in the form of a salt with another counter-ion, for example using a suitable ion exchange resin.

Examples of pharmaceutically acceptable salts include acid addition salts derived from mineral acids and organic acids, and salts derived from metals such as sodium, magnesium, potassium and calcium.

Examples of acid addition salts include acid addition salts formed with acetic, 2,2-dichloroacetic, adipic, alginic, aryl sulfonic acids (e.g. benzenesulfonic, naphthalene-2-sulfonic, naphthalene-1,5-disulfonic and p-toluenesulfonic), ascorbic (e.g. L-ascorbic), L-aspartic, benzoic, 4-acetamidobenzoic, butanoic, (+) camphoric, camphor-sulfonic, (+)-(1S)-camphor-10-sulfonic, capric, caproic, caprylic, cinnamic, citric, cyclamic, dodecylsulfuric, ethane-1,2-disulfonic, ethanesulfonic, 2-hydroxyethanesulfonic, formic, fumaric, galactaric, gentisic, glucoheptonic, gluconic (e.g. D-gluconic), glucuronic (e.g. D-glucuronic), glutamic (e.g. L-glutamic), α-oxoglutaric, glycolic, hippuric, hydrobromic, hydrochloric, hydriodic, isethionic, lactic (e.g. (+)-L-lactic and (±)-DL-lactic), lactobionic, maleic, malic (e.g. (−)-L-malic), malonic, (±)-DL-mandelic, metaphosphoric, methanesulfonic, 1-hydroxy-2-naphthoic, nicotinic, nitric, oleic, orotic, oxalic, palmitic, pamoic, phosphoric, propionic, L-pyroglutamic, salicylic, 4-amino-salicylic, sebacic, stearic, succinic, sulfuric, tannic, tartaric (e.g. (+)-L-tartaric), thiocyanic, undecylenic and valeric acids.

Also encompassed are any solvates of the compounds and their salts. Preferred solvates are solvates formed by the incorporation into the solid state structure (e.g. crystal structure) of the compounds of the invention of molecules of a non-toxic pharmaceutically acceptable solvent (referred to below as the solvating solvent). Examples of such solvents include water, alcohols (such as ethanol, isopropanol and butanol) and dimethylsulfoxide. Solvates can be prepared by recrystallising the compounds of the invention with a solvent or mixture of solvents containing the solvating solvent. Whether or not a solvate has been formed in any given instance can be determined by subjecting crystals of the compound to analysis using well known and standard techniques such as thermogravimetric analysis (TGA), differential scanning calorimetry (DSC) and X-ray crystallography.

The solvates can be stoichiometric or non-stoichiometric solvates. Particular solvates may be hydrates, and examples of hydrates include hemihydrates, monohydrates and dihydrates. For a more detailed discussion of solvates and the methods used to make and characterise them, see Bryn et al, Solid-State Chemistry of Drugs, Second Edition, published by SSCI, Inc of West Lafayette, IN, USA, 1999, ISBN 0-967-06710-3.

The term "pharmaceutical composition" in the context of this invention means a composition comprising an active agent and comprising additionally one or more pharmaceutically acceptable carriers. The composition may further contain ingredients selected from, for example, diluents, adjuvants, excipients, vehicles, preserving agents, fillers, disintegrating agents, wetting agents, emulsifying agents, suspending agents, sweetening agents, flavouring agents, perfuming agents, antibacterial agents, antifungal agents, lubricating agents and dispersing agents, depending on the nature of the mode of administration and dosage forms. The compositions may take the form, for example, of tablets, dragees, powders, elixirs, syrups, liquid preparations including suspensions, sprays, inhalants, tablets, lozenges, emulsions, solutions, cachets, granules, capsules and suppositories, as well as liquid preparations for injections, including liposome preparations.

The compounds of the invention may contain one or more isotopic substitutions, and a reference to a particular element includes within its scope all isotopes of the element. For example, a reference to hydrogen includes within its scope $^1H$, $^2H$ (D), and $^3H$ (T). Similarly, references to carbon and oxygen include within their scope respectively $^{12}C$, $^{13}C$ and $^{14}C$ and $^{16}O$ and $^{18}O$. In an analogous manner, a reference to a particular functional group also includes within its scope isotopic variations, unless the context indicates otherwise. For example, a reference to an alkyl group such as an ethyl group or an alkoxy group such as a methoxy group also covers variations in which one or more of the hydrogen atoms in the group is in the form of a deuterium or tritium isotope, e.g. as in an ethyl group in which all five hydrogen atoms are in the deuterium isotopic form (a perdeuteroethyl group) or a methoxy group in which all three hydrogen atoms are in the deuterium isotopic form (a trideuteromethoxy group). The isotopes may be radioactive or non-radioactive.

Therapeutic dosages may be varied depending upon the requirements of the patient, the severity of the condition being treated, and the compound being employed. Determination of the proper dosage for a particular situation is within the skill of the art. Generally, treatment is initiated with the smaller dosages which are less than the optimum dose of the compound. Thereafter the dosage is increased by small increments until the optimum effect under the circumstances is reached. For convenience, the total daily dosage may be divided and administered in portions during the day if desired.

The magnitude of an effective dose of a compound will, of course, vary with the nature of the severity of the condition to be treated and with the particular compound and its route of administration. The selection of appropriate dosages is within the ability of one of ordinary skill in this art, without undue burden. In general, the daily dose range may be from about 10 μg to about 30 mg per kg body weight of a human and non-human animal, preferably from about 50 μg to about 30 mg per kg of body weight of a human and non-human animal, for example from about 50 μg to about 10 mg per kg of body weight of a human and non-human animal, for example from about 100 μg to about 30 mg per kg of body weight of a human and non-human animal, for example from about 100 μg to about 10 mg per kg of body weight of a human and non-human animal and most preferably from about 100 μg to about 1 mg per kg of body weight of a human and non-human animal.

Pharmaceutical Formulations

While it is possible for the active compound to be administered alone, it is preferable to present it as a pharmaceutical composition (e.g. formulation).

Accordingly, in another embodiment of the invention, there is provided a pharmaceutical composition comprising at least one compound of the formula (1) as defined above together with at least one pharmaceutically acceptable excipient.

The composition may be a composition suitable for injection. The injection may be intra-venous (IV) or subcutaneous. The composition may be supplied in a sterile buffer solution or as a solid which can be suspended or dissolved in sterile buffer for injection.

The pharmaceutically acceptable excipient(s) can be selected from, for example, carriers (e.g. a solid, liquid or semi-solid carrier), adjuvants, diluents (e.g solid diluents such as fillers or bulking agents; and liquid diluents such as solvents and co-solvents), granulating agents, binders, flow aids, coating agents, release-controlling agents (e.g. release retarding or delaying polymers or waxes), binding agents, disintegrants, buffering agents, lubricants, preservatives, anti-fungal and antibacterial agents, antioxidants, buffering agents, tonicity-adjusting agents, thickening agents, flavouring agents, sweeteners, pigments, plasticizers, taste masking agents, stabilisers or any other excipients conventionally used in pharmaceutical compositions.

The term "pharmaceutically acceptable" as used herein means compounds, materials, compositions, and/or dosage forms which are, within the scope of sound medical judgment, suitable for use in contact with the tissues of a subject (e.g. a human subject) without excessive toxicity, irritation, allergic response, or other problem or complication, commensurate with a reasonable benefit/risk ratio. Each excipient must also be "acceptable" in the sense of being compatible with the other ingredients of the formulation.

Pharmaceutical compositions containing compounds of the formula (1) can be formulated in accordance with known techniques, see for example, Remington's Pharmaceutical Sciences, Mack Publishing Company, Easton, PA, USA.

Suitable formulations typically contain 0-20% (w/w) buffers, 0-50% (w/w) cosolvents, and/or 0-99% (w/w) Water for Injection (WFI) (depending on dose and if freeze dried). Formulations for intramuscular depots may also contain 0-99% (w/w) oils.

The compounds of the formula (1) will generally be presented in unit dosage form and, as such, will typically contain sufficient compound to provide a desired level of biological activity. For example, a formulation may contain from 1 nanogram to 2 grams of active ingredient, e.g. from 1 nanogram to 2 milligrams of active ingredient. Within these ranges, particular sub-ranges of compound are 0.1 milligrams to 2 grams of active ingredient (more usually from 10 milligrams to 1 gram, e.g. 50 milligrams to 500 milligrams), or 1 microgram to 20 milligrams (for example 1 microgram to 10 milligrams, e.g. 0.1 milligrams to 2 milligrams of active ingredient).

The active compound will be administered to a patient in need thereof (for example a human or animal patient) in an amount sufficient to achieve the desired therapeutic effect (effective amount). The precise amounts of compound administered may be determined by a supervising physician in accordance with standard procedures.

EXAMPLES

The invention will now be illustrated, but not limited, by reference to the specific embodiments described in the following examples.

Examples 1 to 85

The compounds of Examples 1 to 85 shown in Table 1 above have been prepared. Their LCMS properties and the methods used to prepare them are set out in Table 2. The starting materials for each of the Examples are commercial unless indicated otherwise.

General Procedures

Where no preparative routes are included, the relevant intermediate is commercially available. Commercial reagents were utilized without further purification. Room temperature (rt) refers to approximately 20-27° C.

Analytical Methods

LCMS analysis of compounds was performed under electrospray conditions.

Analytical Method A

MS ion determined using LCMS method below under electrospray conditions, HPLC retention time ($R_T$) determined using HPLC method below, purity >95% by HPLC unless indicated. LCMS: Agilent 1200 HPLC&6410B Triple Quad, Column: Xbridge C18 3.5 um 2.1*30 mm. Gradient [time (min)/solvent B (%)]:0.0/10, 0.9/80, 1.5/90, 8.5/5, 1.51/10. (Solvent A=1 mL of TFA in 1000 mL Water; Solvent B=1 mL of TFA in 1000 mL of MeCN); Injection volume 5 µL (may vary); UV detection 220 nm 254 nm 210 nm; Column temperature 25° C.; 1.0 mL/min. HPLC: Agilent Technologies 1200, Column: Gemini-NX C18 5 um 110 A 150*4.6 mm. Gradient [time (min)/solvent B (%)]:0.0/30, 20/60, 20.1/90, 23/90. (Solvent A=1 mL of TFA in 1000 mL Water; Solvent B=1 mL of TFA in 1000 mL of MeCN); Injection volume 5 µL (may vary); UV detection 220 nm 254 nm; Column temperature 25° C.; 1.0 mL/min Analytical Method B1

Instrument: Thermo Scientific Orbitrap Fusion; Column: Phenomenex Kinetex Biphenyl 100 Å, 2.6 µm, 2.1×50 mm; Gradient [time (min)/solvent B in A (%)]: 0.00/10, 0.30/10, 0.40/60, 1.10/90, 1.70/90, 1.75/10, 1.99/10, 2.00/10; Solvents: Solvent A=0.1% formic acid in water; Solvent B=0.1% formic acid in acetonitrile; Injection volume 5 µL; Column temperature 25° C.; Flow rate 0.8 mL/min.

Analytical Method B2

Instrument: Thermo Scientific Orbitrap Fusion; Column: Phenomenex Luna Omega C18 100 Å, 1.6 µm, 2.1×50 mm; Gradient [time (min)/solvent B in A (%)]: 0.00/10, 0.30/10, 0.40/60, 1.10/90, 1.70/90, 1.75/10, 1.99/10, 2.00/10; Solvents: Solvent A=0.1% formic acid in water; Solvent B=0.1% formic acid in acetonitrile; Injection volume 5 µL; Column temperature 25° C.; Flow rate 0.8 mL/min.

Synthesis of Intermediates and Compounds

The following examples are provided to illustrate preferred aspects of the invention and are not intended to limit the scope of the invention. All Fmoc-amino acids are commercially available

Synthesis of Examples 1-85

Standard Fmoc solid phase peptide synthesis (SPPS) was used to synthesize the linear peptides which were then cleaved from the resin and purified.

General method for Peptide Synthesis: The peptide was synthesized using standard Fmoc chemistry.

Method a—Exemplified by the Synthesis of Example 24

1) Add DCM to the vessel containing Rink amide MBHA Resin (sub: 0.35 mmol/g, 1.0 mmol, 2.86 g) and swell for 2 hours.
2) Drain and then wash with DMF (5 times, drain between each wash).
3) A solution of 20% piperidine in DMF was added agitate with $N_2$ bubbling for 30 min.
4) Drain and wash with DMF (5 times, drain between each wash).
5) Add Fmoc-amino acid solution (3.0 equivalents in DMF) and mix for 30 seconds, then add activation buffer (HBTU (2.85 equivalents) and DIEA (6 equivalents) in DMF), agitate with $N_2$ bubbling for 1 hour.
6) The coupling reaction was monitored by ninhydrin test
7) If required repeat steps 4 to 6 for same amino acid coupling if inefficient coupling occurs
8) Repeat steps 2 to 6 for next amino acid coupling.

Peptide Cleavage and Purification:
1) Add cleavage buffer (92.5% TFA/2.5% EDT/2.5% TIS/2.5% H₂O) to the flask containing the side chain protected peptide at room temperature and stir for 3 hours.
2) The peptide is precipitated with cold tert-butyl methyl ether and centrifuged (3 min at 3000 rpm).
3) Reaction mixture was filtered and filtrate collected.
4) Residue washed with tert-butyl methyl ether (2 times).
5) Crude peptide was dried under vacuum for 2 hours.
6) The crude peptide was purified by prep-HPLC. Prep-HPLC Conditions: Instrument: Gilson 281. Solvent: A—0.1% TFA in H₂O, B—acetonitrile, Column: Luna C18 (200×25 mm; 10 μm) and Gemini C18 (150*30 mm; 5 μm) in series. Gradient [time (min)/solvent B (%)]:0.0/25, 60.0/55, 60.1/90, 70/90, 70.1/10, at 20 mL/min with UV detection (wave length=215/254 nm). Residue was re-purified by prep-HPLC. Prep-HPLC Conditions: Instrument: Gilson 281. Solvent: A—0.5% AcOH in H₂O, B—acetonitrile, Column: Luna C18 (200×25 mm; 10 μm) and Gemini C18 (150*30 mm; 5 μm) in series. Gradient [time (min)/solvent B (%)]:0.0/20, 60.0/50, 60.1/90, 70/90, 70.1/10, at 20 mL/min with UV detection (wave length=215/254 nm) and then lyophilized to give Example 24 (377.6 mg, 14.0% yield).

Method b—Pseudoprolines method, Exemplified by the Synthesis of Example 63

1) Add DCM to the vessel containing Rink amide MBHA Resin (sub: 0.69 mmol/g, 20 mmol, 29.0 g) and swell for 2 hours.
2) Drain and then wash with DMF (5 times, drain between each wash).
3) A solution of 20% piperidine in DMF was added agitate with N₂ bubbling for 30 min.
4) Drain and wash with DMF (5 times, drain between each wash).
5) Add Fmoc-amino acid solution (3.0 equivalents in DMF) and mix for 30 seconds, then add activation buffer (HBTU (2.85 equivalents) and DIEA (6 equivalents) in DMF), agitate with N₂ bubbling for 1 hour.
6) The coupling reaction was monitored by ninhydrin test
7) If required repeat steps 2 to 5 for same amino acid coupling if inefficient coupling occurs
8) Repeat steps 2 to 5 for next amino acid coupling.

Note: for the amino acids in the table below different equivalents and coupling agents were used.

Peptide Cleavage and Purification:
1) Add cleavage buffer (92.5% TFA/2.5% EDT/2.5% TIS/2.5% H₂O) to the flask containing the side chain protected peptide at room temperature and stir for 3 hours.
2) Reaction mixture was filtered and filtrate collected.
3) The peptide is precipitated with cold isopropyl ether and centrifuged (3 min at 3000 rpm).
4) Residue washed with isopropyl ether (2 times).
5) Crude peptide dried in vacuo for 2 hours.
6) The crude peptide was purified by prep-HPLC (A: 0.01 M NH4HCO3, B: MeCN). Prep-HPLC Conditions: Agilent SD-1. Solvent: A—0.01 M NH4HCO3 in H2O, B—acetonitrile, Column: Luna 80*250 mm, C18*10 μm, 110 A. Gradient [time (min)/solvent B (%)]: 0.0/30, 60.0/60, 60.1/90, 70/90, 70.1/10. Then re-purified by prep-HPLC (A: 0.075% TFA in H2O, B: MeCN), Prep-HPLC Conditions: Instrument: Agilent SD-1. Solvent: A—0.075% TFA in H2O, B—acetonitrile, Column: Luna 80*250 mm, C18*10 μm, 110 A. Gradient [time (min)/solvent B (%)]: 0.0/30, 60.0/60, 60.1/90, 70/90, 70.1/10. Then used the prep-HPLC (A: 0.5% Acetic Acid in H2O, B: MeCN) to give Example 63 (11.3 g, 16.7% yield).

Method c—Exemplified by the Synthesis of Example 85

1) Add DCM to the vessel containing Rink amide MBHA Resin (sub: 0.69 mmol/g, 20 mmol, 29.0 g) and swell for 2 hours.
2) Drain and then wash with DMF (5 times, drain between each wash).
3) A solution of 20% piperidine in DMF was added agitate with N₂ bubbling for 30 min.
4) Drain and wash with DMF (5 times, drain between each wash).
5) Add Fmoc-amino acid solution (3.0 equivalents in DMF) and mix for 30 seconds, then add activation buffer (HBTU (2.85 equivalents) and DIEA (6 equivalents) in DMF), agitate with N₂ bubbling for 1 hour.
6) The coupling reaction was monitored by ninhydrin test
7) If required repeat steps 2 to 5 for same amino acid coupling if inefficient coupling occurs
8) Repeat steps 2 to 5 for next amino acid coupling.

Note: for the amino acids in the table below different protecting groups, equivalents and/or coupling agents were used

| Step | Materials | Coupling reagents |
| --- | --- | --- |
| 5 and 6 | Fmoc-Ser(tBu)-Ser(Psi(Me,Me) Pro)-OH (2.0 eq) | HATU (1.9 eq) and DIEA (4.0 eq) |
| 27 | Fmoc-D-HomePhe-OH (2.0 eq) | HATU (1.9 eq) and DIEA (4.0 eq) |
| 29 | (S)-2-(benzylamino)-4-(tert-butoxy)-4-oxobutanoic acid (2.0 eq) | DIC (2.0 eq) and HOAt (2.0 eq) |

| Step | Materials | Coupling reagents |
|---|---|---|
| 3 | Fmoc-D-Ser(Trt)-OH (3.0 eq) | HBTU (2.85 eq) and DIEA (6.0 eq) |
| 6 | Fmoc-D-Ser(Trt)-OH (3.0 eq) | HBTU (2.85 eq) and DIEA (6.0 eq) |
| 29 | (S)-2-(benzylamino)-4-(tert-butoxy)-4-oxobutanoic acid (2.0 eq) | DIC (2.0 eq) and HOAt (2.0 eq) |

Peptide Cleavage and Purification:
1) Add cleavage buffer (92.5% TFA/2.5% EDT/2.5% TIS/2.5% H₂O) to the flask containing the side chain protected peptide at room temperature and stir for 3 hours.
2) Reaction mixture was filtered and filtrate collected.
3) The peptide is precipitated with cold isopropyl ether and centrifuged (3 min at 3000 rpm).
4) Residue washed with isopropyl ether (2 times).
5) Crude peptide dried in vacuo for 2 hours.
6) The crude peptide was purified by prep-HPLC (A: 0.01 M NH4HCO3, B: MeCN). Prep-HPLC Conditions: Agilent SD-1. Solvent: A—0.01 M NH4HCO3 in H2O, B—acetonitrile, Column: Luna 80*250 mm, C18*10 μm, 110 A. Gradient [time (min)/solvent B (%)]: 0.0/30, 60.0/60, 60.1/90, 70/90, 70.1/10. Then re-purified by prep-HPLC (A: 0.075% TFA in H2O, B: MeCN), Prep-HPLC Conditions: Instrument: Agilent SD-1. Solvent: A—0.075% TFA in H2O, B—acetonitrile, Column: Luna 80*250 mm, C18*10 μm, 110 A. Gradient [time (min)/solvent B (%)]: 0.0/30, 60.0/60, 60.1/90, 70/90, 70.1/10. Then used the prep-HPLC (A: 0.5% Acetic Acid in H2O, B: MeCN) to give Example 85 (15.6 g, 9.45% yield).

TABLE 2

HRMS and LCMS properties of purified peptides represented by Examples 1-85

| Example | Synthetic Method | HRMS | HRMS Method | LCMS/HPLC (Method A) |
|---|---|---|---|---|
| 1 | a | HRMS (HESI/FT) m/z: $[M + 3H]^{3+}$ Calcd for $C_{120}H_{189}N_{30}O_{33}$ 2575.3799; Found 859.4693 | B1 | m/z 859.8 $[M + 3H]^{3+}$, $R_T$ = 12.21 min |
| 2 | a | HRMS (HESI/FT) m/z: $[M + 3H]^{3+}$ Calcd for $C_{121}H_{191}N_{30}O_{33}$ 2589.3955; Found 864.1394 | B1 | m/z 864.3 $[M + 3H]^{3+}$, $R_T$ = 12.55 min |
| 3 | a | HRMS (HESI/FT) m/z: $[M + 3H]^{3+}$ Calcd for $C_{121}H_{191}N_{30}O_{33}$ 2589.3955; Found 864.1402 | B1 | m/z 864.2 $[M + 3H]^{3+}$, $R_T$ = 12.71 min |
| 4 | a | HRMS (HESI/FT) m/z: $[M + 3H]^{3+}$ Calcd for $C_{127}H_{195}N_{30}O_{33}$ 2665.4268; Found 889.4853 | B1 | m/z 889.6 $[M + 3H]^{3+}$, $R_T$ = 12.49 min |
| 5 | a | HRMS (HESI/FT) m/z: $[M + 3H]^{3+}$ Calcd for $C_{122}H_{192}N_{29}O_{33}$ 2588.4001; Found 863.8101 | B1 | m/z 864.1 $[M + 3H]^{3+}$, $R_T$ = 11.42 min |
| 6 | a | HRMS (HESI/FT) m/z: $[M + 2H]^{2+}$ Calcd for $C_{127}H_{197}N_{29}O_{35}$ 2686.437; Found 1344.2273 | B1 | m/z 896.8 $[M + 3H]^{3+}$, $R_T$ = 11.53 min |
| 7 | a | HRMS (HESI/FT) m/z: $[M + 3H]^{3+}$ Calcd for $C_{121}H_{190}N_{29}O_{33}$ 2574.3845; Found 859.1348 | B1 | m/z 859.3 $[M + 3H]^{3+}$, $R_T$ =11.09 min |
| 8 | a | HRMS (HESI/FT) m/z: $[M + 3H]^{3+}$ Calcd for $C_{158}H_{255}N_{32}O_{45}$ 3317.8416; Found 1106.9577 | B1 | m/z 1107.5 $[M + 3H]^{3+}$, $R_T$ = 14.92 min |
| 9 | a | ND | | m/z 894.4 $[M + 3H]^{3+}$, $R_T$ = 9.60 min |
| 10 | a | HRMS (HESI/FT) m/z: $[M + 2H]^{2+}$ Calcd for $C_{127}H_{198}N_{29}O_{35}$ 2686.437; Found 1344.2269 | B1 | m/z 896.8 $[M + 3H]^{3+}$, $R_T$ = 11.74 min |
| 11 | a | HRMS (HESI/FT) m/z: $[M + 3H]^{3+}$ Calcd for $C_{158}H_{255}N_{32}O_{45}$ 3317.8416; Found 1106.9618 | B1 | m/z 1107.7 $[M + 3H]^{3+}$, $R_T$ = 10.89 min |
| 12 | a | ND | | m/z 859.4 $[M + 3H]^{3+}$, $R_T$ = 7.59 min |
| 13 | a | HRMS (HESI/FT) m/z: $[M + 3H]^{3+}$ Calcd for $C_{122}H_{192}N_{29}O_{33}$ 2588.4001; Found 863.8097 | B1 | m/z 864.2 $[M + 3H]^{3+}$, $R_T$ = 13.93 min |
| 14 | a | ND | | m/z 859.5 $[M + 3H]^{3+}$, $R_T$ = 11.04 min |
| 15 | a | HRMS (HESI/FT) m/z: $[M + 3H]^{3+}$ Calcd for $C_{156}H_{251}N_{32}O_{45}$ 3289.8101; Found 1097.6165 | B1 | m/z 1097.9 $[M + 3H]^{3+}$, $R_T$ = 9.12 min |
| 16 | a | HRMS (HESI/FT) m/z: $[M + 3H]^{3+}$ Calcd for $C_{156}H_{251}N_{32}O_{45}$ 3289.8101; Found 1097.6158 | B1 | m/z 1097.9 $[M + 3H]^{3+}$, $R_T$ = 12.52 min |
| 17 | a | HRMS (HESI/FT) m/z: $[M + 3H]^{3+}$ Calcd for $C_{122}H_{193}N_{30}O_{33}S$ 2603.4111; Found 868.8140 | B1 | m/z 869.0 $[M + 3H]^{3+}$, $R_T$ = 13.04 min |
| 18 | a | HRMS (HESI/FT) m/z: $[M + 3H]^{3+}$ Calcd for $C_{122}H_{192}N_{29}O_{33}$ 2588.4001; Found 863.8103 | B1 | m/z 864.2 $[M + 3H]^{3+}$, $R_T$ = 11.74 min |
| 19 | a | HRMS (HESI/FT) m/z: $[M + 3H]^{3+}$ Calcd for $C_{157}H_{253}N_{32}O_{45}$ 3303.8257; Found 1102.2851 | B1 | m/z 1102.7 $[M + 3H]^{3+}$, $R_T$ = 12.46 min |
| 20 | a | HRMS (HESI/FT) m/z: $[M + 3H]^{3+}$ Calcd for $C_{122}H_{193}N_{30}O_{33}$ 2603.4111; Found 868.8129 | B1 | m/z 869.1 $[M + 3H]^{3+}$, $R_T$ = 9.41 min |
| 21 | a | HRMS (HESI/FT) m/z: $[M + 3H]^{3+}$ Calcd for $C_{157}H_{251}N_{33}O_{44}$ 3302.8418; Found 1101.9560 | B1 | m/z 1102.1 $[M + 3H]^{3+}$, $R_T$ = 9.16 min |
| 22 | a | HRMS (HESI/FT) m/z: $[M + 3H]^{3+}$ Calcd for $C_{122}H_{193}N_{30}O_{32}$ 2587.4163; Found 863.4864 | B2 | m/z 863.6 $[M + 3H]^{3+}$, $R_T$ =11.38 min |
| 23 | a | HRMS (HESI/FT) m/z: $[M + 3H]^{3+}$ Calcd for $C_{129}H_{198}N_{29}O_{33}$ 2678.4473; Found 893.8291 | B2 | m/z 894.6 $[M + 3H]^{3+}$, $R_T$ = 9.59 min |
| 24 | a | HRMS (HESI/FT) m/z: $[M + 3H]^{3+}$ Calcd for $C_{129}H_{199}N_{30}O_{33}$ 2693.458; Found 898.8311 | B2 | m/z 898.9 $[M + 3H]^{3+}$, $R_T$ = 8.39 min |

TABLE 2-continued

HRMS and LCMS properties of purified peptides represented by Examples 1-85

| Example | Synthetic Method | HRMS | HRMS Method | LCMS/HPLC (Method A) |
|---|---|---|---|---|
| 25 | a | HRMS (HESI/FT) m/z: [M + 3H]$^{3+}$ Calcd for C129H199N30O33 2693.458; Found 898.8269 | B1 | m/z 899.2 [M + 3H]$^{3+}$, $R_T$ = 14.14 min |
| 26 | a | HRMS (HESI/FT) m/z: [M + 3H]$^{3+}$ Calcd for C163H259N34O44 3393.884; Found 1132.6339 | B1 | m/z 1133.1 [M + 3H]$^{3+}$, $R_T$ = 9.78 min |
| 27 | a | HRMS (HESI/FT) m/z: [M + 3H]$^{3+}$ Calcd for C118H193N30O33 2555.4111; Found 852.8142 | B1 | m/z 853.1 [M + 3H]$^{3+}$, $R_T$ = 12.73 min |
| 28 | a | HRMS (HESI/FT) m/z: [M + 3H]$^{3+}$ Calcd for C122H193N30O34 2619.406; Found 874.1465 | B1 | m/z 874.5 [M + 3H]$^{3+}$, $R_T$ = 12.74 min |
| 29 | a | HRMS (HESI/FT) m/z: [M + 3H]$^{3+}$ Calcd for C129H199N30O33 2693.458; Found 898.8323 | B2 | m/z 898.8 [M + 3H]$^{3+}$, $R_T$ = 13.33 min |
| 30 | a | HRMS (HESI/FT) m/z: [M + 3H]$^{3+}$ Calcd for C129H199N30O33 2693.458; Found 898.8303 | B1 | m/z 899.0 [M + 3H]$^{3+}$, $R_T$ =10.15 min |
| 31 | a | HRMS (HESI/FT) m/z: [M + 3H]$^{3+}$ Calcd for C122H193N30O34 2619.406; Found 874.1415 | B1 | m/z 874.6 [M + 3H]$^{3+}$, $R_T$ = 12.31 min |
| 32 | a | HRMS (HESI/FT) m/z: [M + 3H]$^{3+}$ Calcd for C125H199N30O33 2645.458; Found 882.8307 | B1 | m/z 883.1 [M + 3H]$^{3+}$, $R_T$ = 9.66 min |
| 33 | a | HRMS (HESI/FT) m/z: [M + 3H]$^{3+}$ Calcd for C164H260N33O45 3408.8836; Found 1137.3051 | B1 | m/z 1137.9 [M + 3H]$^{3+}$, $R_T$ = 12.91 min |
| 34 | a | HRMS (HESI/FT) m/z: [M + 3H]$^{3+}$ Calcd for C122H193N30O33 2603.4111; Found 868.8139 | B1 | m/z 868.9 [M + 3H]$^{3+}$, $R_T$ = 10.36 min |
| 35 | a | HRMS (HESI/FT) m/z: [M + 3H]$^{3+}$ Calcd for C125H199N30O33 2645.458; Found 882.8299 | B1 | m/z 883.2 [M + 3H]$^{3+}$, $R_T$ = 12.39 min |
| 36 | a | HRMS (HESI/FT) m/z: [M + 3H]$^{3+}$ Calcd for C118H192N29O33 2540.4001; Found 847.8078 | B1 | m/z 848.2 [M + 3H]$^{3+}$, $R_T$ = 11.14 min |
| 37 | a | HRMS (HESI/FT) m/z: [M + 3H]$^{3+}$ Calcd for C125H197N30O33 2643.4424; Found 882.1548 | B1 | m/z 882.5 [M + 3H]$^{3+}$, $R_T$ = 8.68 min |
| 38 | a | HRMS (HESI/FT) m/z: [M + 3H]$^{3+}$ Calcd for C118H190N29O33 2538.3845; Found 847.1428 | B2 | m/z 847.3 [M + 3H]$^{3+}$, $R_T$ = 13.49 min |
| 39 | a | HRMS (HESI/FT) m/z: [M + 3H]$^{3+}$ Calcd for C126H197N30O33 2657.458; Found 886.8297 | B1 | m/z 887.1 [M + 3H]$^{3+}$, $R_T$ = 12.23 min |
| 40 | a | HRMS (HESI/FT) m/z: [M + 3H]$^{3+}$ Calcd for C119H192N29O33 2552.4001; Found 851.8097 | B1 | m/z 852.1 [M + 3H]$^{3+}$, $R_T$ = 10.71 min |
| 41 | a | HRMS (HESI/FT) m/z: [M + 3H]$^{3+}$ Calcd for C122H192N29O34 2604.3953; Found 869.1420 | B1 | m/z 869.3 [M + 3H]$^{3+}$, $R_T$ = 14.00 min |
| 42 | a | HRMS (HESI/FT) m/z: [M + 3H]$^{3+}$ Calcd for C122H192N29O34 2604.3953; Found 869.1414 | B1 | m/z 869.3 [M + 3H]$^{3+}$, $R_T$ = 12.25 min |
| 43 | a | HRMS (HESI/FT) m/z: [M + 3H]$^{3+}$ Calcd for C123H192N30O33 2617.4268; Found 873.4864 | B1 | m/z 873.4 [M + 3H]$^{3+}$, $R_T$ = 14.31 min |
| 44 | a | HRMS (HESI/FT) m/z: [M + 3H]$^{3+}$ Calcd for C123H195N30O33 2617.4268; Found 873.8203 | B2 | m/z 873.7 [M + 3H]$^{3+}$, $R_T$ = 10.84 min |
| 45 | a | HRMS (HESI/FT) m/z: [M + 3H]$^{3+}$ Calcd for C123H195N30O34 2633.4216; Found 878.8171 | B1 | m/z 878.8 [M + 3H]$^{3+}$, $R_T$ = 12.40 min |
| 46 | a | HRMS (HESI/FT) m/z: [M + 3H]$^{3+}$ Calcd for C123H195N30O34 2633.4216; Found 878.8177 | B1 | m/z 879.0 [M + 3H]$^{3+}$, $R_T$ = 13.31 min |
| 47 | a | HRMS (HESI/FT) m/z: [M + 3H]$^{3+}$ Calcd for C123H195N30O34 2633.4216; Found 878.8211 | B2 | m/z 878.8 [M + 3H]$^{3+}$, $R_T$ = 13.06 min |
| 48 | a | HRMS (HESI/FT) m/z: [M + 3H]$^{3+}$ Calcd for C122H193N30O33 2603.4111; Found 868.8184 | B2 | m/z 868.9 [M + 3H]$^{3+}$, $R_T$ = 10.34 min |
| 49 | a | HRMS (HESI/FT) m/z: [M + 3H]$^{3+}$ Calcd for C123H195N30O33 2617.4268; Found 873.4885 | B2 | m/z 873.6 [M + 3H]$^{3+}$, $R_T$ = 10.92 min |
| 50 | a | HRMS (HESI/FT) m/z: [M + 3H]$^{3+}$ Calcd for C121H191N30O33 2589.3955; Found 864.1454 | B2 | m/z 864.2 [M + 3H]$^{3+}$, $R_T$ = 13.68 min |
| 51 | a | HRMS (HESI/FT) m/z: [M + 3H]$^{3+}$ Calcd for C123H195N30O34 2633.4216; Found 878.8212 | B2 | m/z 878.9 [M + 3H]$^{3+}$, $R_T$ = 13.72 min |
| 52 | a | HRMS (HESI/FT) m/z: [M + 3H]$^{3+}$ Calcd for C124H195N30O33 2629.4268; Found 877.4890 | B2 | m/z 877.5 [M + 3H]$^{3+}$, $R_T$ = 12.20 min |
| 53 | a | HRMS (HESI/FT) m/z: [M + 3H]$^{3+}$ Calcd for C123H195N30O33 2617.4268; Found 873.4894 | B2 | m/z 873.7 [M + 3H]$^{3+}$, $R_T$ =11.77 min |
| 54 | a | HRMS (HESI/FT) m/z: [M + 3H]$^{3+}$ Calcd for C123H193N30O34 2631.406; Found 878.1494 | B2 | m/z 878.0 [M + 3H]$^{3+}$, $R_T$ = 13.91 min |
| 55 | a | HRMS (HESI/FT) m/z: [M + 3H]$^{3+}$ Calcd for C133H209N34O39 2903.5181; Found 968.8527 | B2 | m/z 969.1 [M + 3H]$^{3+}$, $R_T$ = 10.39 min |
| 56 | a | HRMS (HESI/FT) m/z: [M + 3H]$^{3+}$ Calcd for C134H211N34O39 2917.5337; Found 973.5199 | B1 | m/z 973.5 [M + 3H]$^{3+}$, $R_T$ = 13.96 min |
| 57 | a | HRMS (HESI/FT) m/z: [M + 3H]$^{3+}$ Calcd for C133H208N33O39 2888.5073; Found 963.8461 | B1 | m/z 963.9 [M + 3H]$^{3+}$, $R_T$ = 12.24 min |
| 58 | a | HRMS (HESI/FT) m/z: [M + 3H]$^{3+}$ Calcd for C139H212N33O38 2948.5437; Found 983.8103 | B2 | m/z 984.0 [M + 3H]$^{3+}$, $R_T$ = 13.83 min |
| 59 | a | HRMS (HESI/FT) m/z: [M + 3H]$^{3+}$ Calcd for C133H209N34O39 2903.5181; Found 968.8477 | B1 | m/z 969.2 [M + 3H]$^{3+}$, $R_T$ = 13.81 min |
| 60 | a | HRMS (HESI/FT) m/z: [M + 3H]$^{3+}$ Calcd for C134H211N34O39 2917.5337; Found 973.5238 | B1 | m/z 973.8 [M + 3H]$^{3+}$, $R_T$ = 10.44 min |
| 61 | a | HRMS (HESI/FT) m/z: [M + 3H]$^{3+}$ Calcd for C140H217N34O41 3027.5706; Found 1010.2023 | B2 | m/z 1010.5 [M + 3H]$^{3+}$, $R_T$ = 9.25 min |

TABLE 2-continued

HRMS and LCMS properties of purified peptides represented by Examples 1-85

| Example | Synthetic Method | HRMS | HRMS Method | LCMS/HPLC (Method A) |
|---|---|---|---|---|
| 62 | a | HRMS (HESI/FT) m/z: [M + 4H]$^{4+}$ Calcd for C202H307N43O58 4259.208; Found 1065.8148 | B1 | m/z 1421.2 [M + 3H]$^{3+}$, $R_T$ = 11.74 min |
| 63 | b | HRMS (HESI/FT) m/z: [M + 3H]$^{3+}$ Calcd for C154H239N38O47 3369.7246; Found 1124.2550 | B2 | m/z 1124.4 [M + 3H]$^{3+}$, $R_T$ = 9.77 min |
| 64 | b | HRMS (HESI/FT) m/z: [M + 3H]$^{3+}$ Calcd for C147H232N37O47 3264.6667; Found 1089.2328 | B1 | m/z 1089.0 [M + 3H]$^{3+}$, $R_T$ = 14.42 min |
| 65 | a | HRMS (HESI/FT) m/z: [M + 3H]$^{3+}$ Calcd for C134H212N33O41 2936.5283; Found 979.8584 | B2 | m/z 980.1 [M + 3H]$^{3+}$, $R_T$ = 12.15 min |
| 66 | a | HRMS (HESI/FT) m/z: [M + 3H]$^{3+}$ Calcd for C195H299N42O58 4154.1504; Found 1385.7322 | B1 | m/z 1386.5 [M + 3H]$^{3+}$, $R_T$ = 12.77 min |
| 67 | a | HRMS (HESI/FT) m/z: [M + 4H]$^{4+}$ Calcd for C195H297N43O59 4185.1563; Found 1047.3042 | B1 | m/z 1269.5 [M + 3H]$^{3+}$, $R_T$ = 12.88 min |
| 68 | c | HRMS (HESI/FT) m/z: [M + 3H]$^{3+}$ Calcd for C147H233N38O47 3279.6775; Found 1094.2364 | B1 | m/z 1094.3 [M + 3H]$^{3+}$, $R_T$ = 10.81 min |
| 69 | a | HRMS (HESI/FT) m/z: [M + 3H]$^{3+}$ Calcd for C184H298N43O59S 4083.1125; Found 1362.0493 | B1 | m/z 1362.5 [M + 3H]$^{3+}$, $R_T$ = 13.81 min |
| 70 | a | HRMS (HESI/FT) m/z: [M + 4H]$^{4+}$ Calcd for C158H248N40O47 3453.7932; Found 864.4594 | B1 | m/z 1152.5 [M + 3H]$^{3+}$, $R_T$ = 12.86 min |
| 71 | a | HRMS (HESI/FT) m/z: [M + 3H]$^{3+}$ Calcd for C193H308N43O59 4169.2188; Found 1390.7396 | B2 | m/z 1391.1 [M+3H]$^{3+}$, $R_T$ = 11.68 min |
| 72 | c | HRMS (HESI/FT) m/z: [M + 3H]$^{3+}$ Calcd for C148H235N38O47 3293.6931; Found 1098.9091 | B1 | m/z 1099.1 [M + 3H]$^{3+}$, $R_T$ = 11.32 min |
| 73 | c | HRMS (HESI/FT) m/z: [M + 3H]$^{3+}$ Calcd for C147H233N38O47 3279.6775; Found 1094.2365 | B1 | m/z 1094.7 [M + 3H]$^{3+}$, $R_T$ = 10.78 min |
| 74 | c | HRMS (HESI/FT) m/z: [M + 3H]$^{3+}$ Calcd for C148H232N38O47 3293.6931; Found 1098.9095 | B1 | m/z 1099.7 [M + 3H]$^{3+}$, $R_T$ = 10.81 min |
| 75 | c | HRMS (HESI/FT) m/z: [M + 3H]$^{3+}$ Calcd for C147H233N38O47 3279.6775; Found 1094.2397 | B2 | m/z 1094.3 [M + 3H]$^{3+}$, $R_T$ = 10.88 min |
| 76 | a | HRMS (HESI/FT) m/z: [M + 3H]$^{3+}$ Calcd for C148H235N38O47 3293.6931; Found 1098.9059 | B1 | m/z 1099.1 [M + 3H]$^{3+}$, $R_T$ = 10.85 min |
| 77 | a | ND | | m/z 1085.8 [M + 3H]$^{3+}$, $R_T$ = 10.62 min |
| 78 | c | HRMS (HESI/FT) m/z: [M + 3H]$^{3+}$ Calcd for C147H233N38O47 3279.6775; Found 1094.2395 | B2 | m/z 1094.6 [M + 3H]$^{3+}$, $R_T$ = 10.30 min |
| 79 | c | HRMS (HESI/FT) m/z: [M + 3H]$^{3+}$ Calcd for C148H235N38O47 3293.6931; Found 1098.9121 | B2 | m/z 1099.1 [M + 3H]$^{3+}$, $R_T$ = 10.86 min |
| 80 | a | ND | | m/z 882.8 [M + 4H]$^{4+}$, $R_T$ = 9.70 min |
| 81 | a | ND | | m/z 1155.5 [M + 4H]$^{4+}$, $R_T$ = 11.46 min |
| 82 | a | HRMS (HESI/FT) m/z: [M + 4H]$^{4+}$ Calcd for C214H333N45O69 4633.3618; Found 1159.6092 | B2 | m/z 1160.0 [M + 4H]$^{4+}$, $R_T$ = 13.56 min |
| 83 | c | HRMS (HESI/FT) m/z: [M + 3H]$^{3+}$ Calcd for C148H235N38O47 3293.6931; Found 1098.9110 | B2 | m/z 1098.9 [M + 3H]$^{3+}$, $R_T$ = 11.90 min |
| 84 | c | HRMS (HESI/FT) m/z: [M+3H]$^{3+}$ Calcd for C148H235N38O47 3293.6931; Found 1098.9110 | B2 | m/z 1099.2 [M + 3H]$^{3+}$, $R_T$ = 11.79 min |
| 85 | c | HRMS (HESI/FT) m/z: [M + 3H]$^{3+}$ Calcd for C148H235N38O47 3293.6931; Found 1098.9111 | B2 | m/z 1099.1 [M + 3H]$^{3+}$, $R_T$ = 12.30 min |

ND—Not determined

Biological Activity

The following examples are provided to illustrate preferred aspects of the invention and are not intended to limit the scope of the invention.

Example A. In Vitro Pharmacological Characterization of GLP-1 Peptides—Functional Antagonism of Human GLP1 Receptors, cAMP Accumulation Assay Antagonist inhibition of cAMP production upon stimulation of GLP-1R with agonist ligand (GLP-1(7-36) amide peptide, Tocris) was assessed using HiRange cAMP kit (Cisbio). The method followed a two-step protocol provided in the kit. In brief, HEK cells infected with 1% v/v GLP-1R Bacmam for 24 h were harvested using cell dissociation solution (Gibco), centrifuged and resuspended in the assay buffer (HBSS (Lonza) supplemented with 0.5 mM IBMX (Tocris)). DMSO stock of test compounds were serially diluted in the assay buffer and added to 96-well half area white plates (Costar). Final DMSO concentration in the assay was 0.3%. 20K cells per well were added to plates followed by 30 min incubation (humidified air (5% CO2), 37° C.). Then, cells were stimulated for further 30 min (humidified air (5% CO2), 37° C.) by addition of an equivalent to EC80 concentration of GLP-1(7-36) peptide. Intracellular accumulation of cAMP was stopped by addition of the HTRF detection reagents in lysis buffer, provided in the kit. Following 1-hour incubation at RT, plates were read on Pherastar FS (BMG Labtech, Inc.) Dotmatics Studies software was used for fitting data to a four-parameter concentration response curve. Calculated IC50 values were corrected for the agonist concentration using an adaptation of the Cheng-Prusoff equation to generate functional pKb values:

$$fpKb = -\log10\left(\frac{IC_{50}}{\frac{[A]}{[EC50]}+1}\right).$$

| Example | Human GLP-1R antagonist cAMP fpKb |
|---|---|
| Ex 9-39 | 7.8 |
| 1 | 8.2 |
| 2 | 8.4 |
| 3 | 8.3 |
| 4 | 8.3 |
| 5 | 8.3 |
| 6 | 8.3 |
| 7 | 8.3 |
| 8 | 8.3 |
| 9 | 8.6 |
| 10 | 8.2 |
| 11 | 8.2 |
| 12 | 8.2 |
| 13 | 8.4 |
| 14 | 8.4 |
| 15 | 8.3 |
| 16 | 8.3 |
| 17 | 8.2 |
| 18 | 8.5 |
| 19 | 8.3 |
| 20 | 8.4 |
| 21 | 8.2 |
| 22 | 8.3 |
| 23 | 8.6 |
| 24 | 8.6 |
| 25 | 8.2 |
| 26 | 8.2 |
| 27 | 8.3 |
| 28 | 8.2 |
| 29 | 8.4 |
| 30 | 8.2 |
| 31 | 8.2 |
| 32 | 8.5 |
| 33 | 8.3 |
| 34 | 8.3 |
| 35 | 8.3 |
| 36 | 8.3 |
| 37 | 8.5 |
| 38 | 8.5 |
| 39 | 8.3 |
| 40 | 8.2 |
| 41 | 8.3 |
| 42 | 8.5 |
| 43 | 8.5 |
| 44 | 8.7 |
| 45 | 8.4 |
| 46 | 8.4 |
| 47 | 8.4 |
| 48 | 8.5 |
| 49 | 8.4 |
| 50 | 8.3 |
| 51 | 8.3 |
| 52 | 8.3 |
| 53 | 8.8 |
| 54 | 8.4 |
| 55 | 8.3 |
| 56 | 8.2 |
| 57 | 8.2 |
| 58 | 8.2 |
| 59 | 8.3 |
| 60 | 8.3 |
| 61 | 8.7 |
| 62 | 8.5 |
| 63 | 9.0 |
| 64 | 8.6 |
| 65 | 8.5 |
| 66 | 8.2 |
| 67 | 8.2 |
| 68 | 8.5 |

-continued

| Example | Human GLP-1R antagonist cAMP fpKb |
|---|---|
| 69 | 8.4 |
| 70 | 8.3 |
| 71 | 8.8 |
| 72 | 8.5 |
| 73 | 8.6 |
| 74 | 8.5 |
| 75 | 8.6 |
| 76 | 8.4 |
| 77 | 8.5 |
| 78 | 8.4 |
| 79 | 8.4 |
| 80 | 8.3 |
| 81 | 8.3 |
| 82 | 8.3 |
| 83 | 8.5 |
| 84 | 8.4 |
| 85 | 9.1 |

Example B. In Vitro Pharmacological Characterization of GLP-1 Peptides—Functional Antagonism of Mouse GLP1 Receptors, cAMP Accumulation Assay Antagonist inhibition of cAMP production upon stimulation of GLP-1R with agonist ligand was assessed using HitHunter cAMP assay (DiscoverX). The method followed antagonist procedure steps provided in the kit. In brief, CHO-K1 cells stably expressing mouse GLP-1R were thawed and plated at 10K cells per well in CP05 reagent in the total volume of 20 μl into white walled, 384-well plates and incubated overnight at 37° C. in Cytomat. On the day of the assay, the media was replaced with 15 μl of HBSS/10 mM HEPES. DMSO stock of test compounds were serially diluted in DMSO and then further diluted in the HBSS/10 mM HEPES, 5 μl of each concentration were added to the plate followed by 30 min incubation at 37° C. Final DMSO concentration in the assay was 1%. Cells were stimulated for further 30 min at 37° C. by addition of an equivalent to $EC_{80}$ concentration of Exendin-4. Intracellular accumulation of cAMP was stopped by addition of the HitHunter detection reagents in lysis buffer, provided in the kit. Following 1-hour incubation at RT in the dark, plates were read on Envision (Perkin Elmer). Dotmatics Studies software was used for fitting data to a four-parameter concentration response curve. Calculated IC50 values were corrected for the agonist concentration using an adaptation of the Cheng-Prusoff equation to generate functional pKb values:

$$fpKb = -\log10\left(\frac{IC_{50}}{\frac{[A]}{[EC50]}+1}\right).$$

| Example | Mouse GLP-1R antagonist cAMP fpKb |
|---|---|
| Ex 9-39 | 7.2 |
| 2 | 7.0 |
| 3 | 7.4 |
| 10 | 7.7 |
| 24 | 8.0 |

| Example | Mouse GLP-1R antagonist cAMP fpKb |
|---|---|
| 25 | 7.8 |
| 29 | 7.7 |
| 30 | 7.9 |
| 32 | 7.8 |
| 35 | 7.4 |
| 36 | 7.4 |
| 38 | 7.6 |
| 39 | 7.2 |
| 44 | 7.1 |
| 45 | 7.5 |
| 46 | 7.2 |
| 47 | 7.0 |
| 48 | 7.1 |
| 49 | 7.0 |
| 50 | 7.0 |
| 52 | 7.8 |
| 53 | 7.8 |
| 54 | 7.6 |
| 55 | 7.9 |
| 56 | 8.0 |
| 57 | 8.1 |
| 58 | 8.1 |
| 59 | 8.1 |
| 62 | 7.9 |
| 64 | 8.3 |
| 65 | 8.4 |
| 69 | 7.8 |
| 70 | 7.5 |
| 71 | 7.3 |
| 72 | 7.9 |
| 73 | 7.7 |
| 74 | 7.7 |
| 75 | 7.5 |
| 76 | 7.6 |
| 77 | 7.7 |
| 78 | 7.5 |
| 79 | 7.6 |
| 80 | 7.5 |
| 84 | 8.3 |
| 85 | 8.0 |

Example C: Mouse Intraperitoneal Glucose Tolerance Test (ipGTT)

The aim of this study is to evaluate the effects of intravenous administration of a lead GLP1 antagonist peptide on blocking/reducing/antagonising exendin-4-induced (GLP-1 receptor agonist) improvements in glucose tolerance in lean male C57BL/6J mice. Glucose was administered by the intraperitoneal route.

Materials and Methods

Lean, male C57BL/6J JAX mice were singly housed upon arrival and throughout the study in polypropylene cages on a normal phase 12 h light-dark cycle (lights on 07:00). Relative humidity will typically be 55±15% with prolonged periods below 40% RH or above 70% RH avoided. Animals had free access to standard maintenance diet and tap water ad libitum for the duration of the study unless otherwise stated.

Experimental Procedure

Animals were habituated to the animal unit and diet for approximately 2 weeks with daily handling for the 5 days prior to the study in order to familiarise the animals to the dosing protocol. Animals were randomised on the basis of body weight and ensured that groups were balanced as closely as possible for mean body weight.

The day prior to the ipGTT, all animals were fasted (free access to water maintained) to ensure. The day of the experiment the animals were moved to a separate room. A baseline blood sample was taken from all animals prior to Treatment 1 (20 minutes pre-glucose). Five minutes later, mice were dosed with Treatment 1 by the intravenous route (15 minutes pre-glucose). Treatment 2 (Exendin-4 or vehicle) was administered 10 minutes prior to the glucose load (all groups). Ten minutes after dosing with Treatment 2 animals were administered a glucose load of D-glucose by the intraperitoneal route (2.0 g/kg at a volume of 5 ml/kg at a concentration of 400 mg/ml). Blood samples were taken 3 minutes before glucose administration and 10, 30, 60, 90 and 120 minutes post glucose administration. Plasma samples were subsequently assayed for glucose and insulin at the 10 minute time as single replicates and data analysed by robust regression and AUC 0 to 120 minutes calculated for the glucose data (as total AUC and AUC from baseline) by trapezoidal rule and analysed by the same methodology.

FIG. 1 shows the results for Examples 24, 31, 34, 38, 44, 68 and 85. Glucose AUC over the 0-120 min time period post-glucose administration. Example compound effects compared to Exendin-4 by Williams' test. *$p<0.05$, $p<0.01$, *$p<0.001$.

Figure 2:
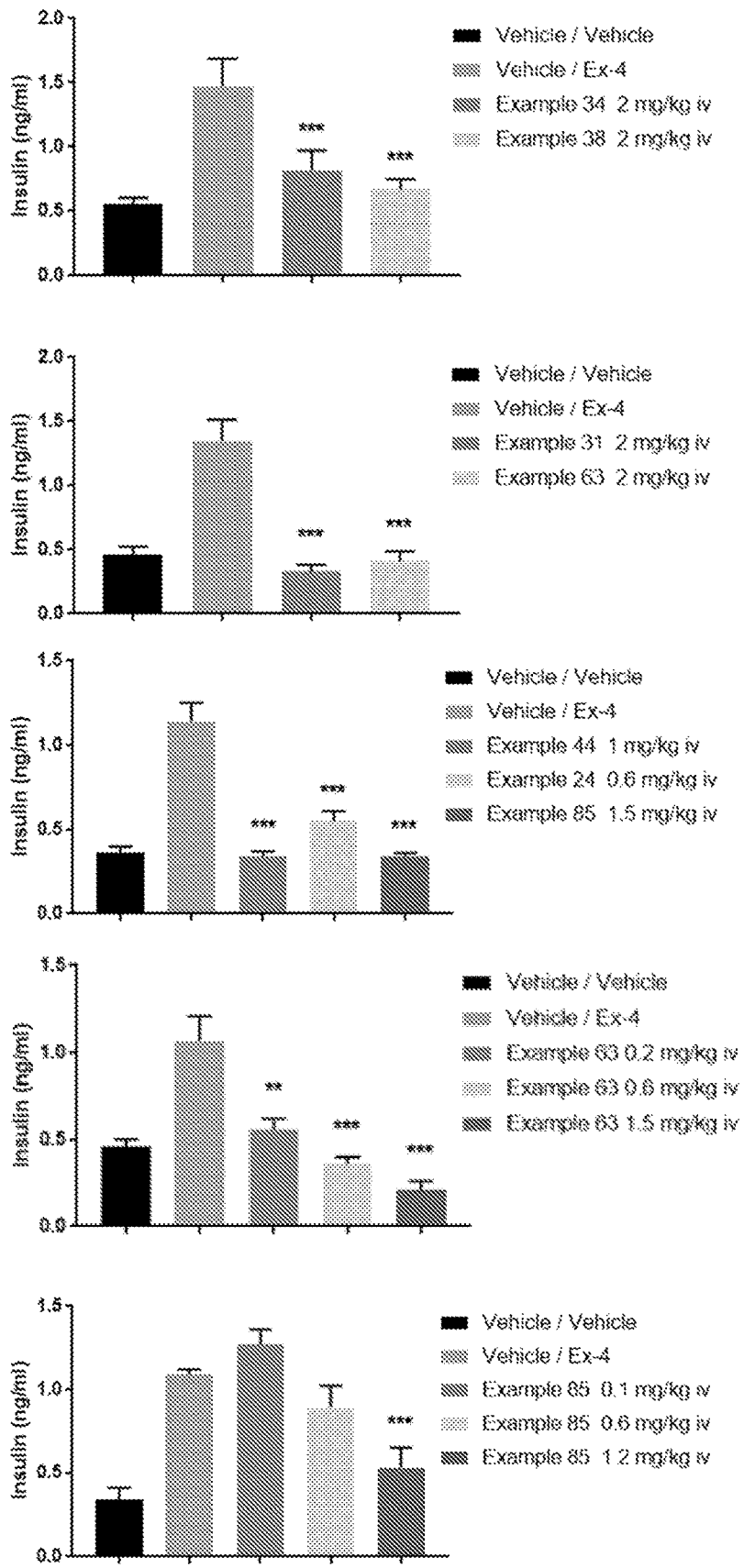

FIG. 2 shows the results for Examples 24, 31, 34, 38, 44, 68 and 85. Plasma insulin (ng/ml) at 10 minutes post-glucose administration. Example compound effects compared to Exendin-4 by Williams' test. *$p<0.05$, $p<0.01$, *$p<0.001$

The invention claimed is:

1. A compound comprising a sequence of formula (1):

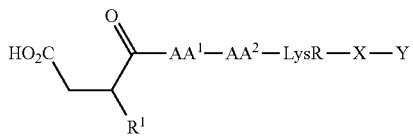

(1)

wherein;

$R^1$ is H, $NHR^2$, or $CH_2R^2$;

$R^2$ is selected from $(CH_2)_n$aryl and $(CH_2)_n$heteroaryl;

each n independently is 1 to 6;

$AA^1$ is -Leu- or -Nle-;

$AA^2$ is —$NHCR^{3a}R^{3b}CO$—;

$R^{3a}$ is hydrogen or a $C_{1-3}$ alkyl group;

$R^{3b}$ is $C_{1-6}$ alkyl, $(CH_2)_n$aryl, $(CH_2)_n$OH, or $(CH_2)_n OR^4$;

or $R^{3a}$ joins with $R^{3b}$ to form a 3-6 membered ring, optionally containing one or more heteroatoms selected from N and O;

$R^4$ is $C_{1-6}$ alkyl;

X is a sequence: -Gln-$AA^3$-Glu-$AA^4$-Glu-$AA^5$-Val-$AA^6$-Leu-Phe-$AA^7$-Glu-Trp-Leu-Lys-Asn-$AA^8$-(SEQ ID NO: 1);

$AA^3$ is -Met- or -Nle-; where when $AA^3$ is -Met-, LysR is an N-substituted lysine residue;

$AA^4$ is -Glu- or -Gln-;

$AA^5$ is -Ser- or -Ala-;

$AA^6$ is -Arg- or -DArg-;

$AA^7$ is a group —$NHCHR^5CO$—; where $R^5$ is a $C_{1-6}$ alkyl group;

$AA^8$ is -Gly-, -Ser-, -DAla- or -βAla-;

Y is absent or is a sequence-$AA^9$-$AA^{10}$-$AA^{11}$-$AA^{12}$-$AA^{13}$-$AA^{14}$-$AA^{15}$-$AA^{16}$-$AA^{17}$-$AA^{18}$-$AA^{19}$- wherein $AA^9$ is -Gly- or -Ser-;

$AA^{10}$ is -Pro- or -Ser-;

$AA^{11}$ is -Ser-, -DSer- or -Lys-;

$AA^{12}$ is -Ser-, -DSer-, -Lys- or -Phe-;

AA[13] is absent or is -Ser-, -DSer-, -Gly-, -Glu- or -Lys-;
AA[14] is absent or is -Ser-, -DSer-, -Ala-, -Lys- or -Tyr-;
AA[15] is absent or is -Ser-, -DSer-, -Pro-, -Glu- or -Lys-;
AA[16] is absent or is -Ser-, -DSer-, -Pro-, -Lys- or -LysR-;
AA[17] is absent or is -Pro- or -Glu-;
AA[18] is absent or is -Ser- or -Tyr-;
AA[19] is absent or is -Glu-;
wherein the X or Y C-terminus is a carboxyl group or a carboxamide group, or is adjoined to any natural or non-natural amino acid sequence or any other moiety, functional group or groups;
one of (i), (ii), or (iii):
(i) the group LysR is an unsubstituted lysine residue;
(ii) the group LysR is an N-substituted lysine residue, wherein the N-substituent is selected from: —CO(CH$_2$)$_q$CH$_3$; —CO(CH$_2$)$_q$CO$_2$H; —CO(CH$_2$)$_q$CHCH$_2$; —COO(CH$_2$)$_q$CH$_3$; —COO(CH$_2$)$_q$CO$_2$H and —COO(CH$_2$)$_q$CHCH$_2$; where q is 1 to 22; or
(iii) the group LysR is an N-substituted lysine residue, wherein the N-substituent is a group-L-G;
L is selected from the group consisting of:

-continued

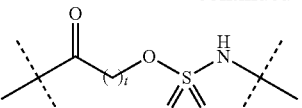

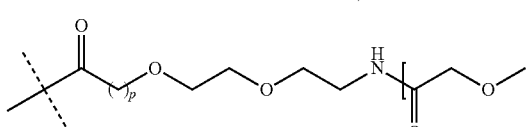

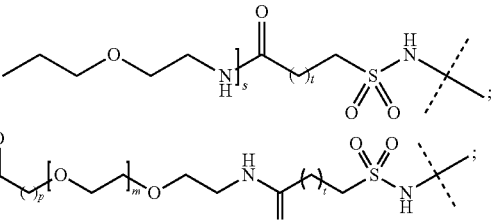

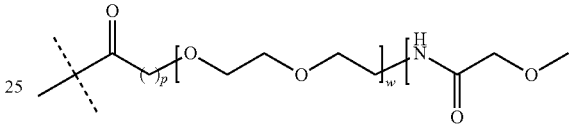

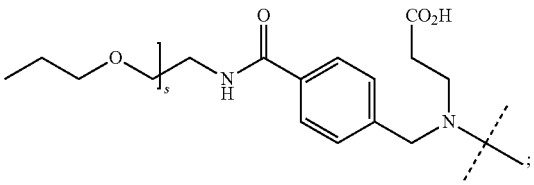

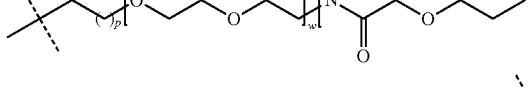

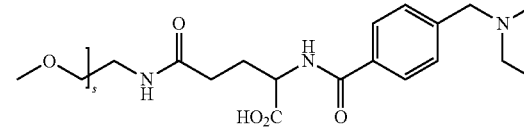

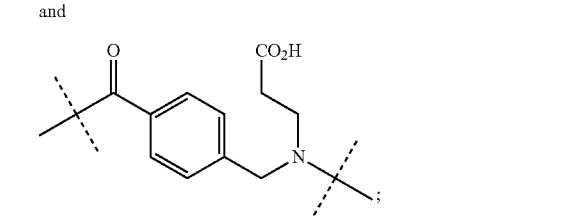

and

G is selected from the group consisting of:

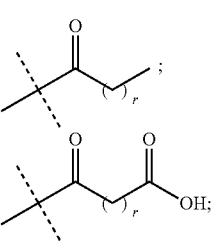

-continued

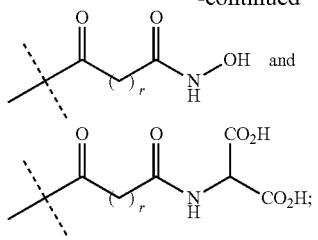

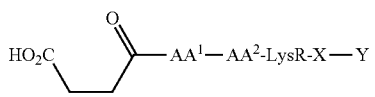

m is 1 to 23;
p is 1 to 3;
r is 1 to 20;
s is 0 to 3;
t is 0 to 4; and
w is 0 to 4;
or a tautomeric or stereochemically isomeric form thereof,
or a prodrug, salt, or zwitterion thereof.

2. The compound according to claim 1, wherein $R^1$ is selected from H, NHBn, and $CH_2Bn$.

3. The compound according to claim 1 which is a compound of formula (1a):

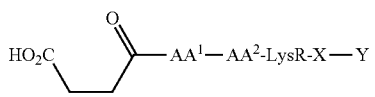

(1a)

or a tautomeric or stereochemically isomeric form thereof or a prodrug, salt or zwitterion thereof.

4. The compound according to claim 1 which is a compound of formula (1c):

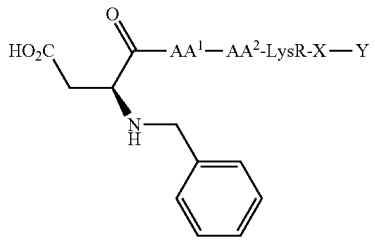

(1c)

or a tautomeric or stereochemically isomeric form thereof or a prodrug, salt or zwitterion thereof.

5. The compound according to claim 1, wherein $AA^1$ is -Leu-.

6. The compound according to claim 1, wherein $AA^1$ is -Nle-.

7. The compound according to claim 1, wherein $R^{3a}$ is hydrogen or methyl and $R^{3b}$ is selected from methyl, ethyl, isobutyl, n-butyl, $CH_2OH$, $CH_2CH_2OH$, $CH_2OCH_3$, $CH_2$-cyclopropyl, Bn, $CH_2Bn$ or $CH_2CH_2Bn$; or wherein $R^{3a}$ and $R^{3b}$ form a cyclobutyl or an oxetanyl ring.

8. The compound according to claim 1, wherein $AA^2$ is selected from

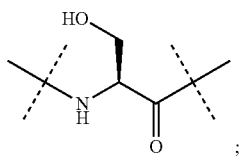

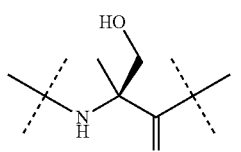

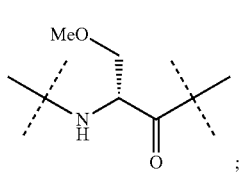

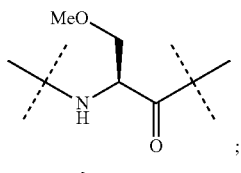

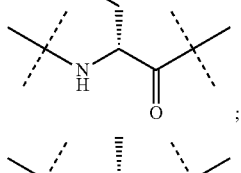

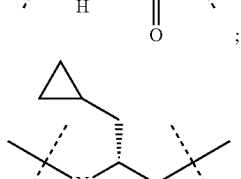

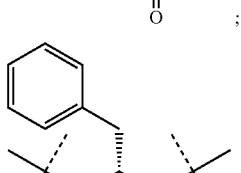

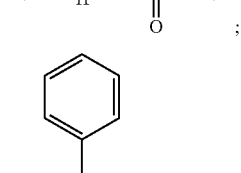

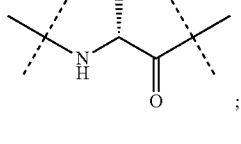

-continued

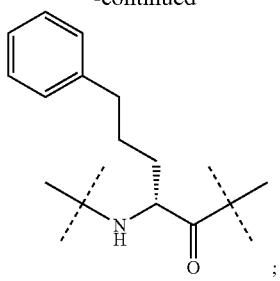

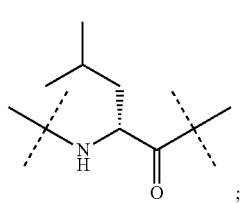

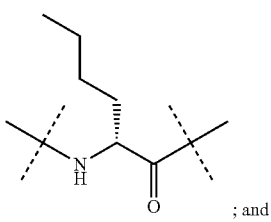
; and

-continued

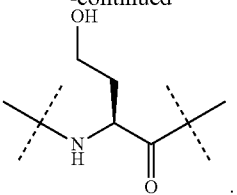

9. The compound according to claim 1, wherein $AA^2$ is:

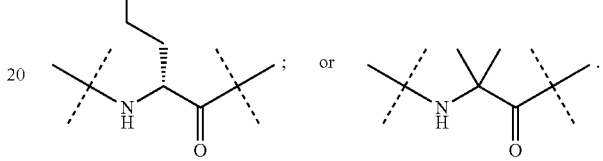

10. The compound according to claim 1, wherein the group LysR is an unsubstituted lysine residue.

11. The compound according to claim 1, wherein LysR is an N-substituted Lysine residue, wherein the N-substituent is selected from: —CO(CH$_2$)$_q$CH$_3$; —CO(CH$_2$)$_q$CO$_2$H; —CO(CH$_2$)$_q$CHCH$_2$; —COO(CH$_2$)$_q$CH$_3$; —COO(CH$_2$)$_q$CO$_2$H and —COO(CH$_2$)$_q$CHCH$_2$; where q is 1 to 22.

12. The compound according to claim 1, wherein LysR is an N-substituted Lysine residue, wherein the N-substituent is a group-L-G;

wherein L is selected from the group consisting of:

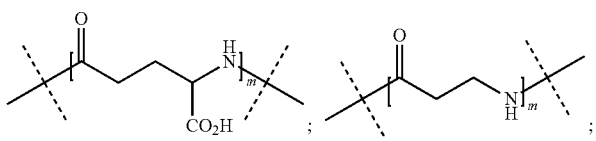

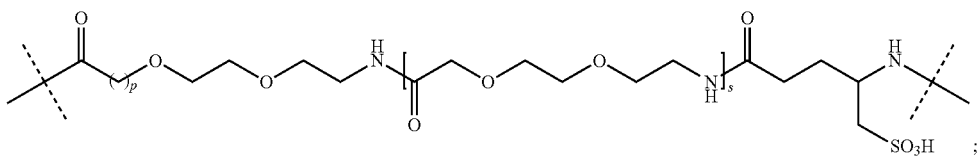

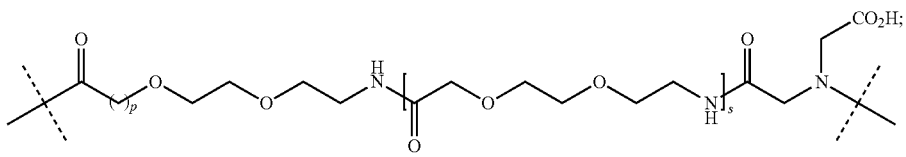

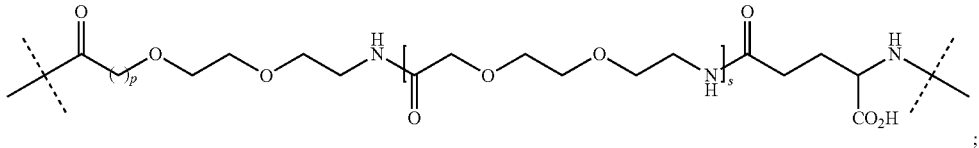

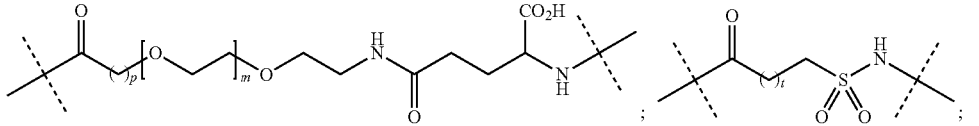

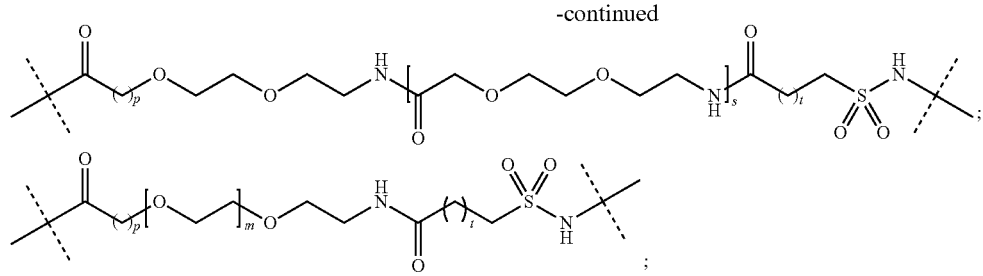
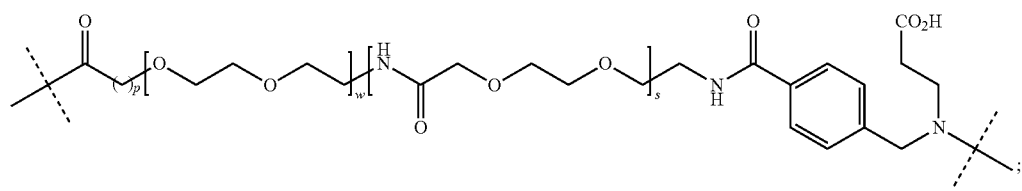
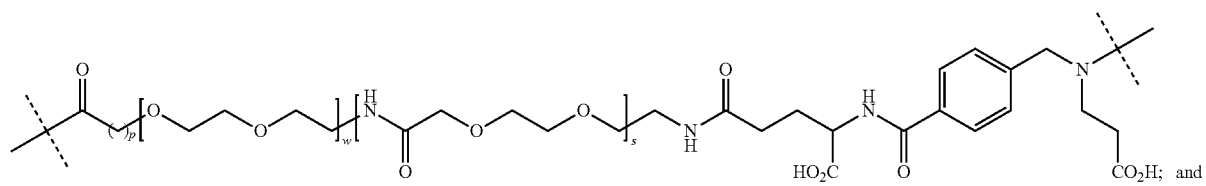
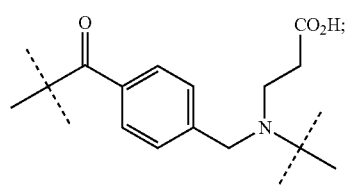
and G is selected from the group consisting of:
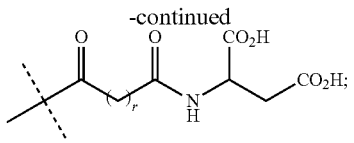
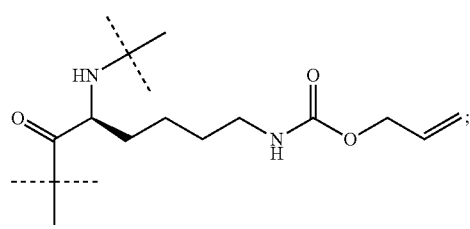
where m is 1 to 23;
p is 1 to 3;
r is 1 to 20;
s is 0 to 3;
t is 0 to 4;
and w is 0 to 4.
13. The compound according to claim 1, wherein the group LysR is selected from:

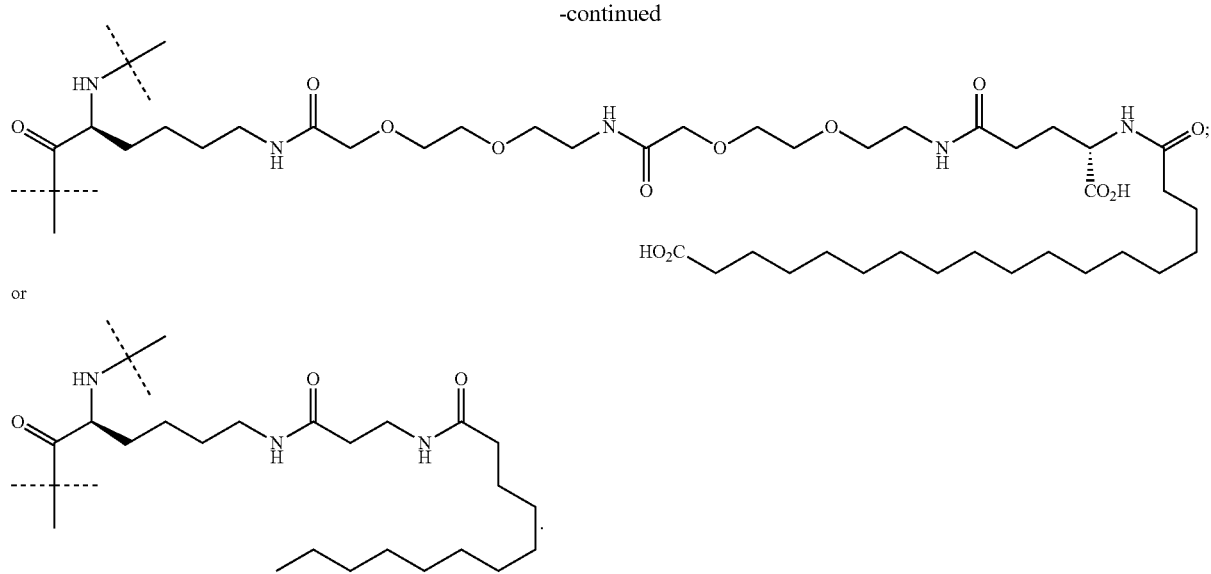
or
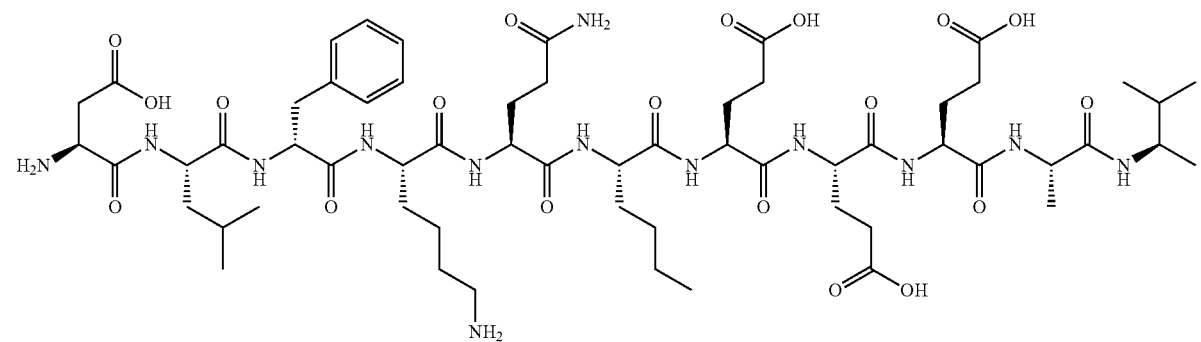
14. The compound according to claim 1, wherein the X C-terminus is a carboxamide group.
15. The compound according to claim 1 which is selected from any one of
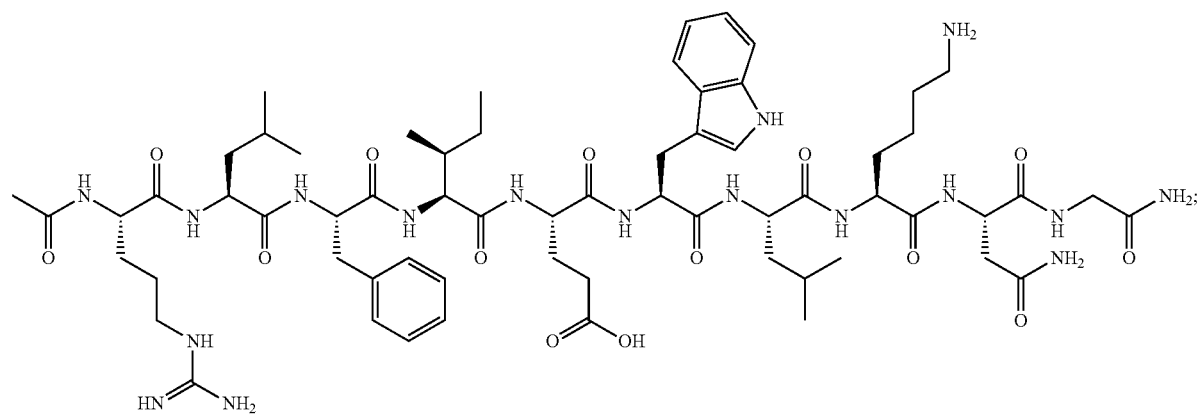

-continued
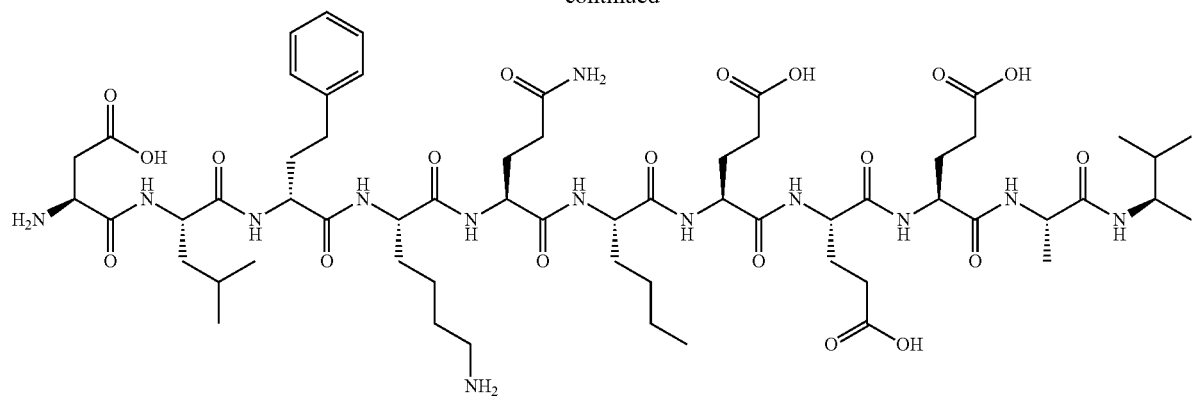
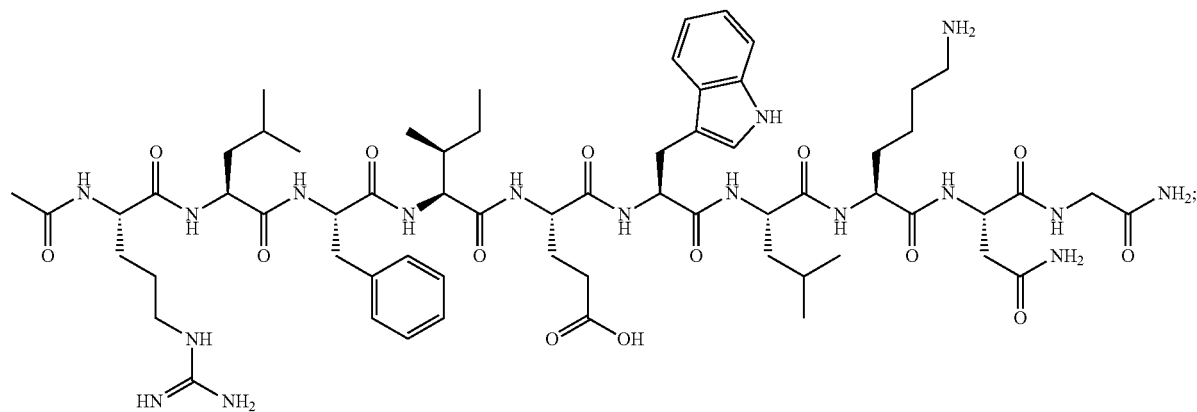
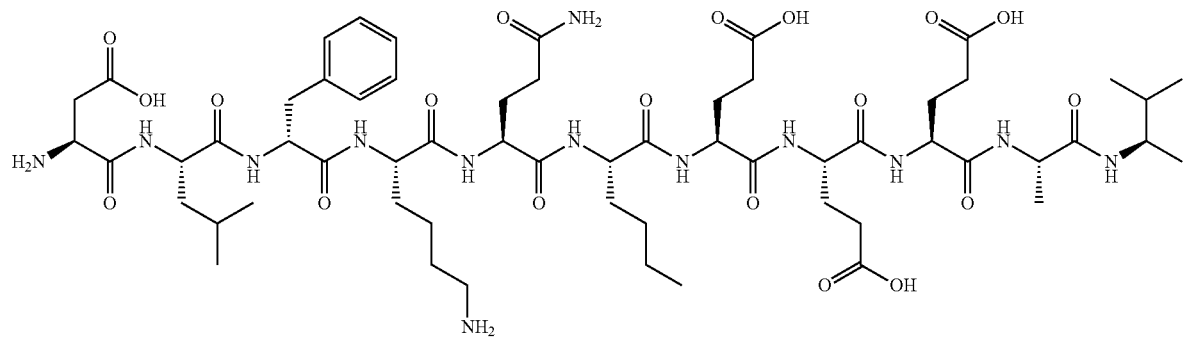
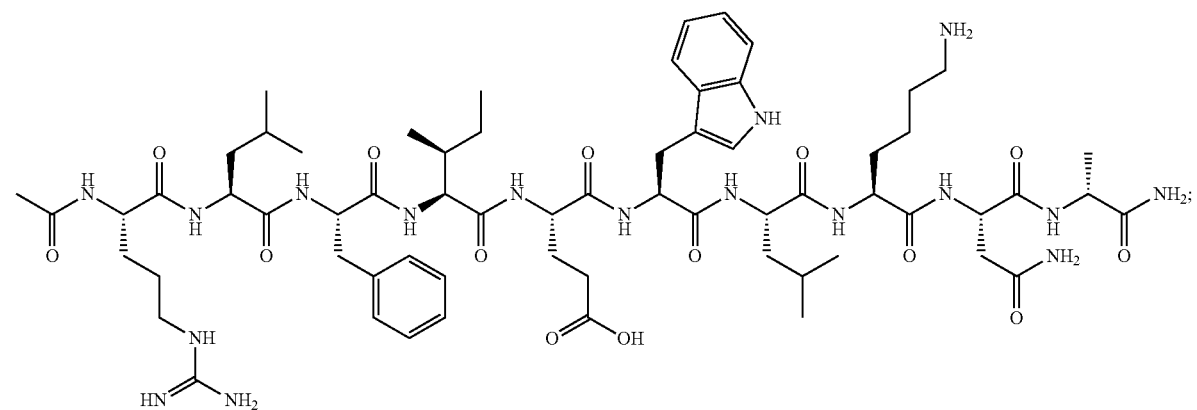

-continued
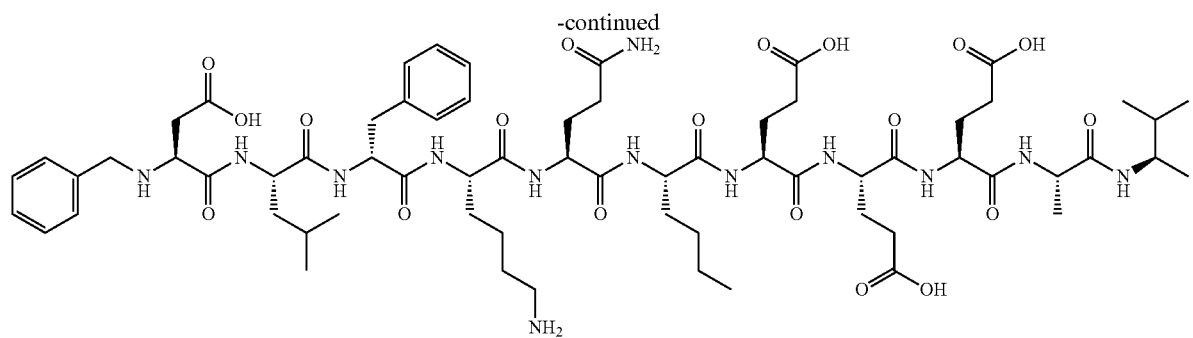
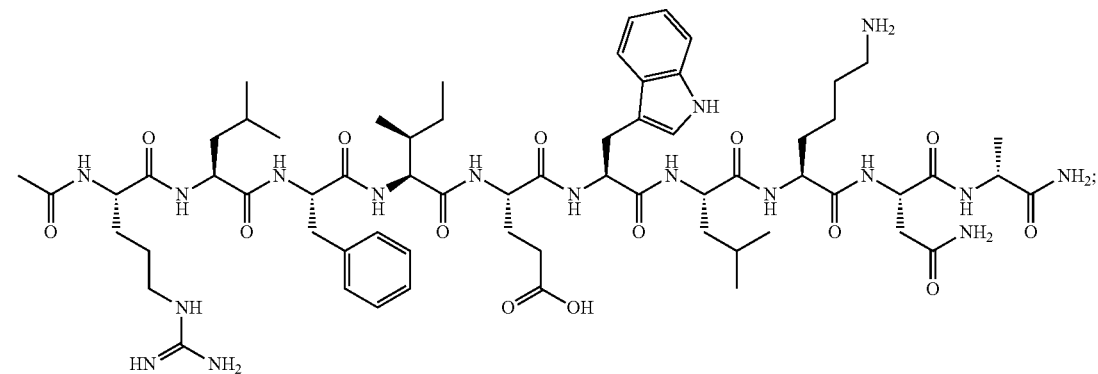
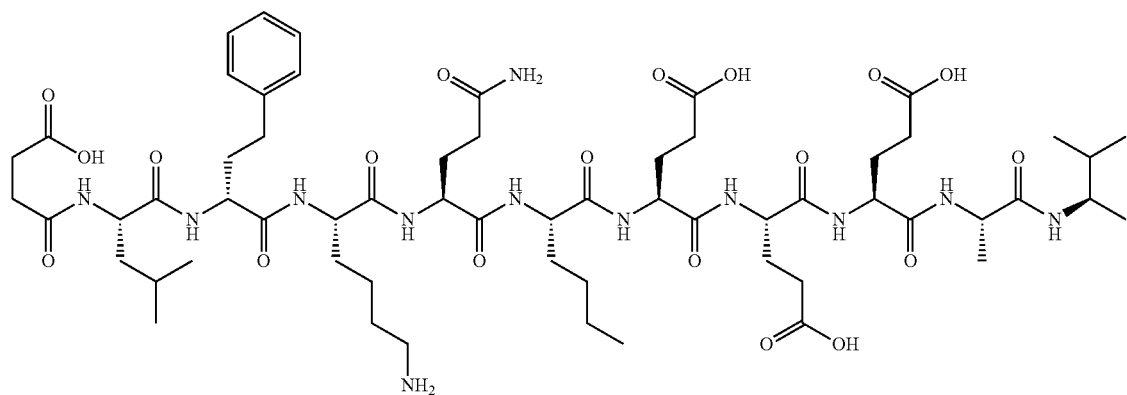
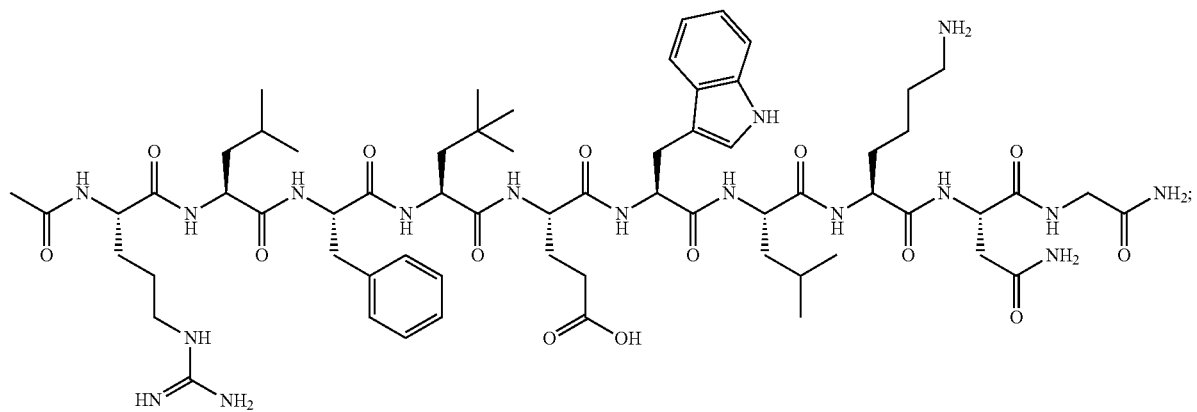

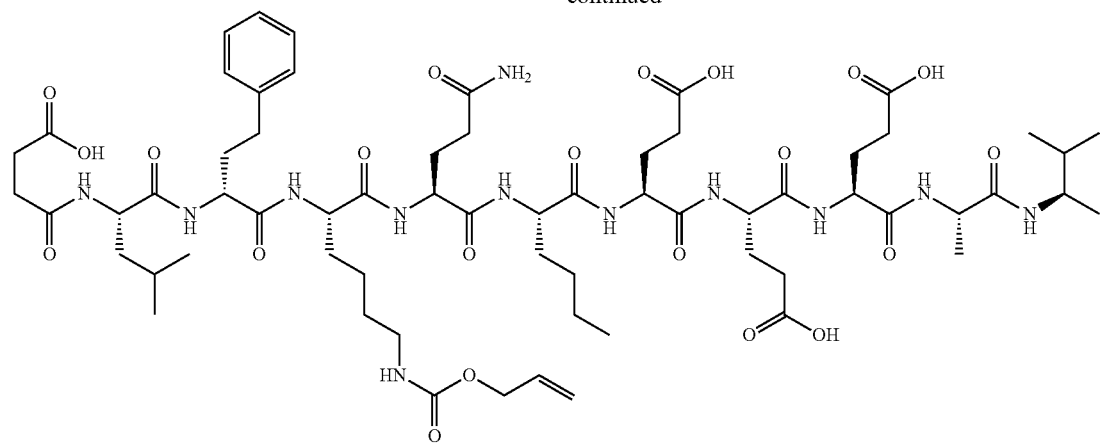
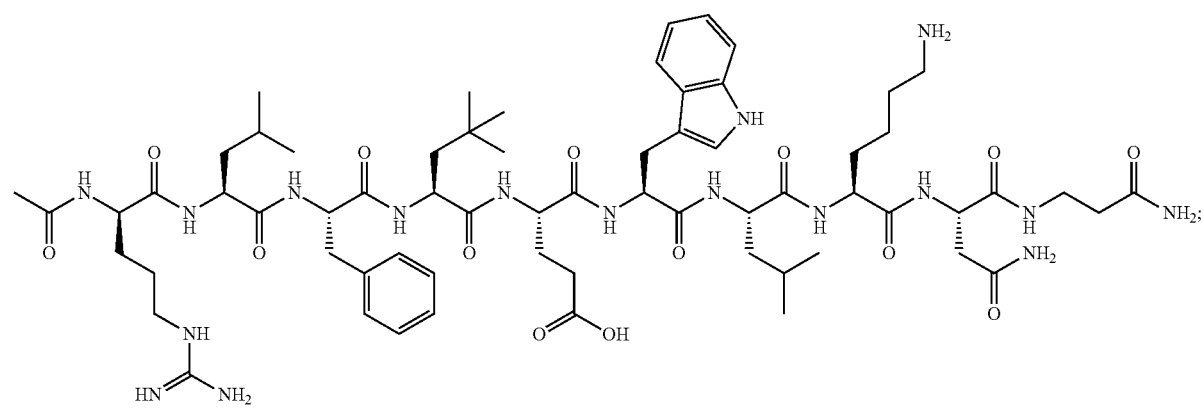
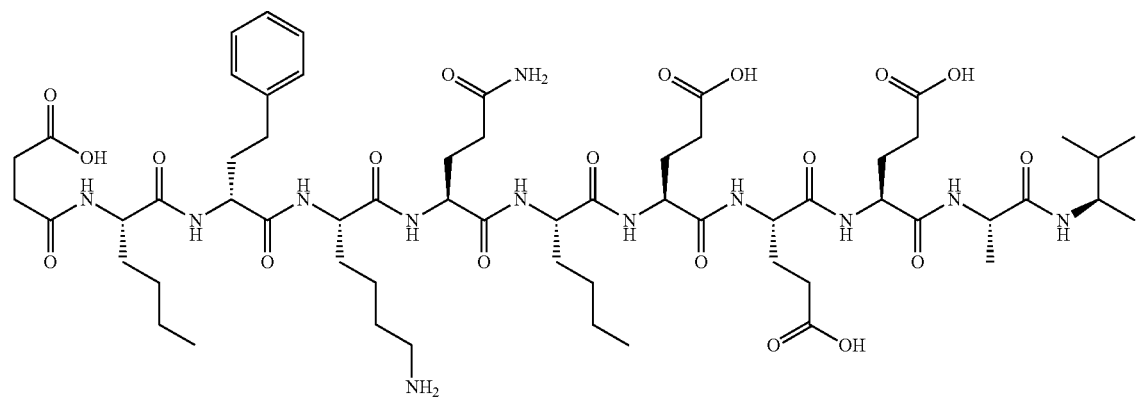
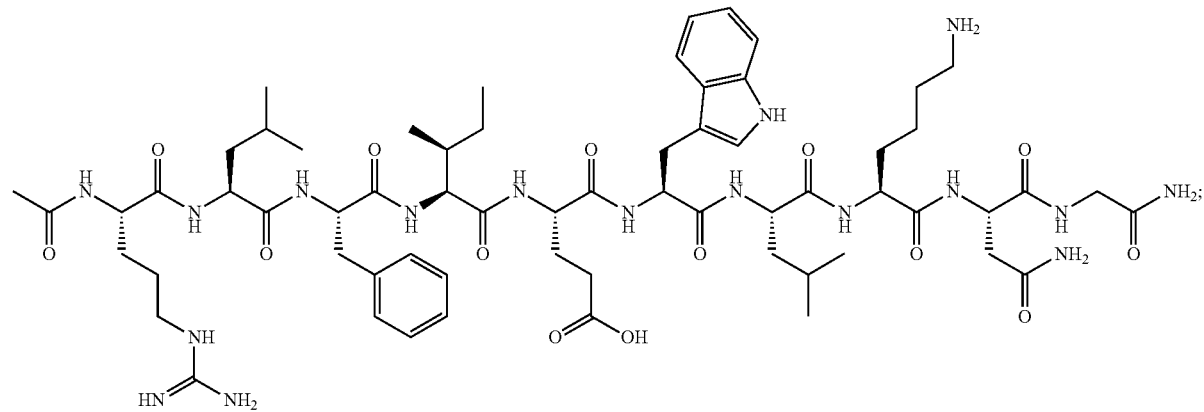

-continued
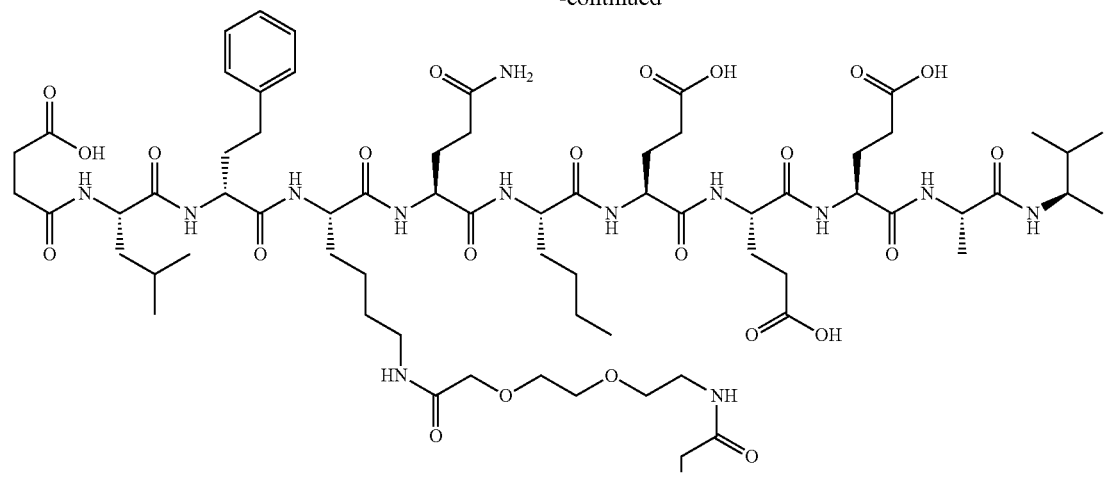
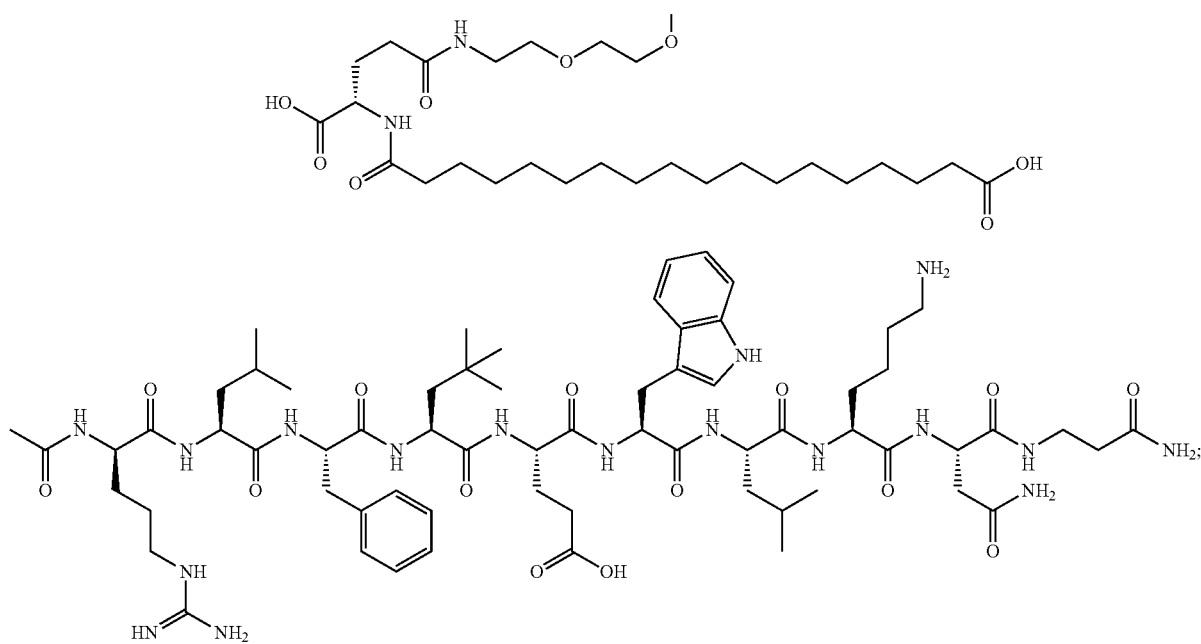
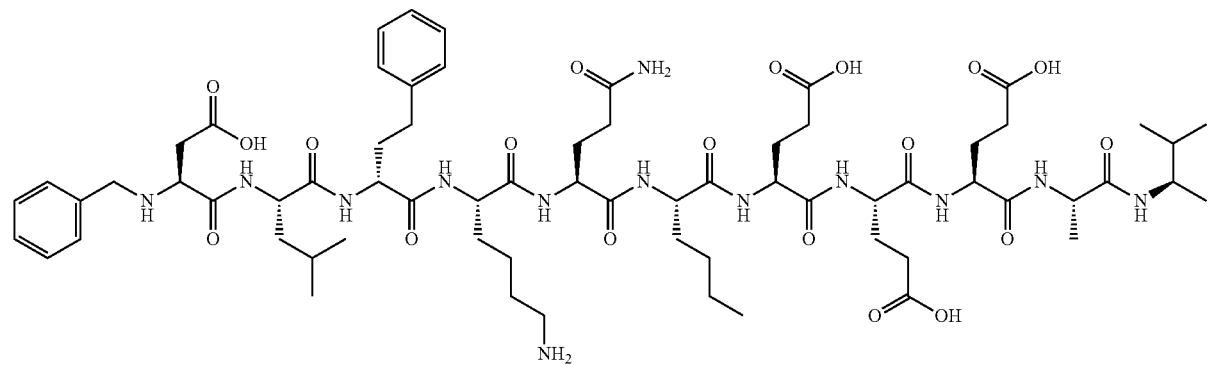

-continued
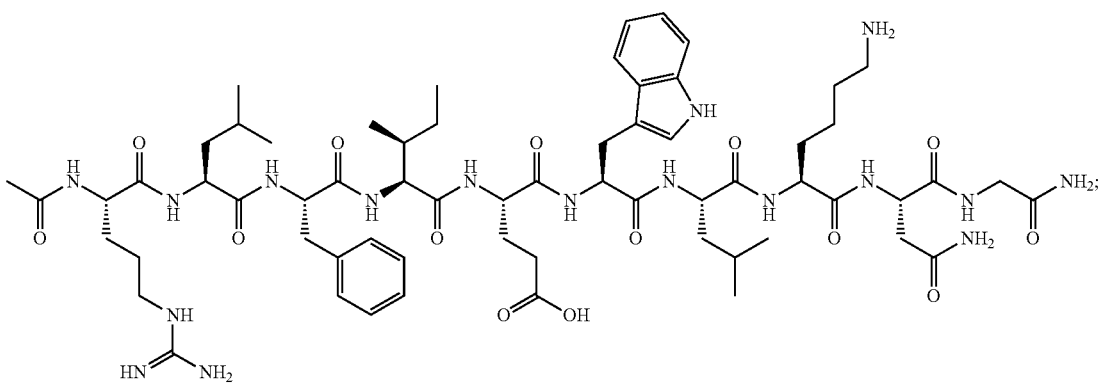
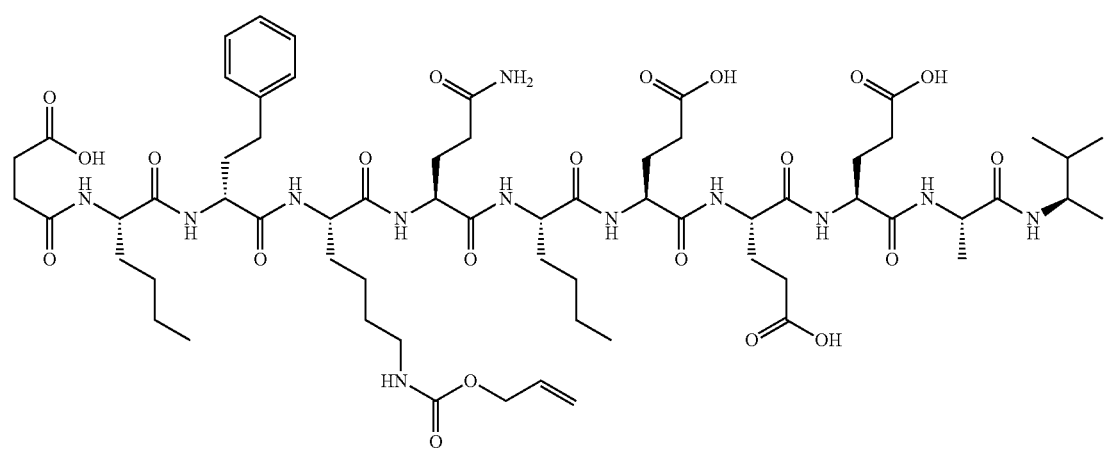
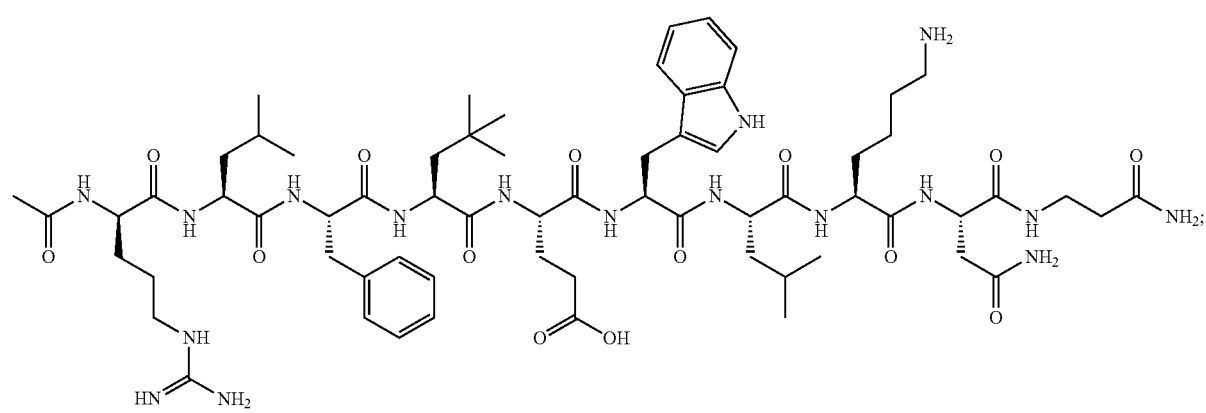
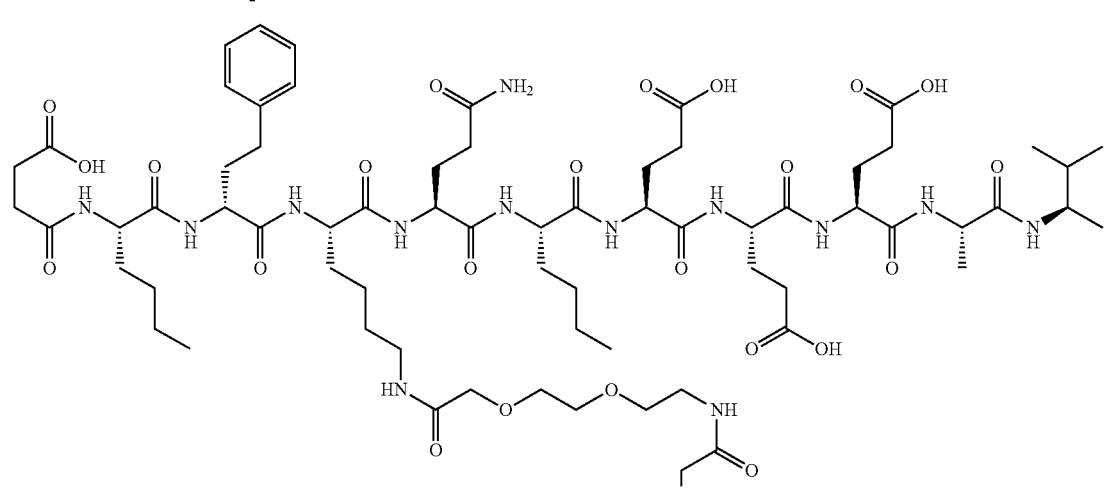

-continued
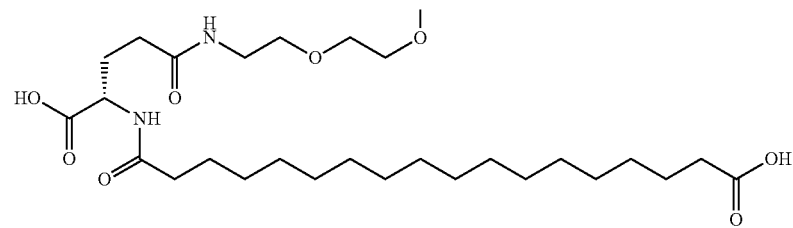
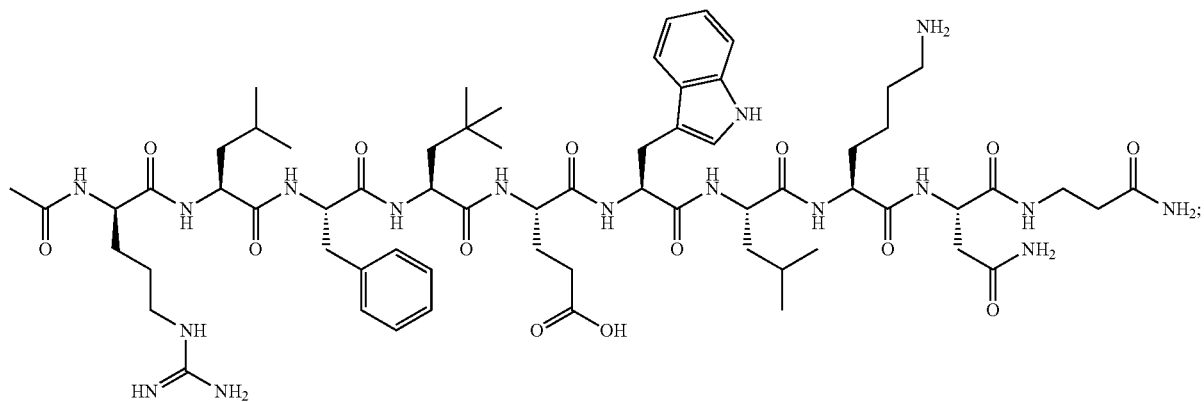
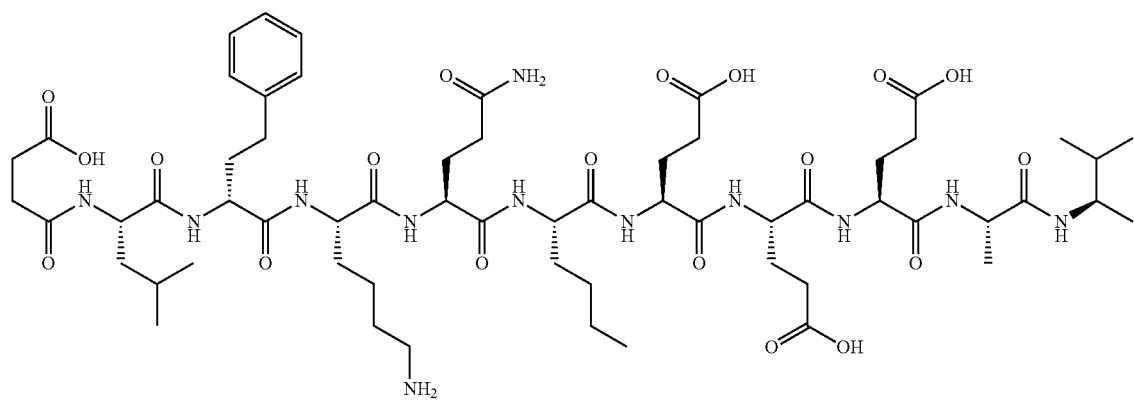
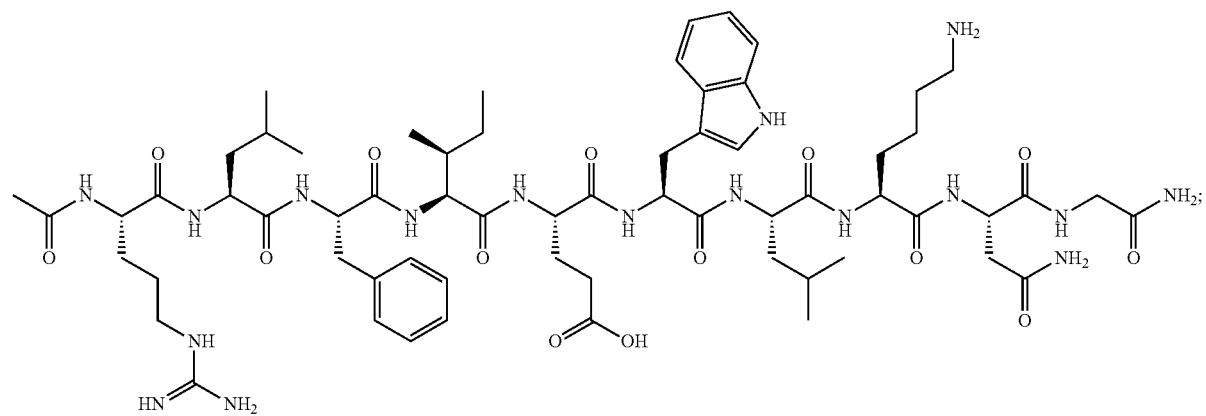

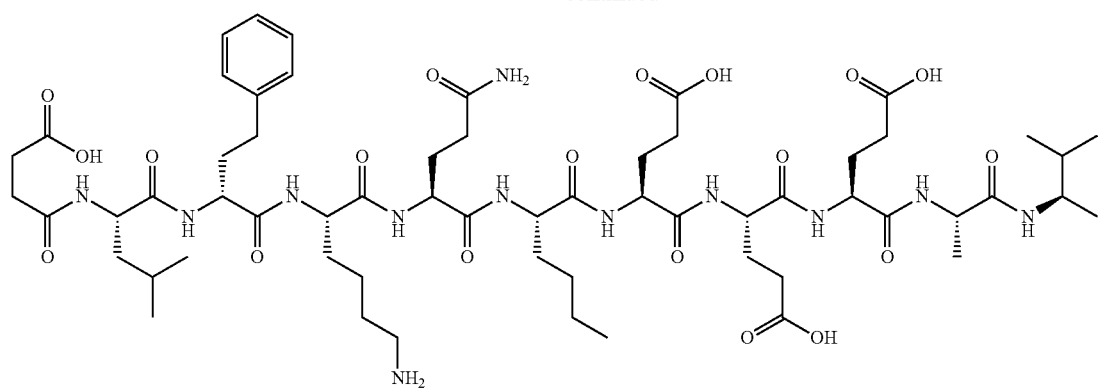
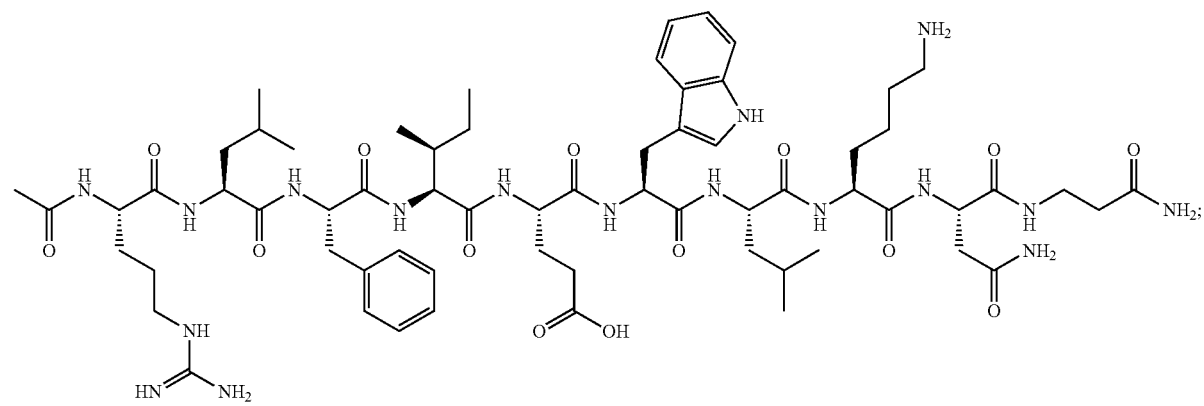
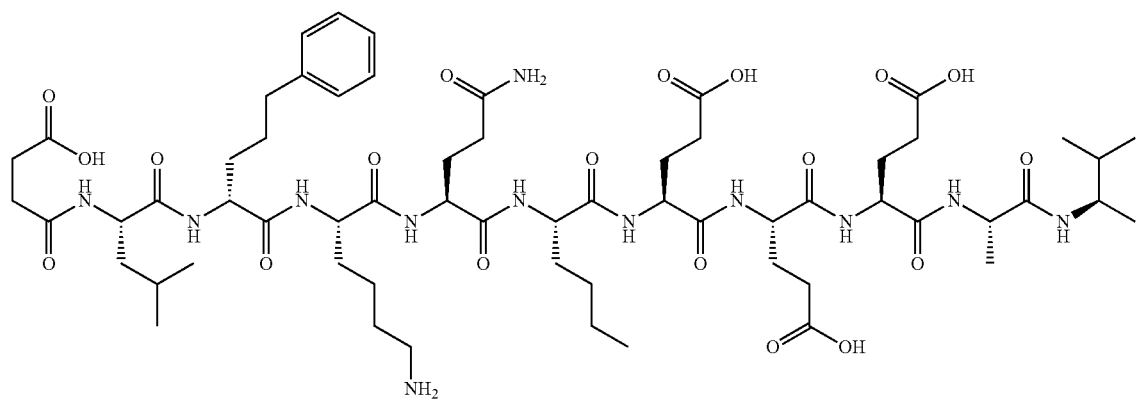
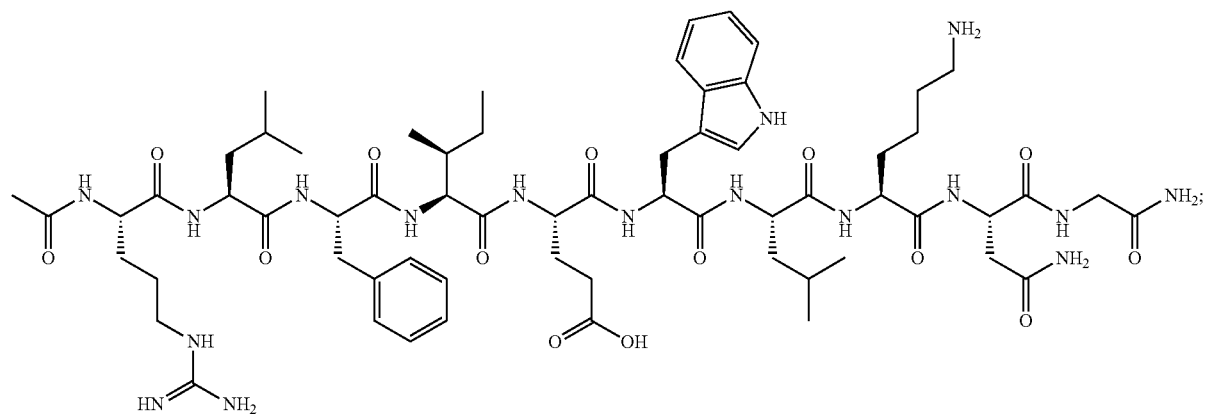

77 78
-continued
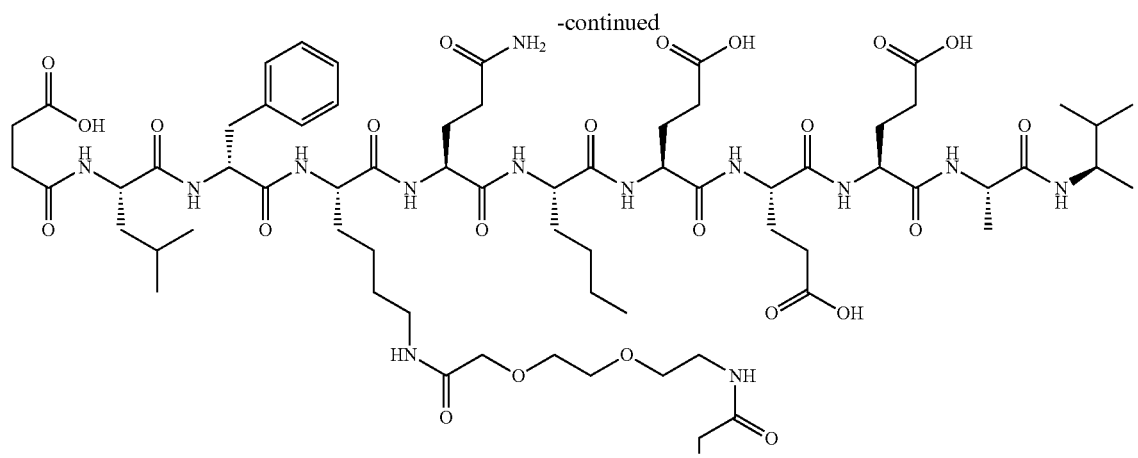
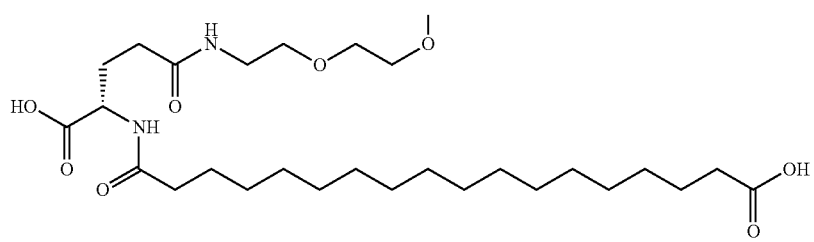
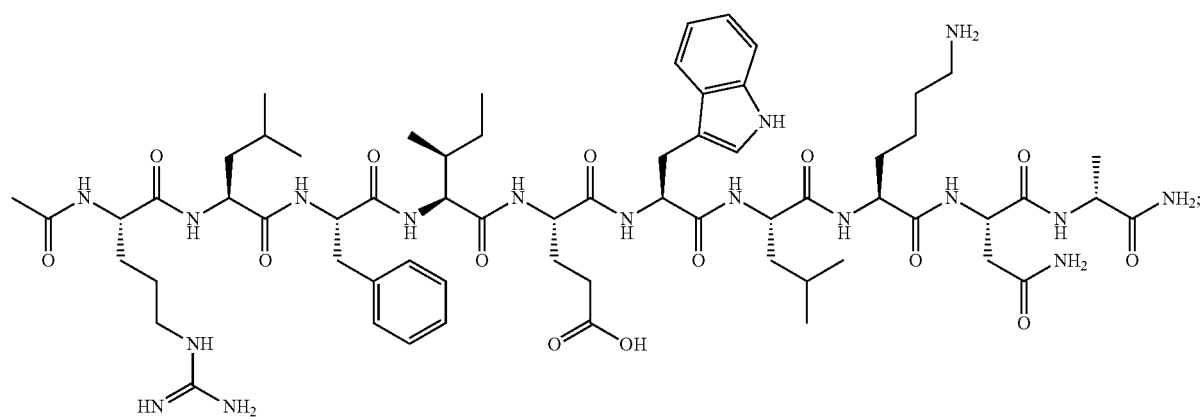
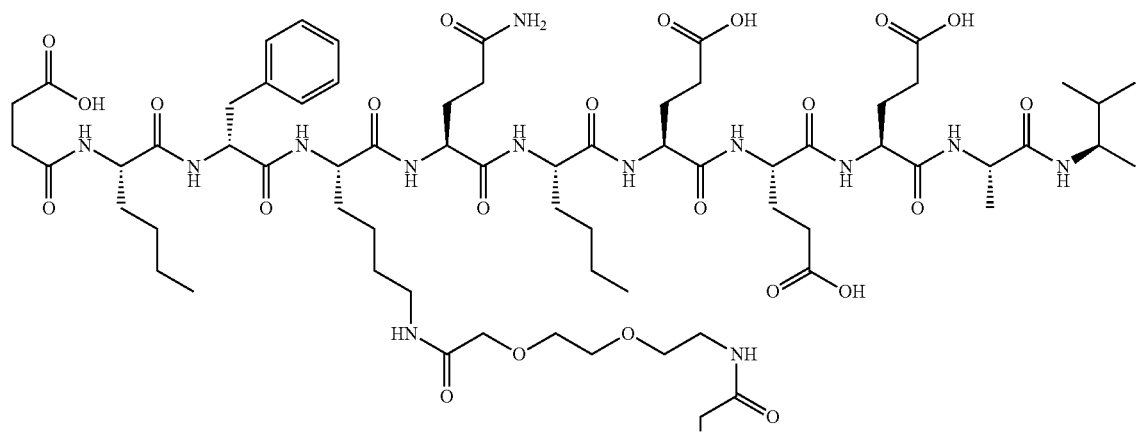

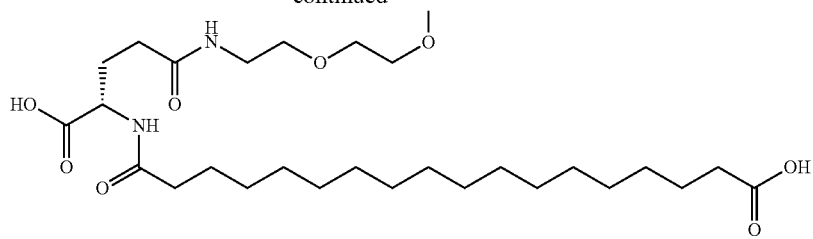
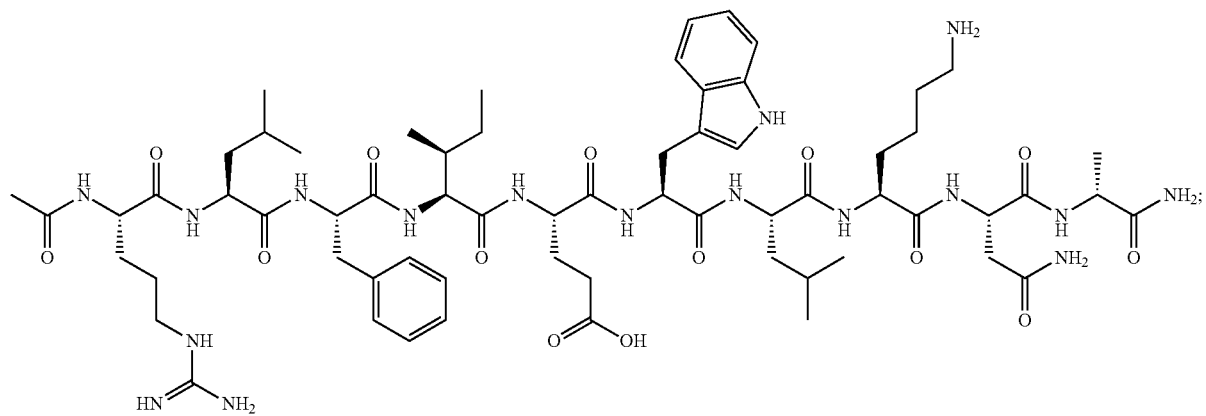
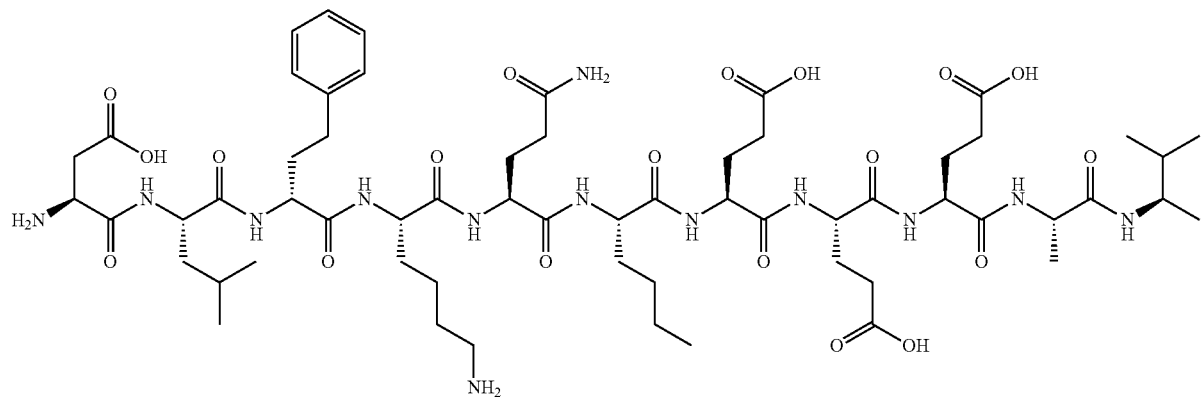
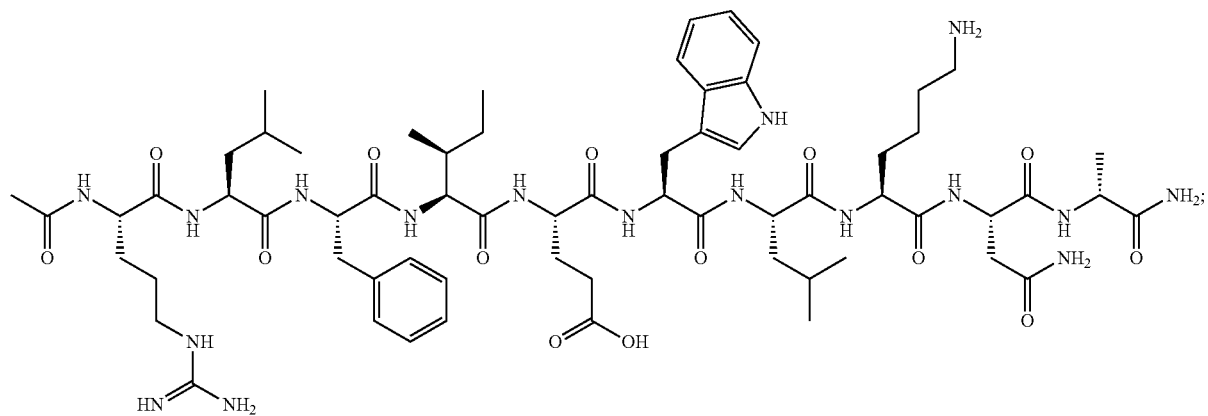

81
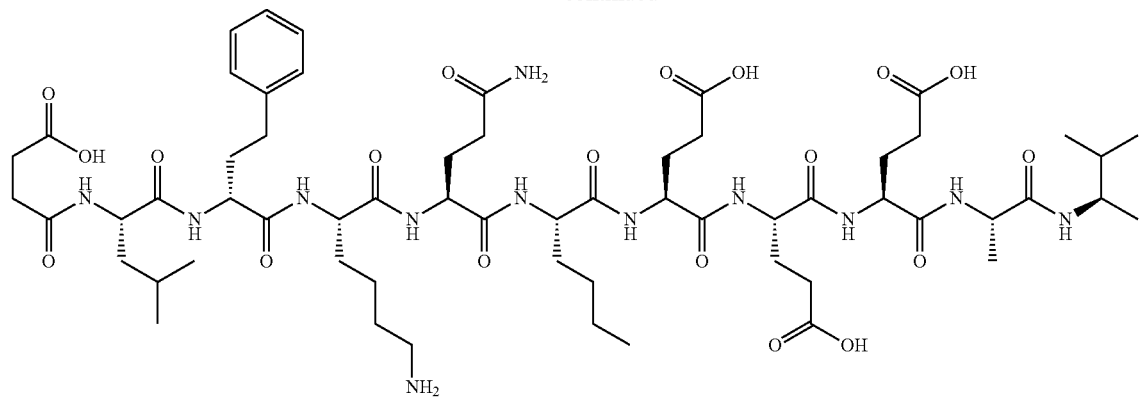
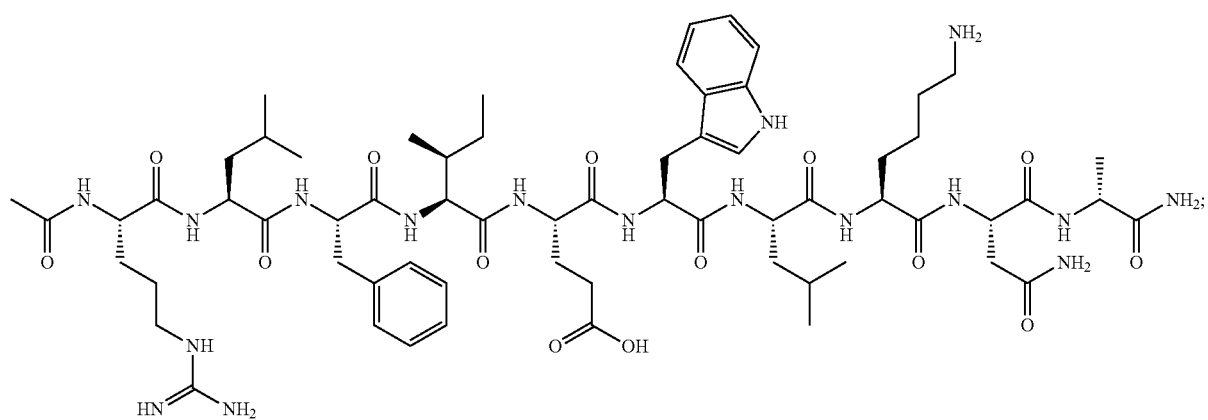
82
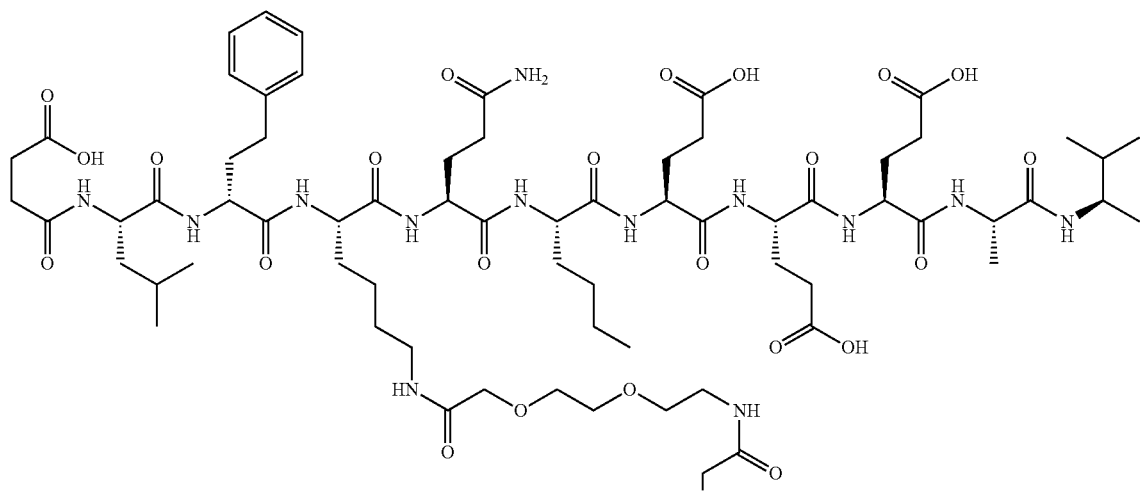

-continued
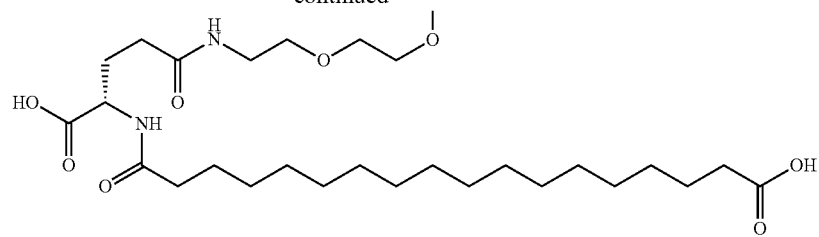
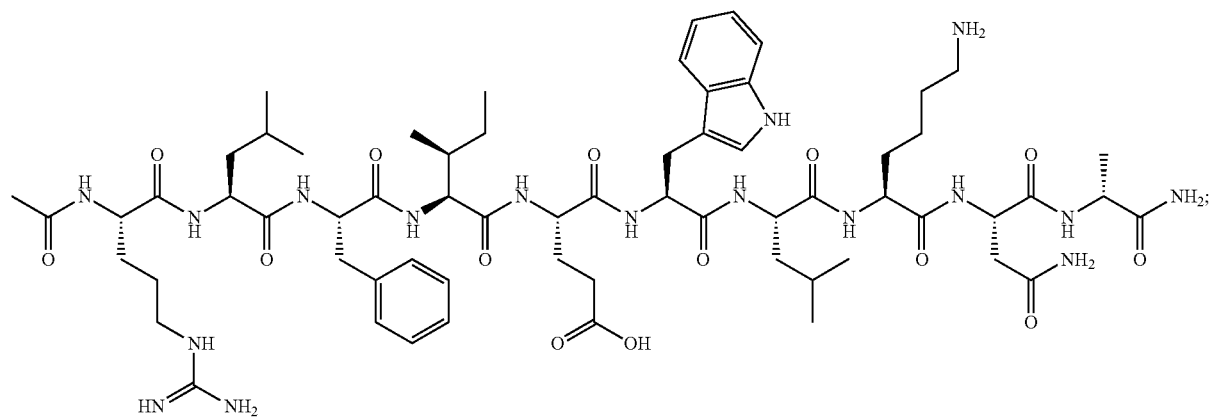
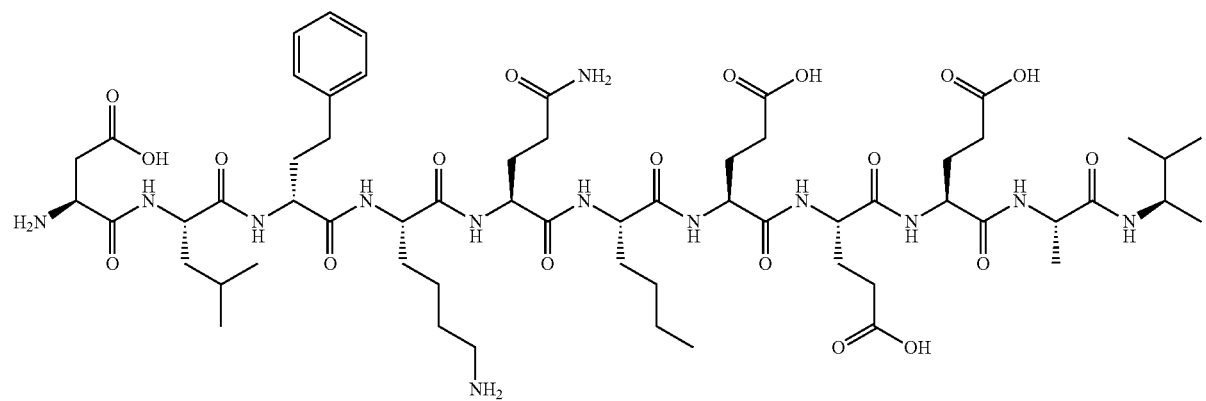
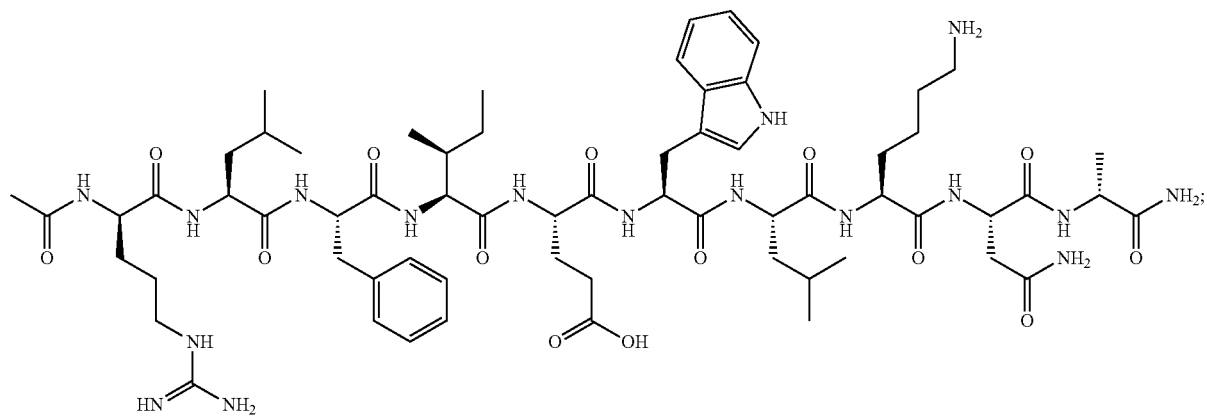

85
-continued
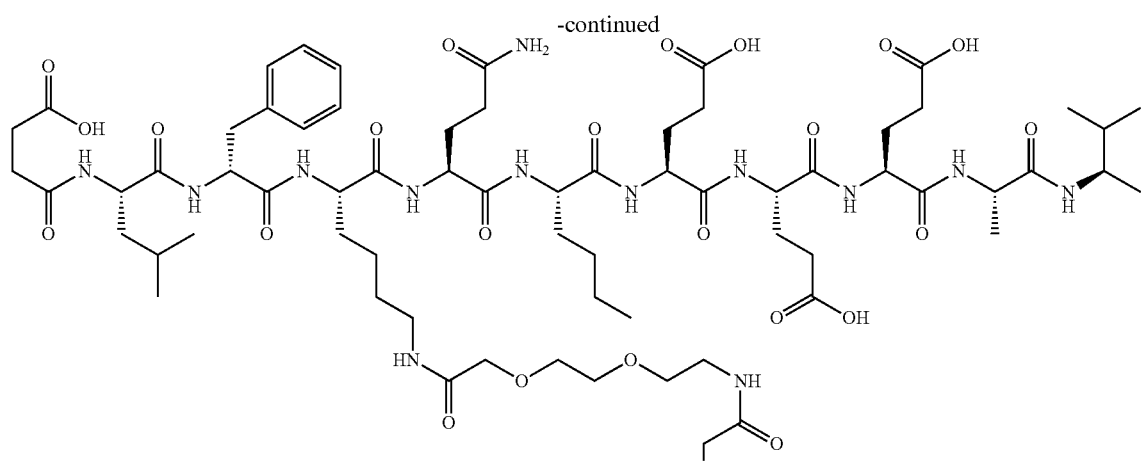
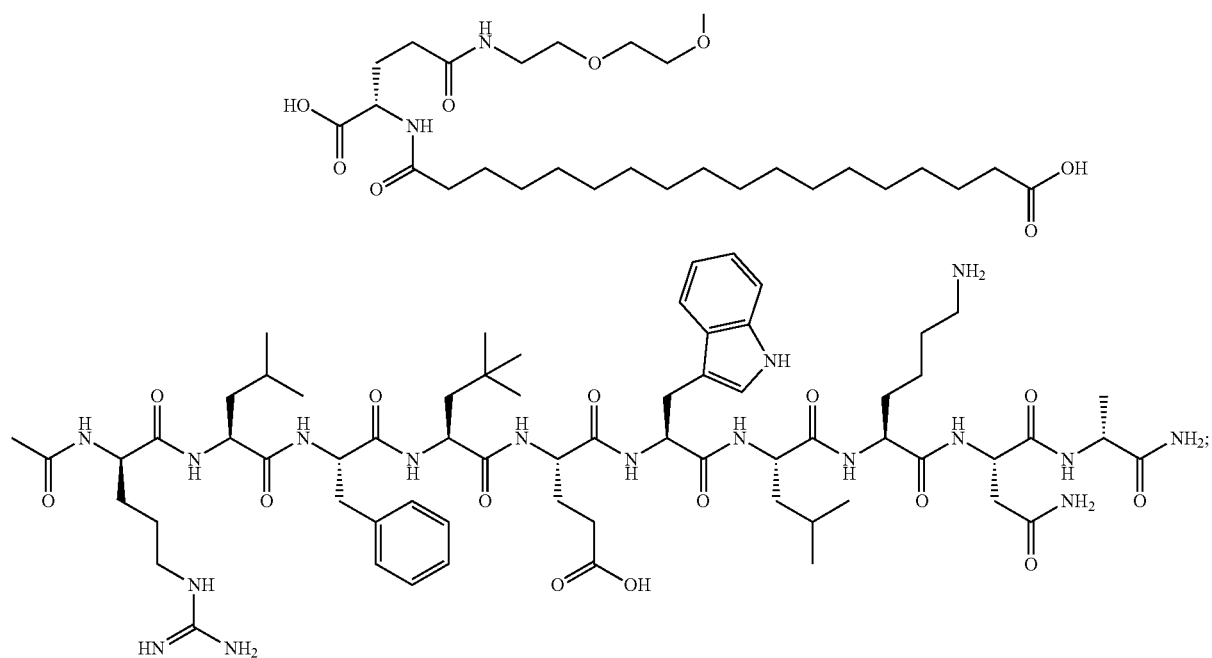
86
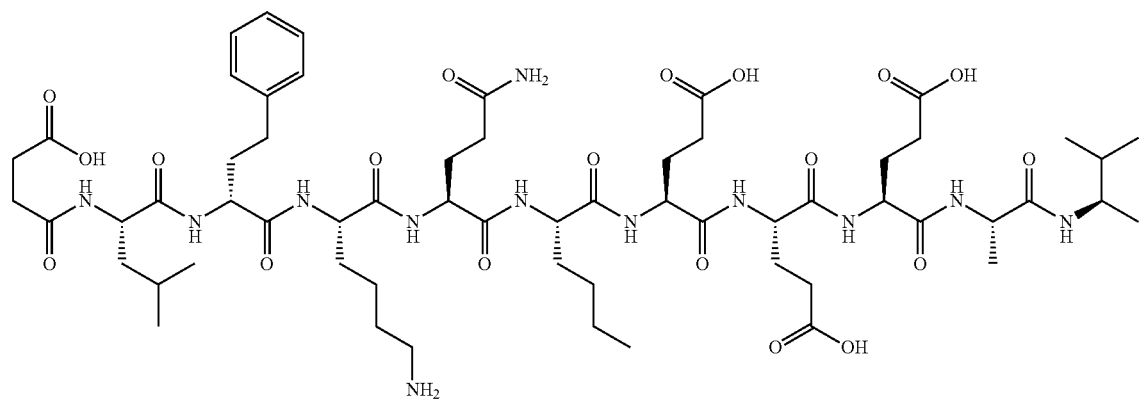

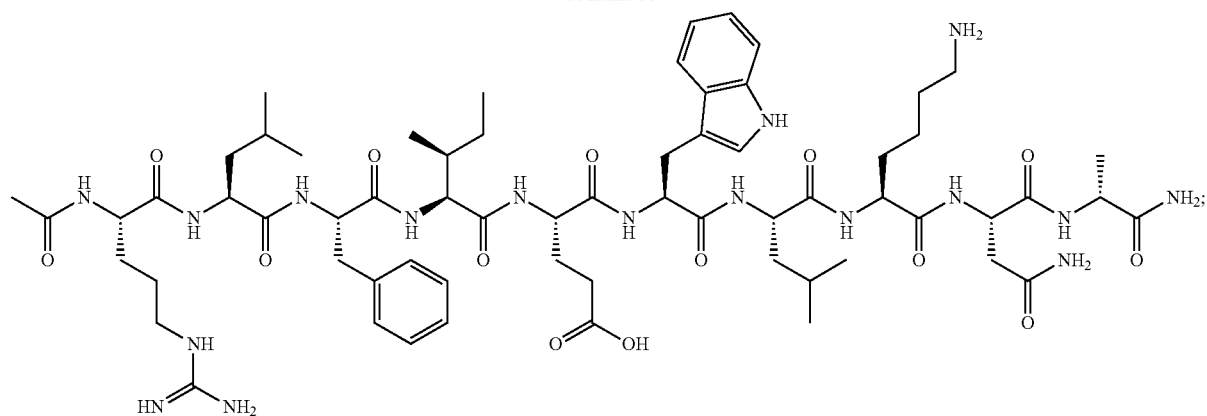
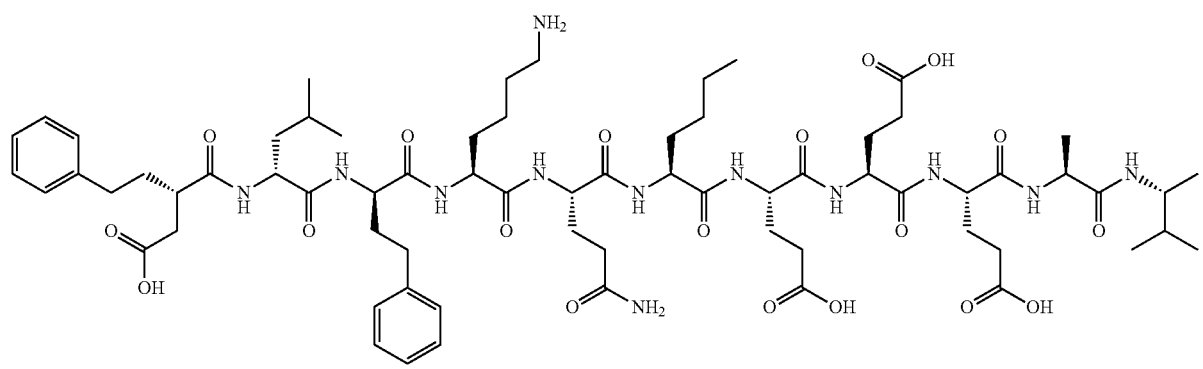
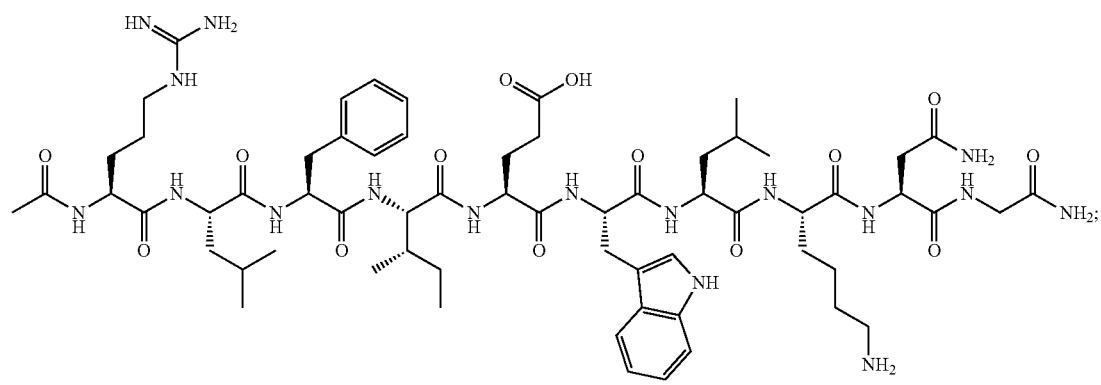
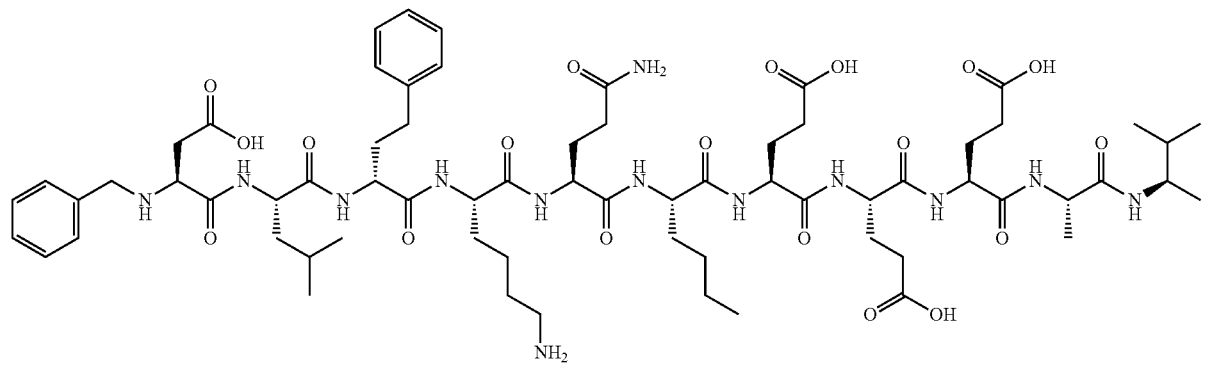

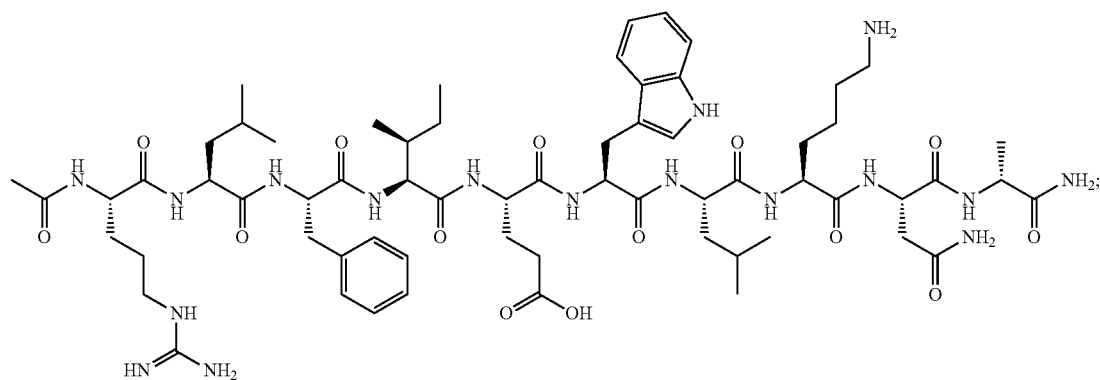
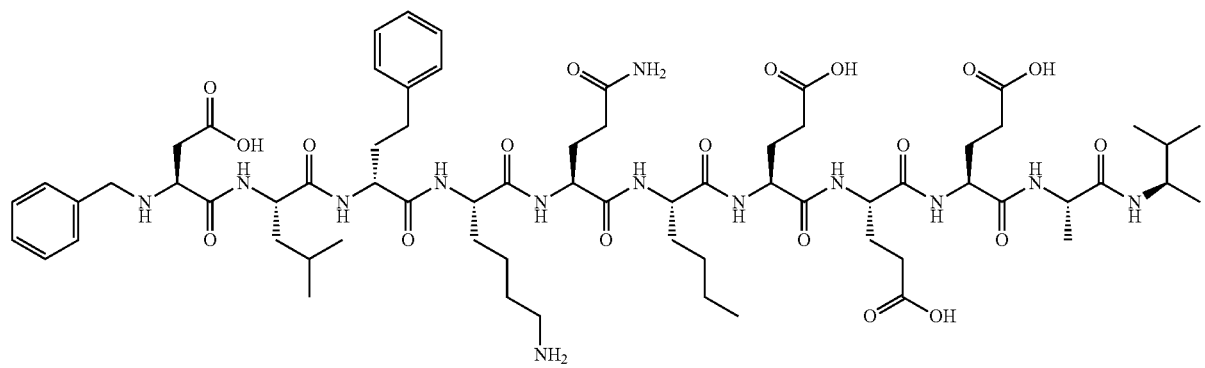
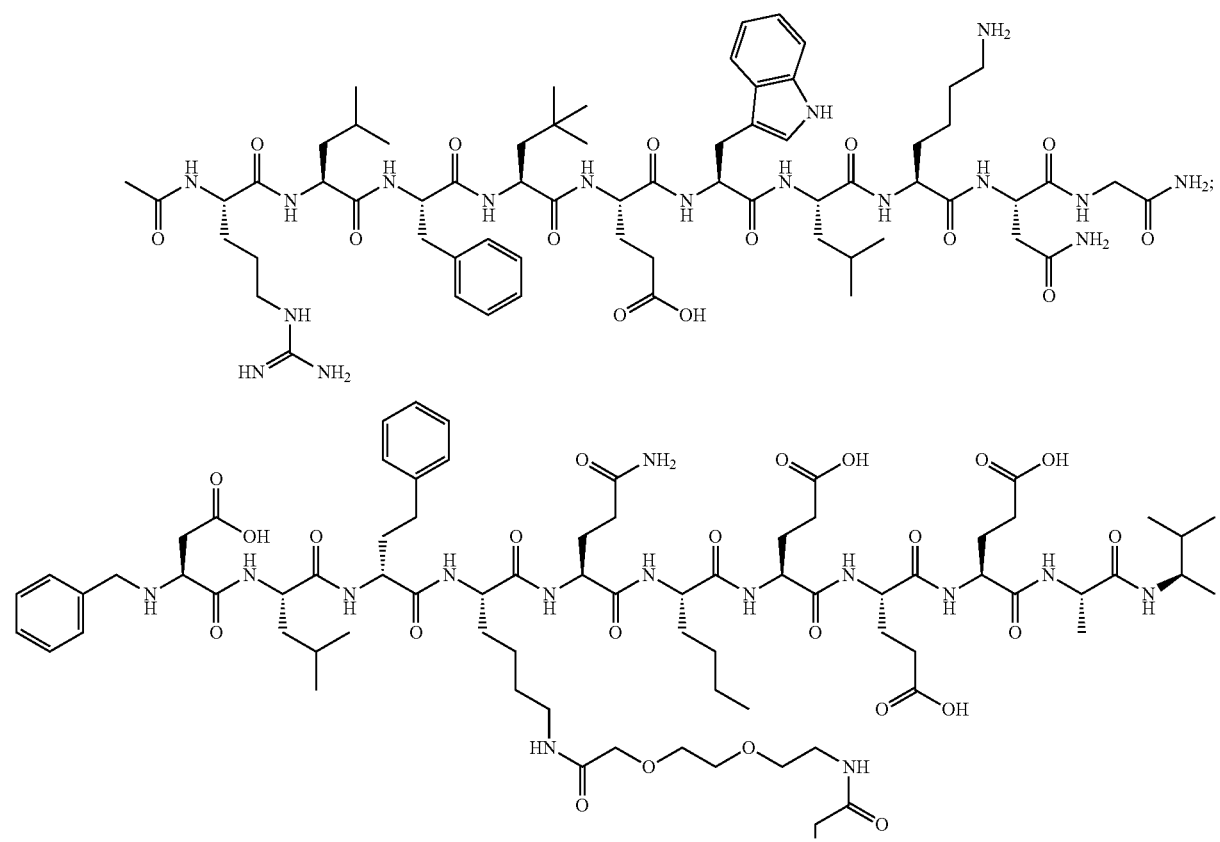

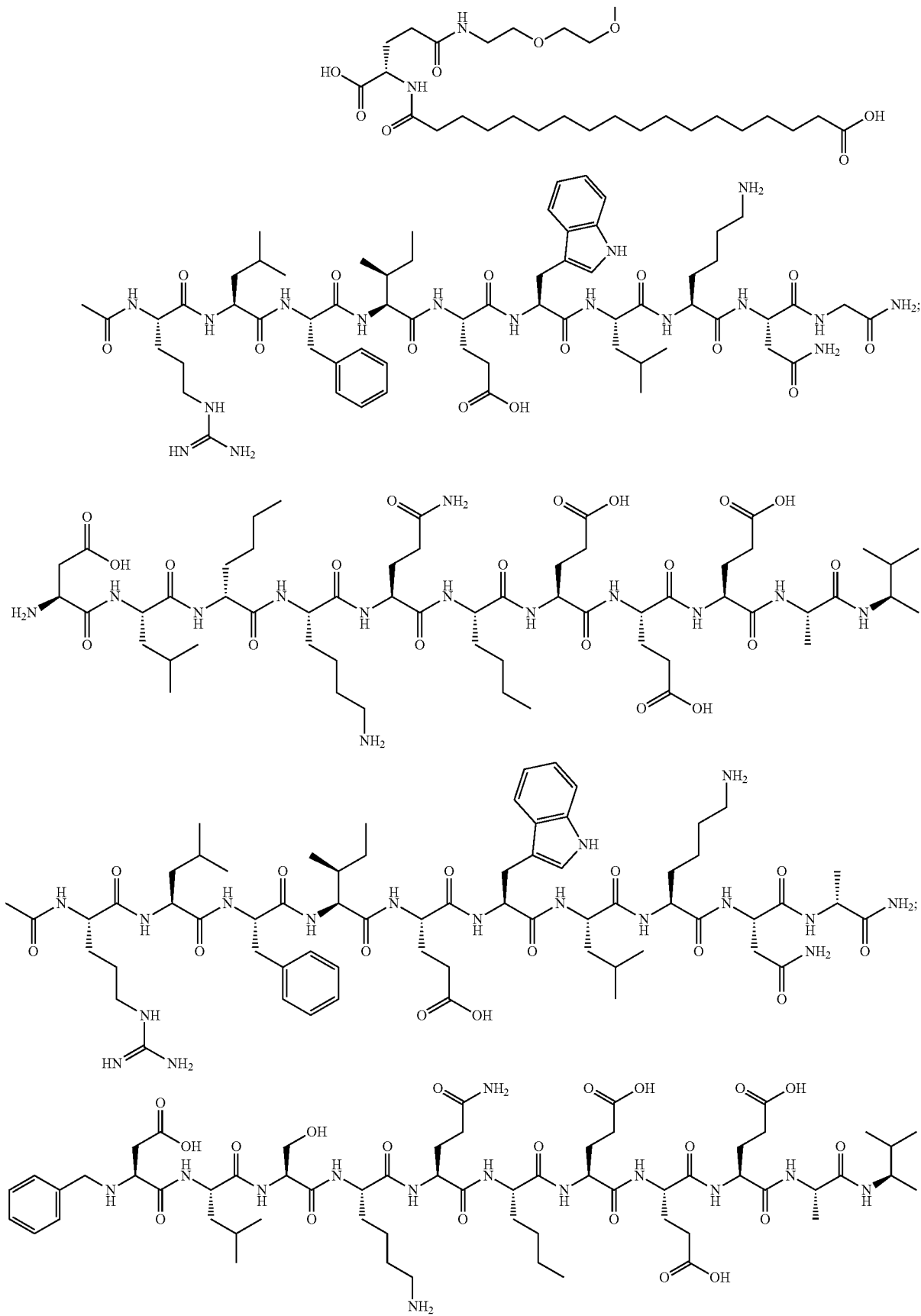

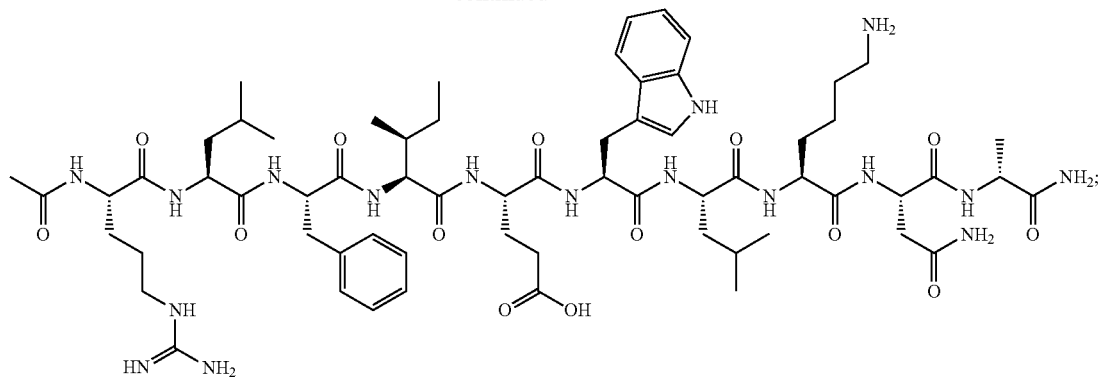
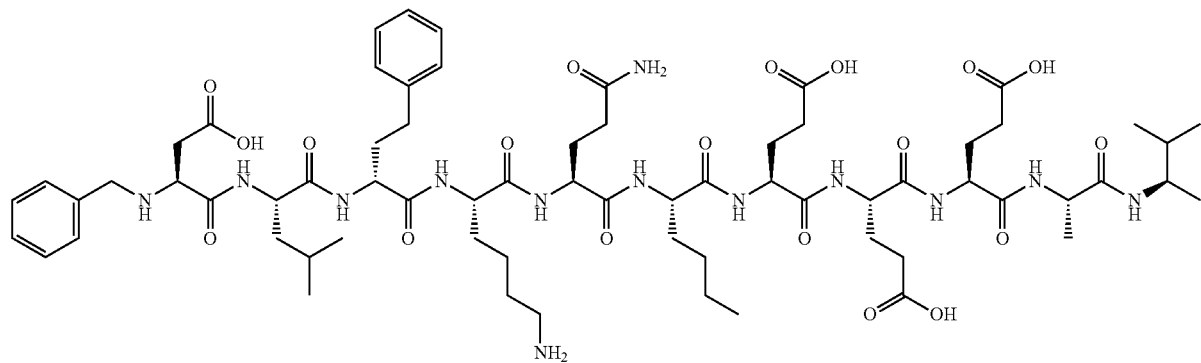
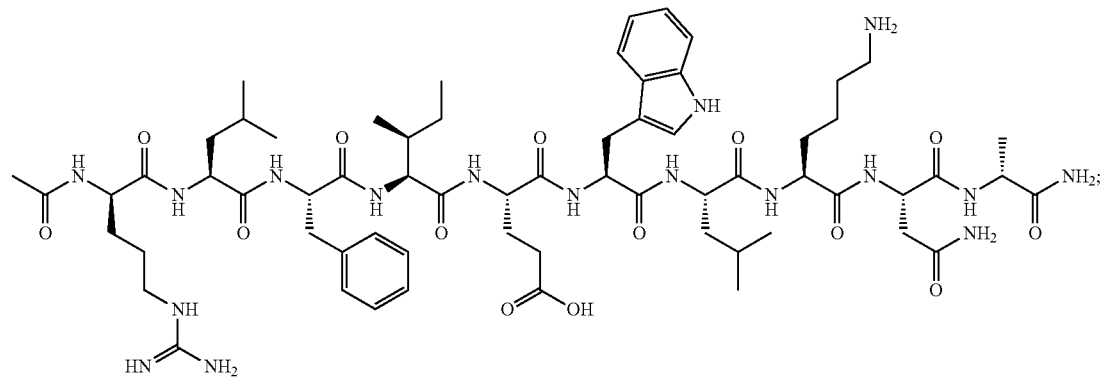
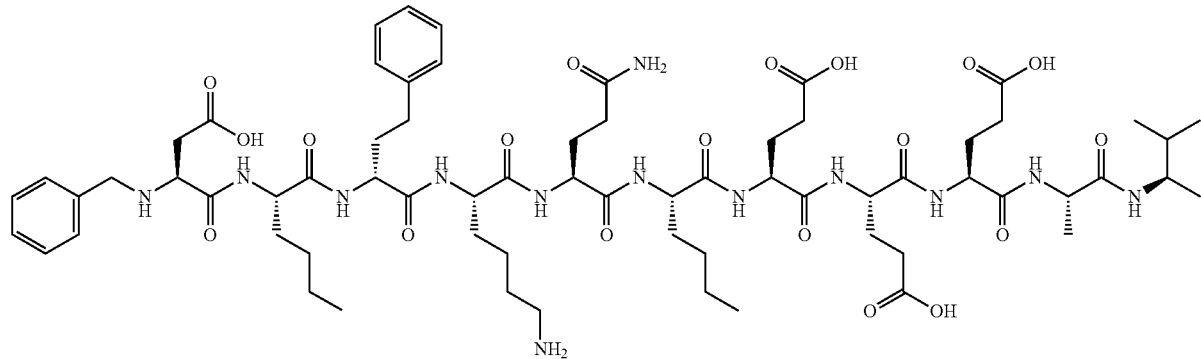

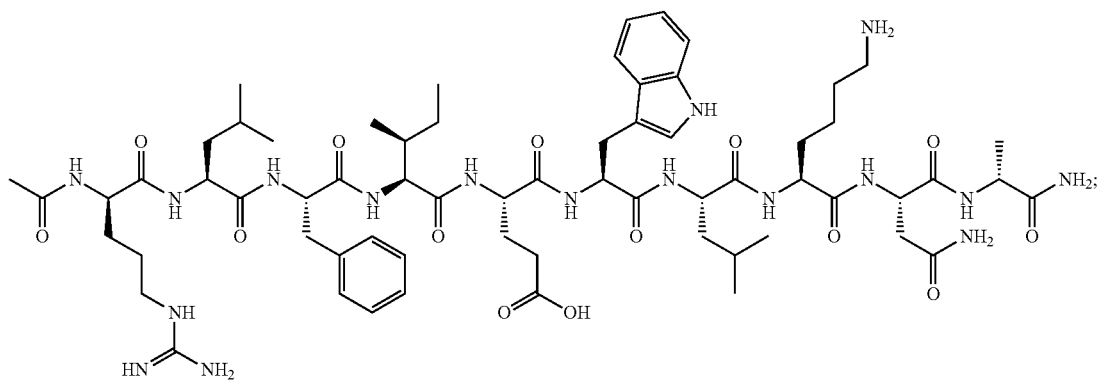
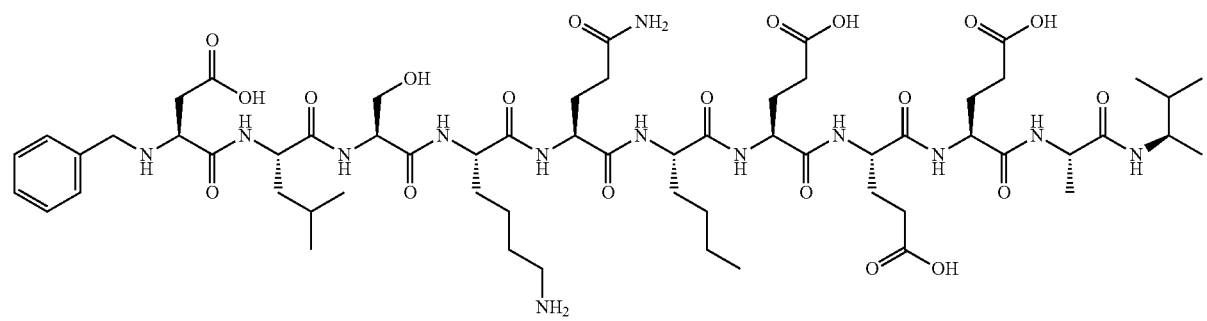
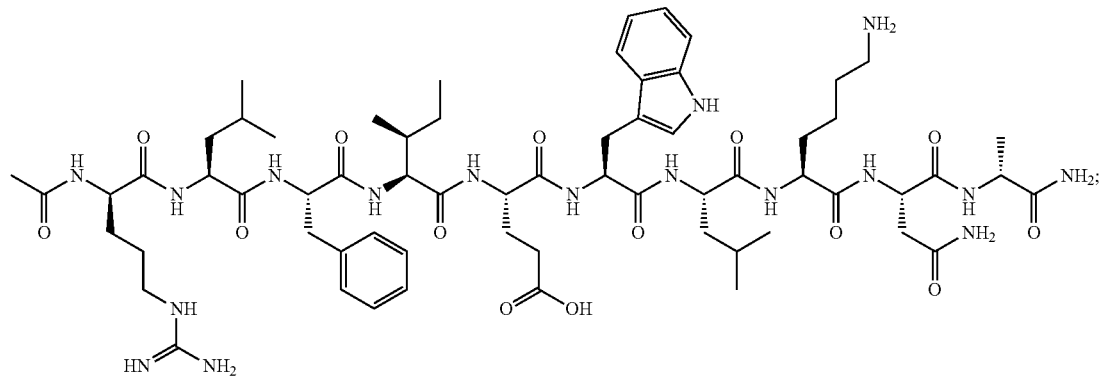
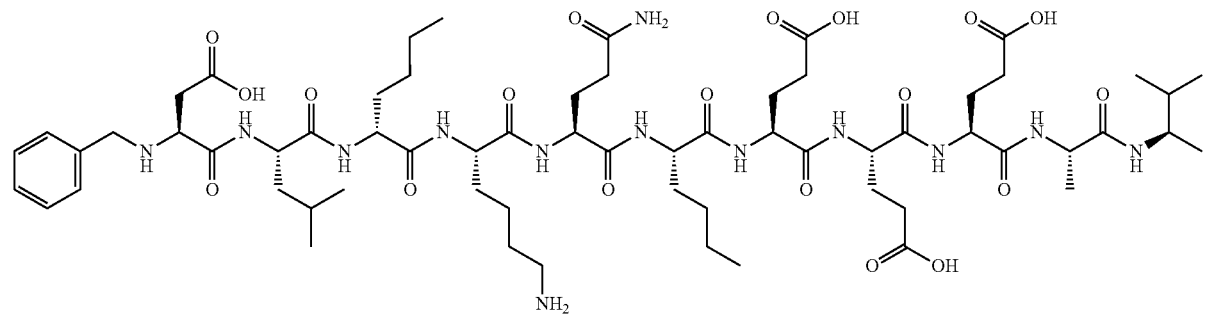

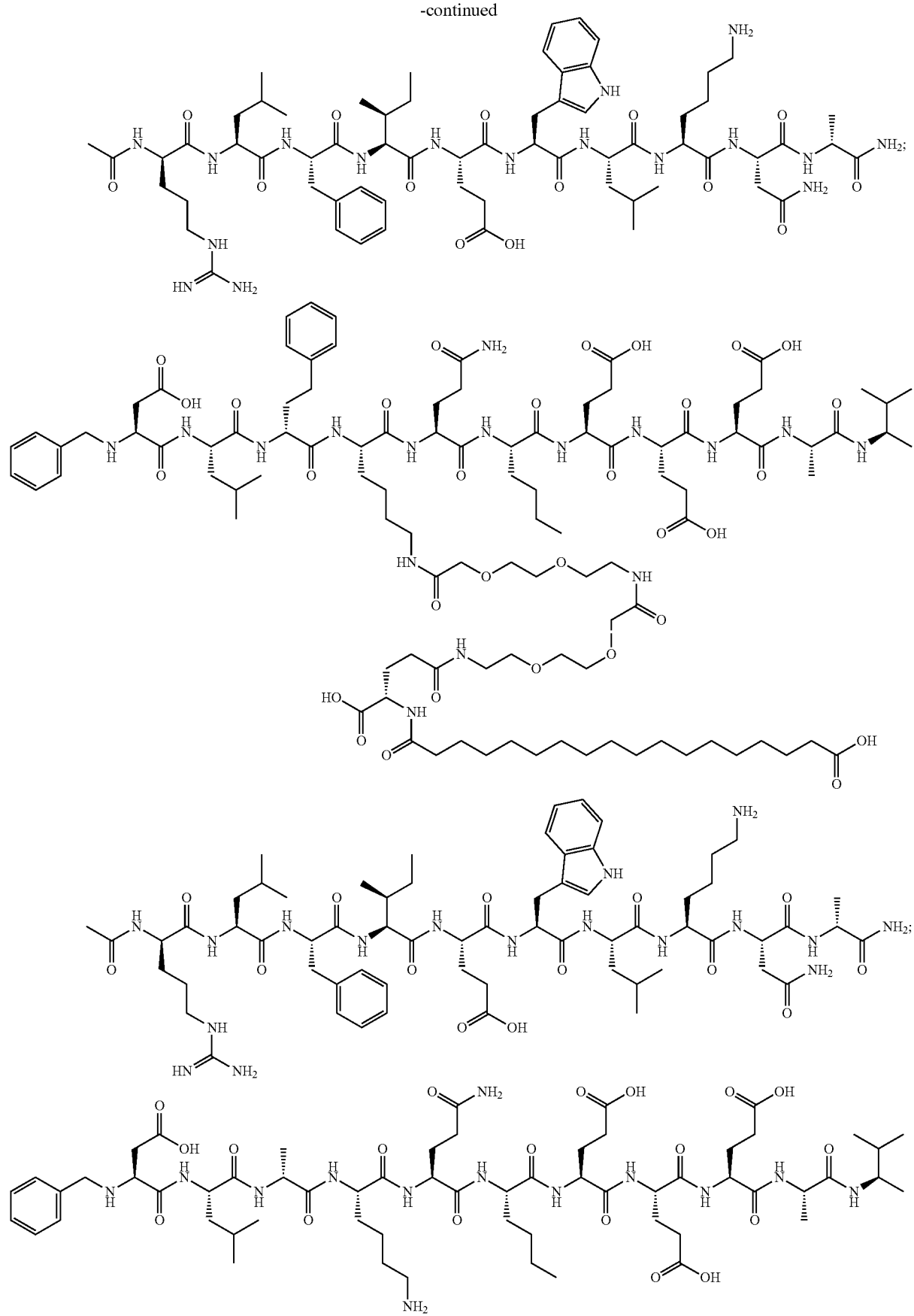

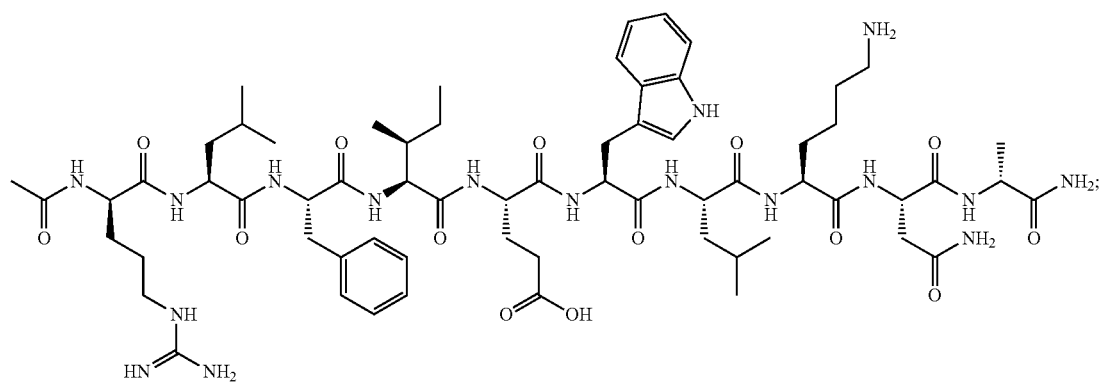
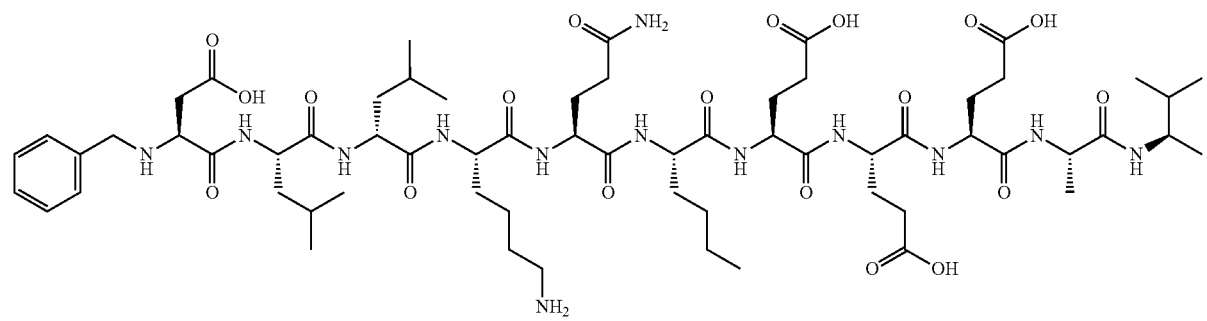
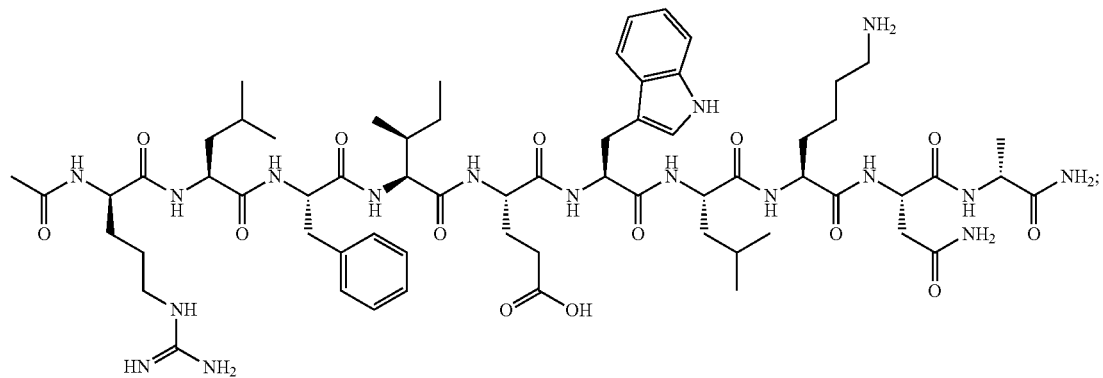
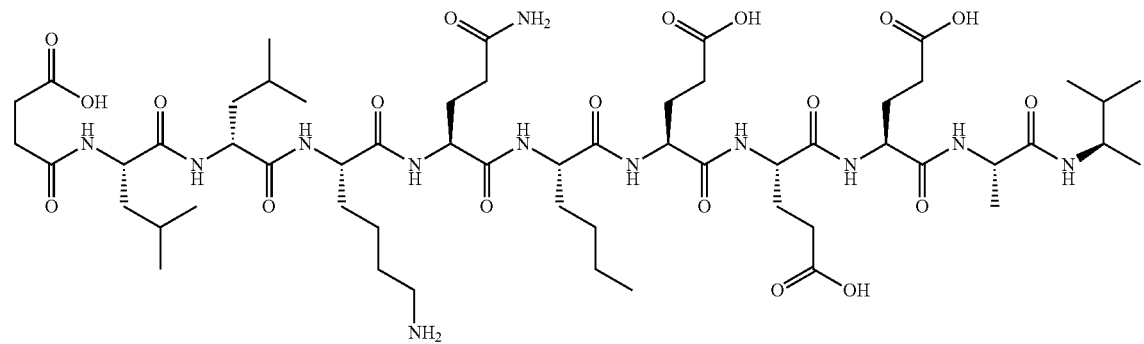

101
102
-continued
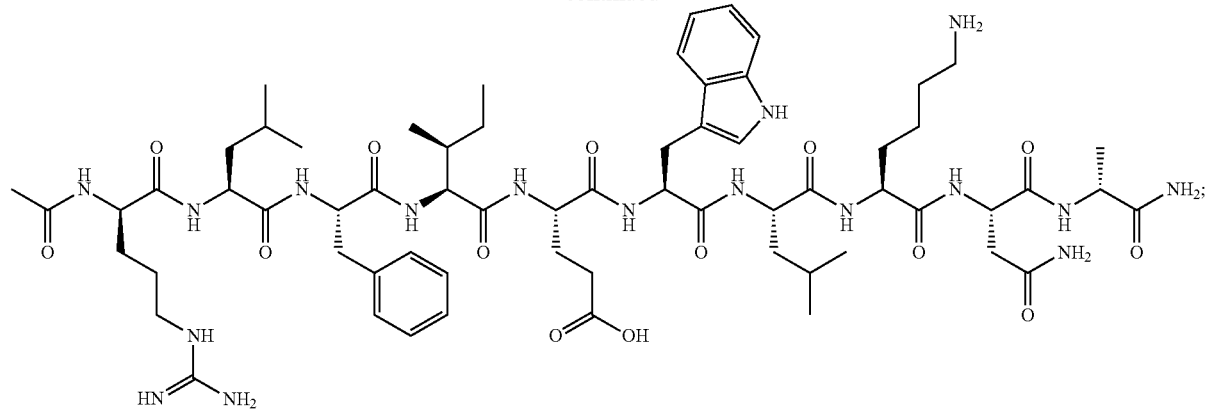
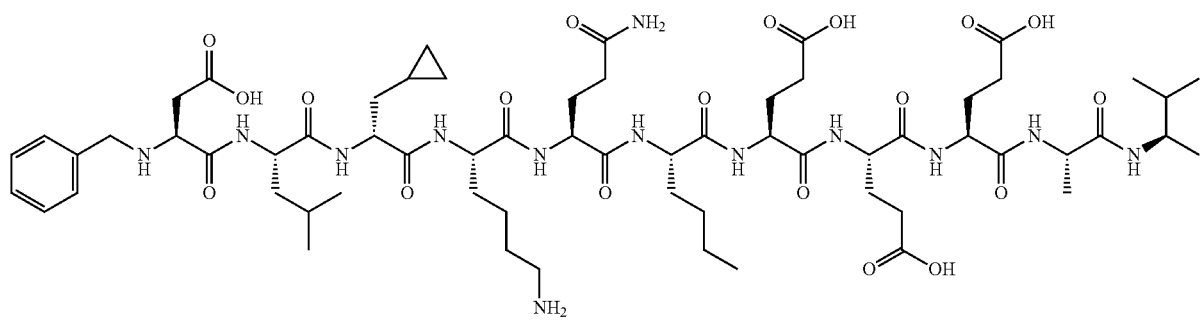
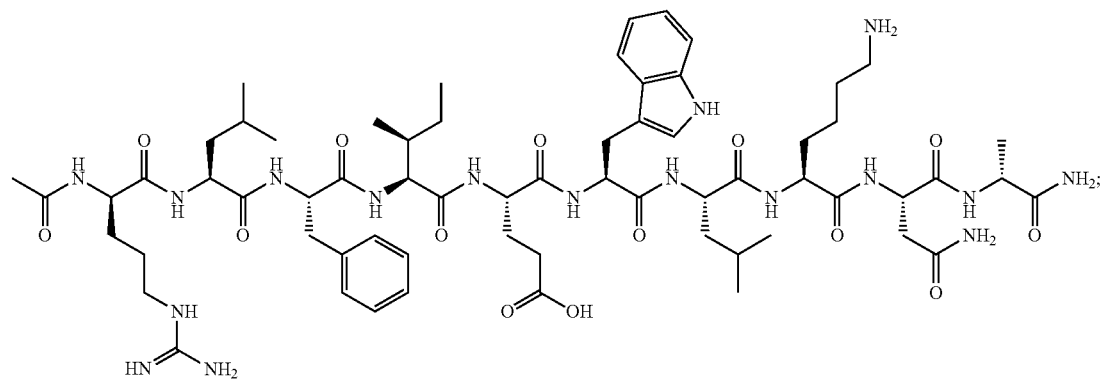
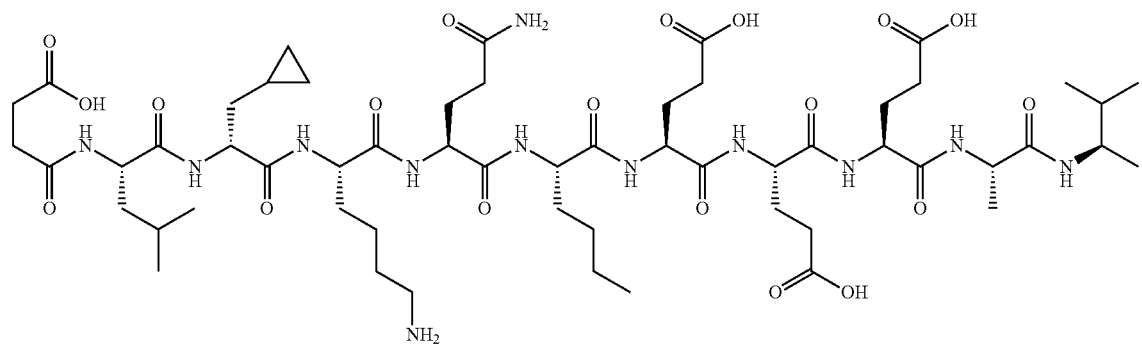

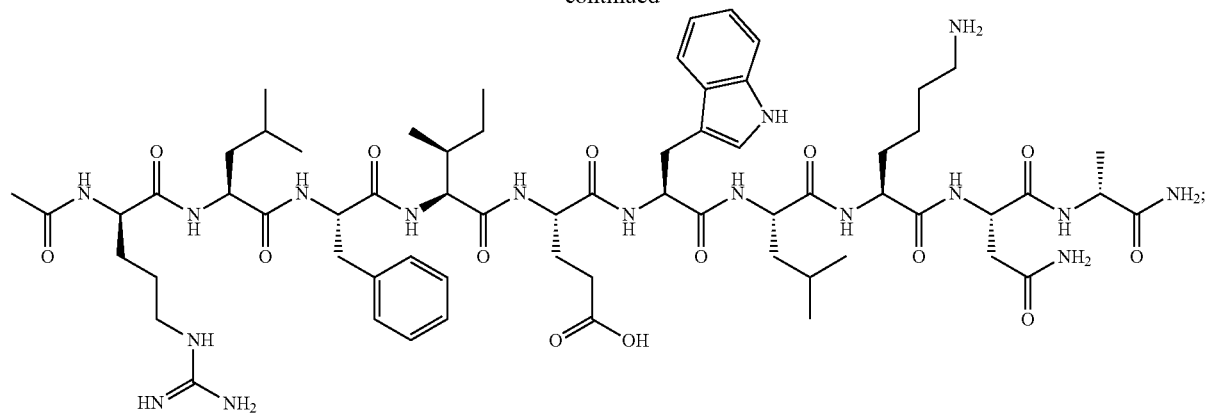
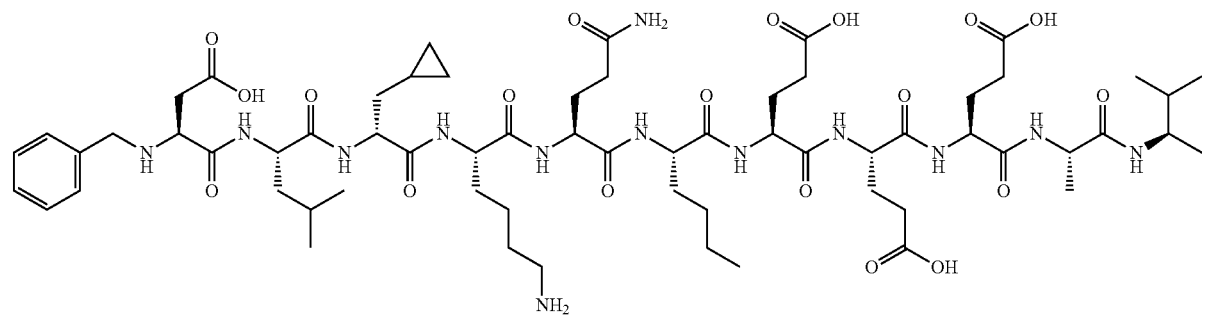
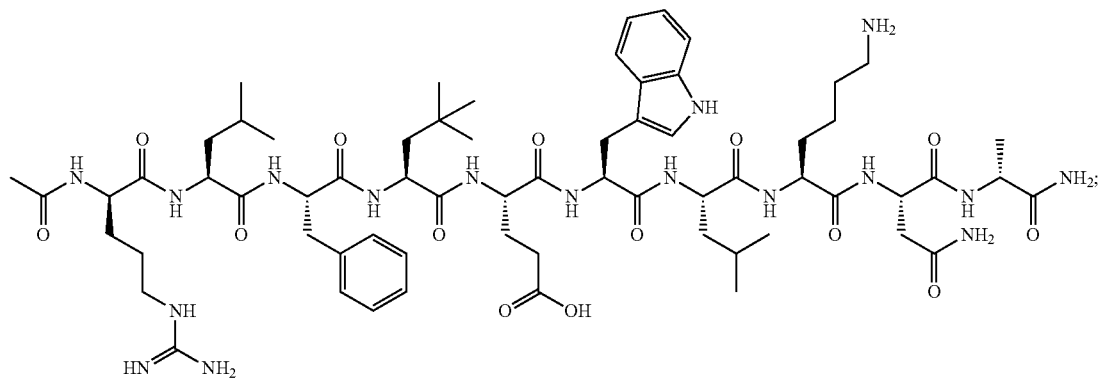
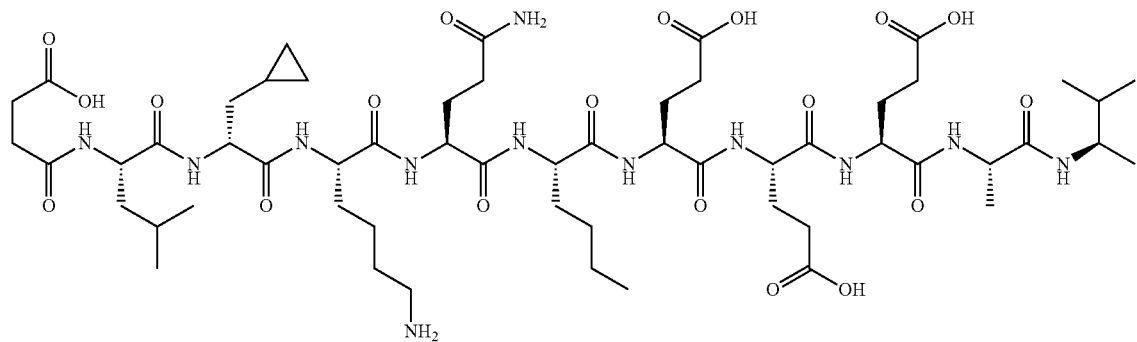

-continued
105
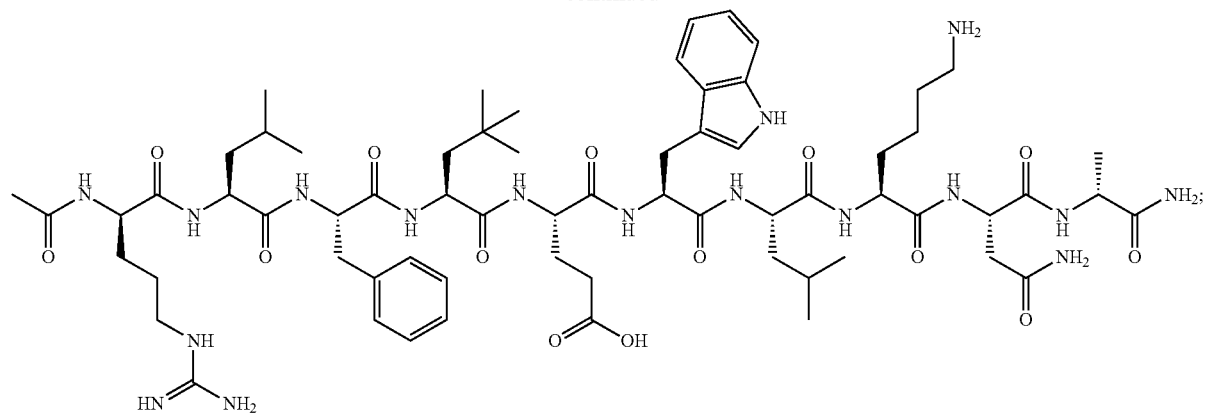
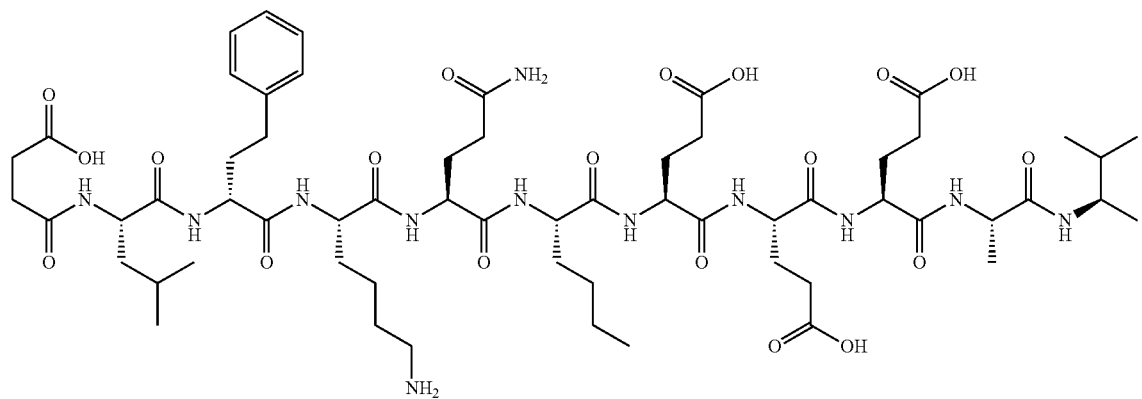
106
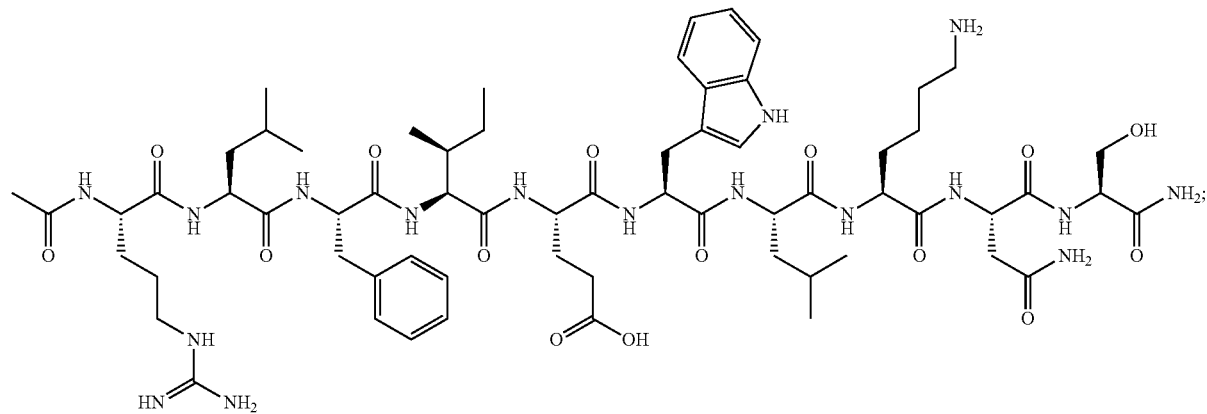
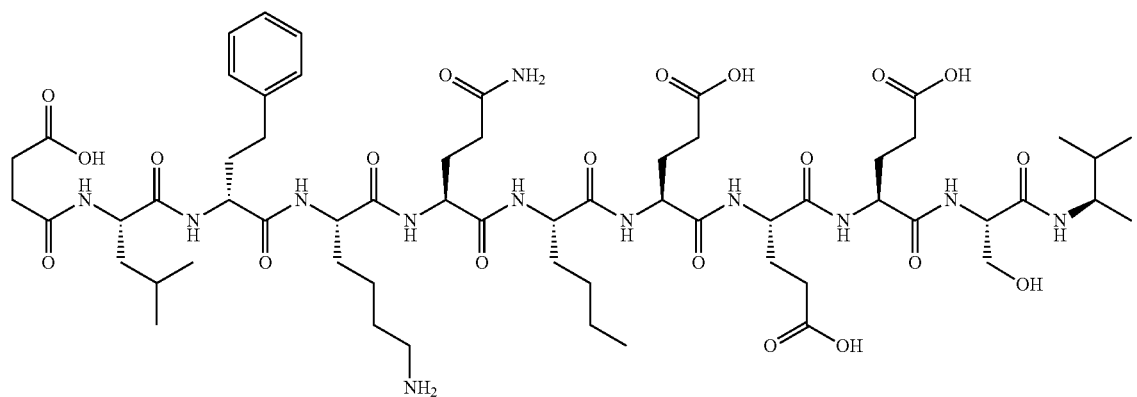

107 108
-continued
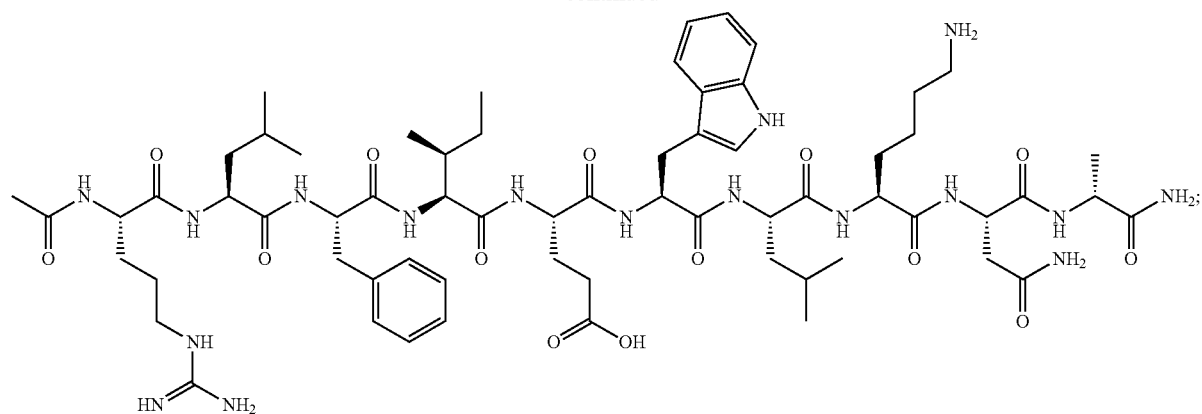
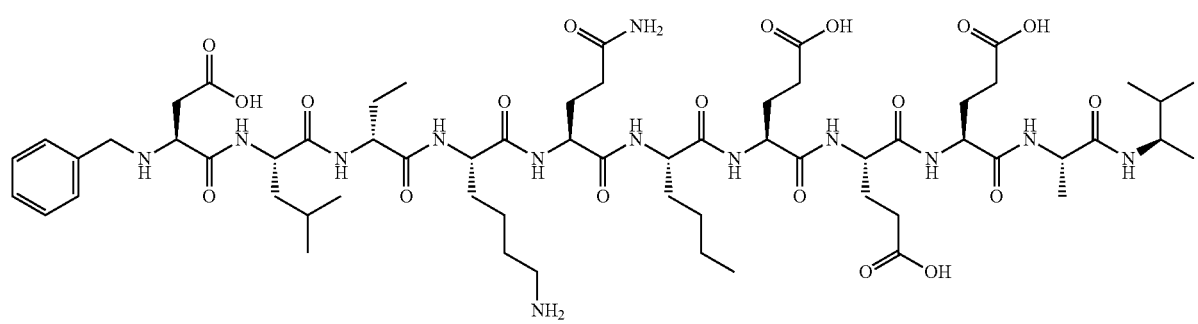
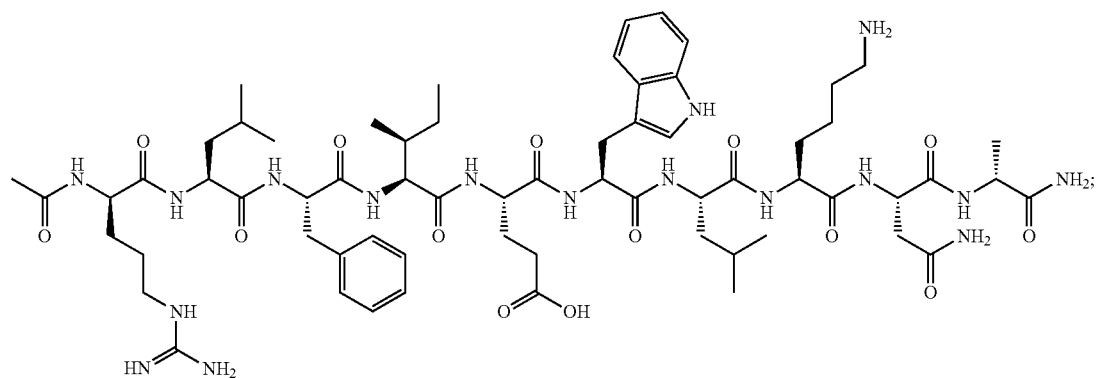
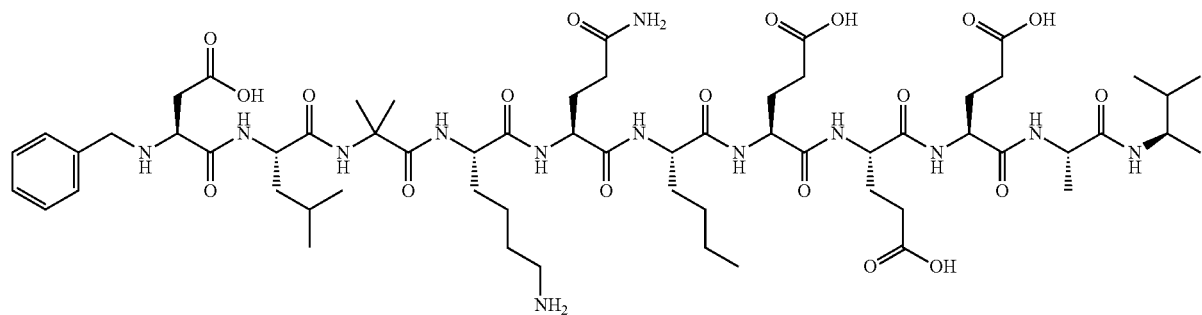

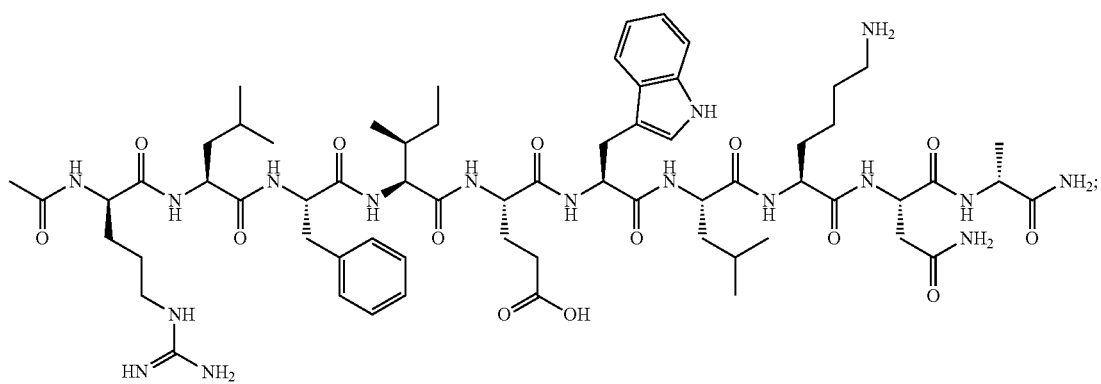
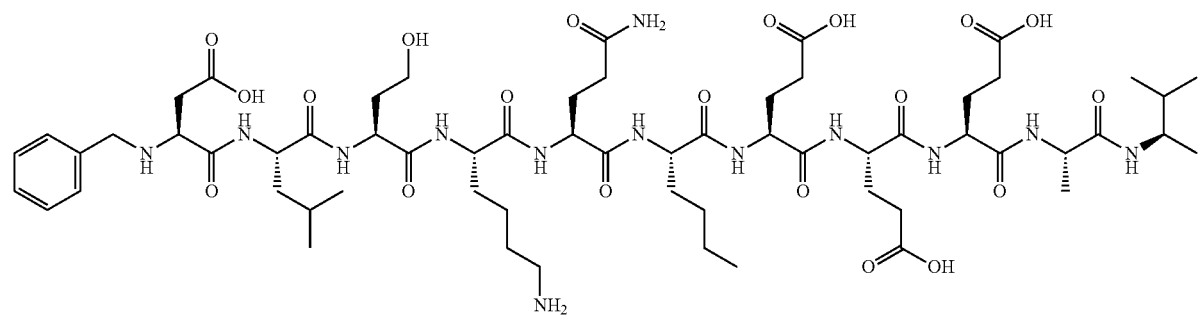
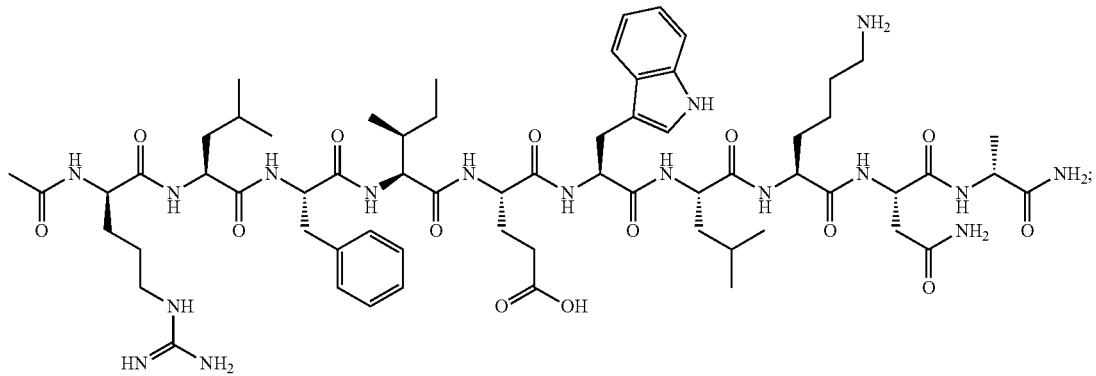
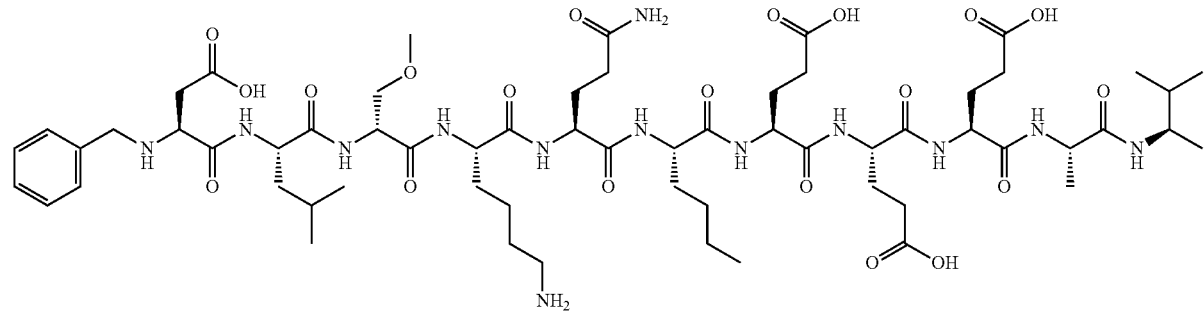

-continued
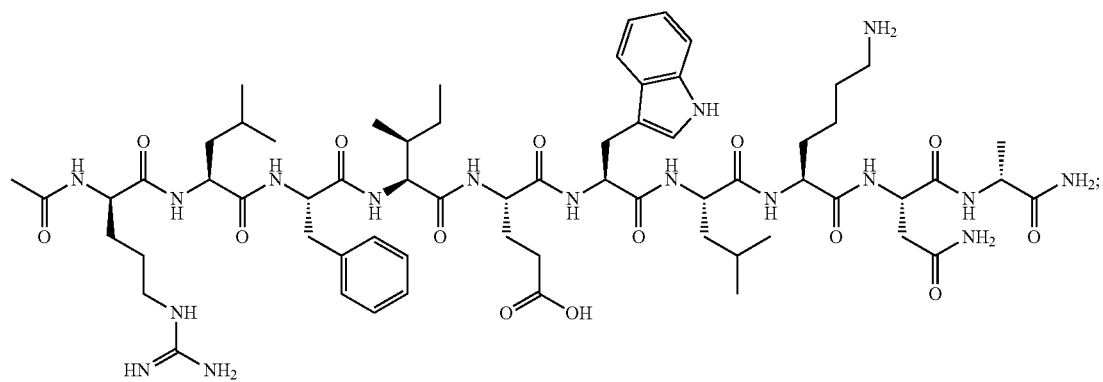
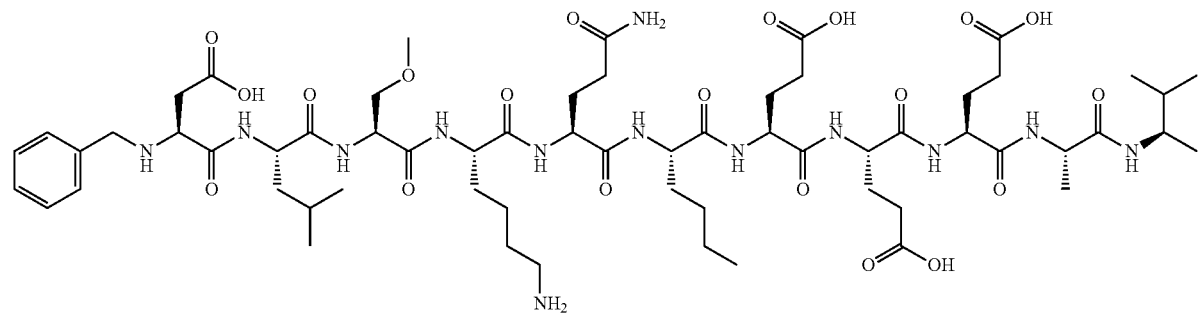
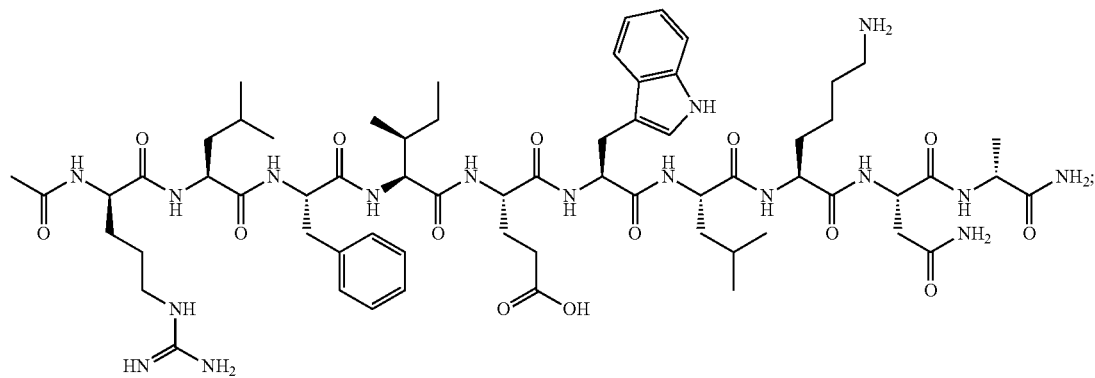
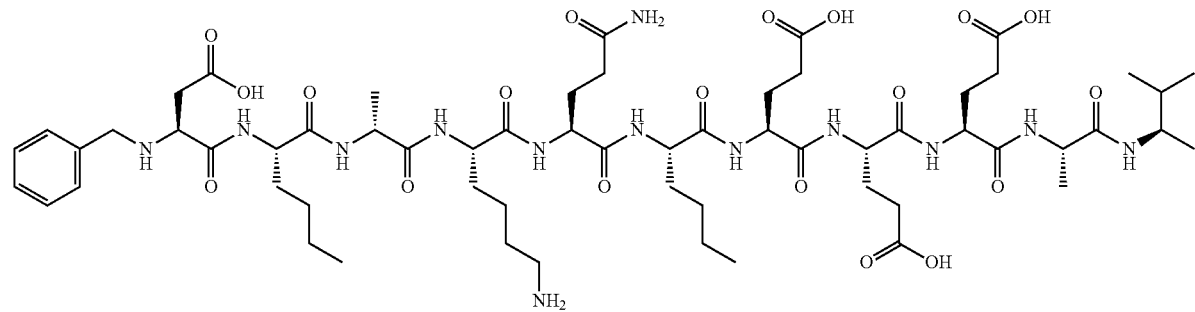

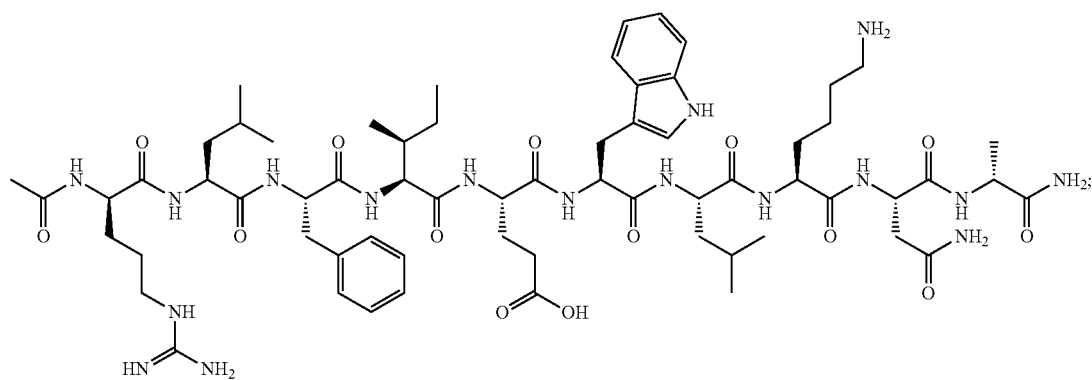
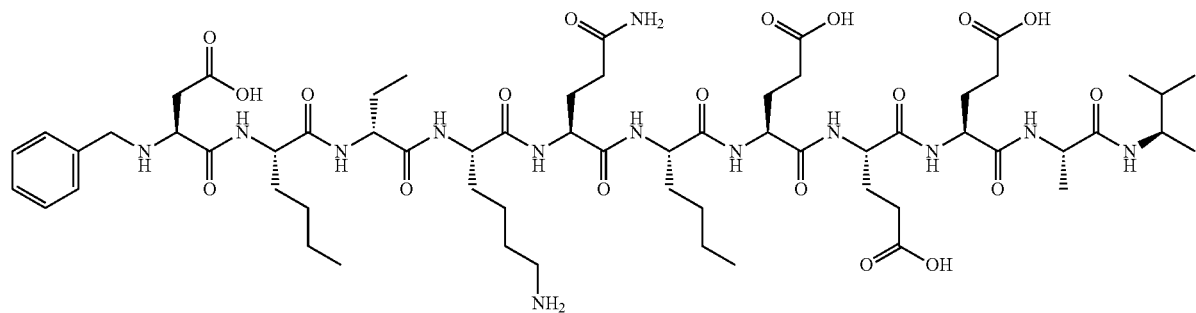
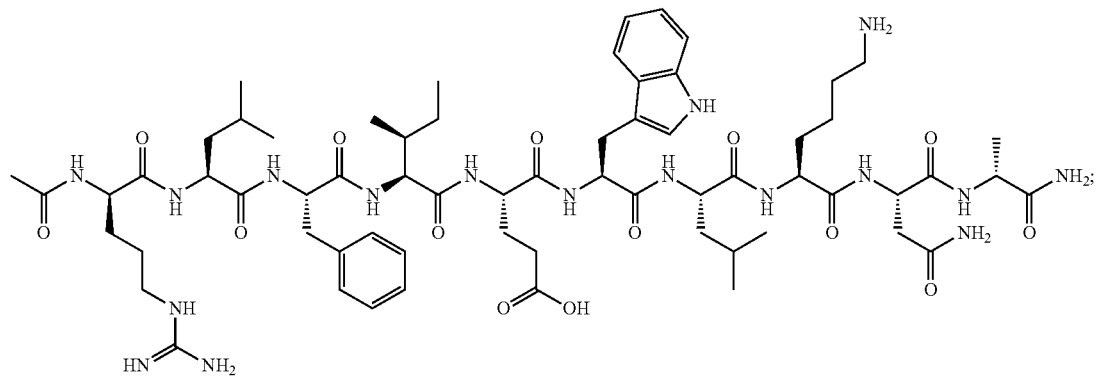
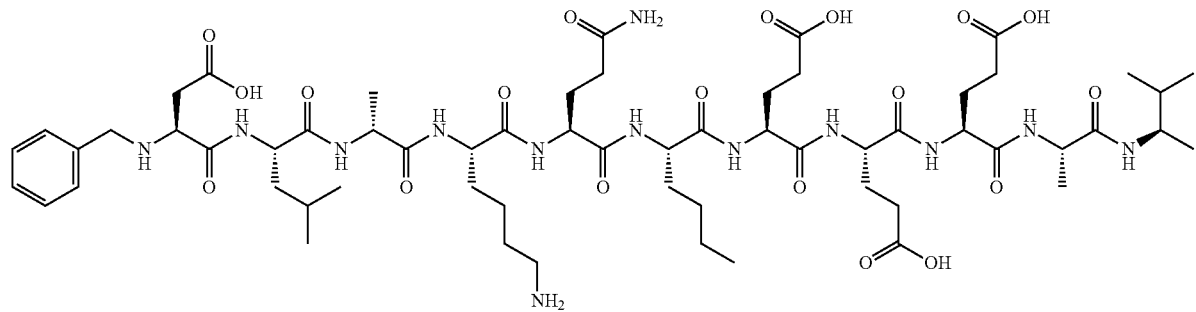

-continued
115
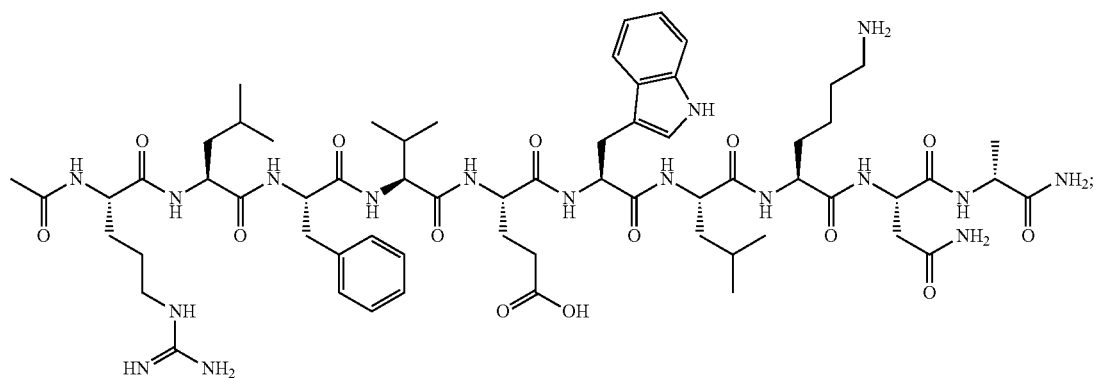
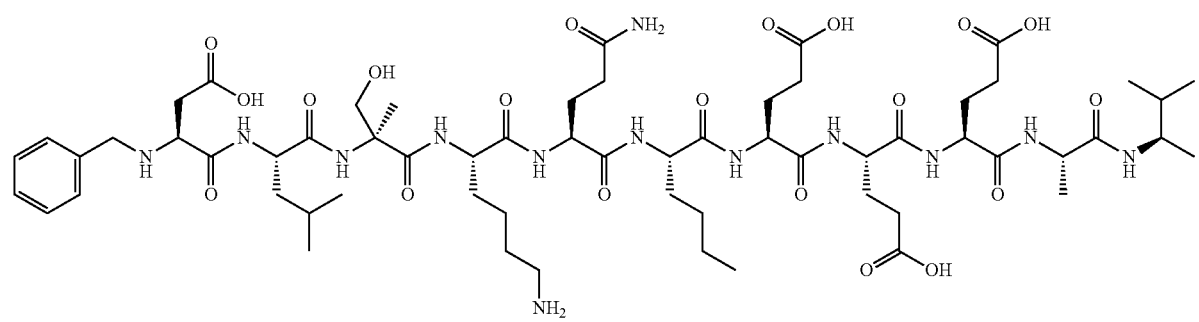
116
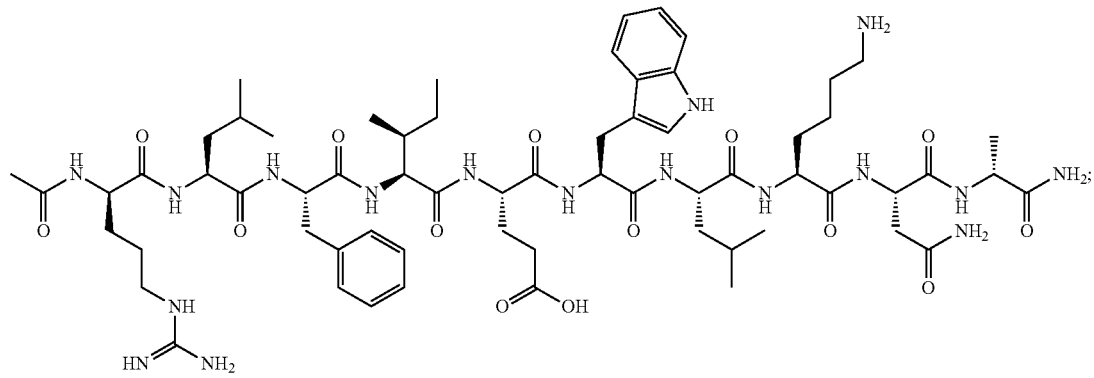
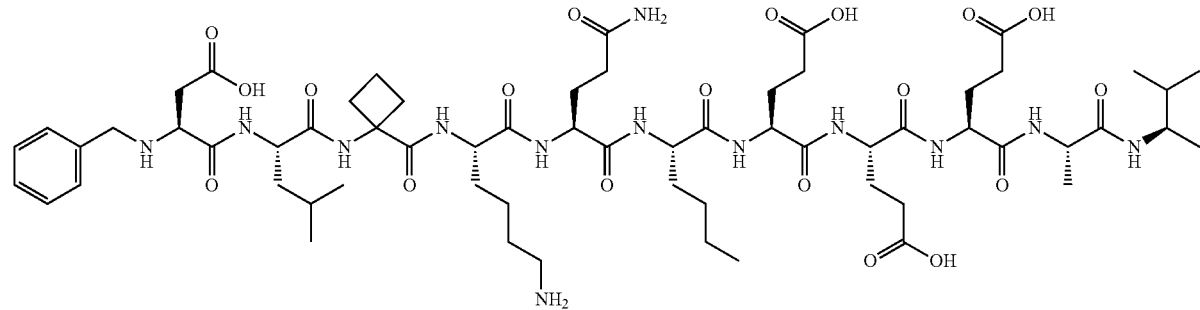

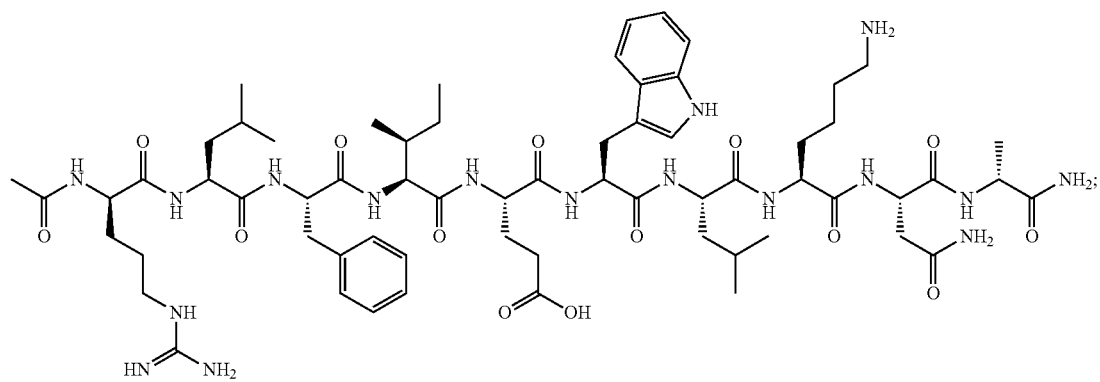
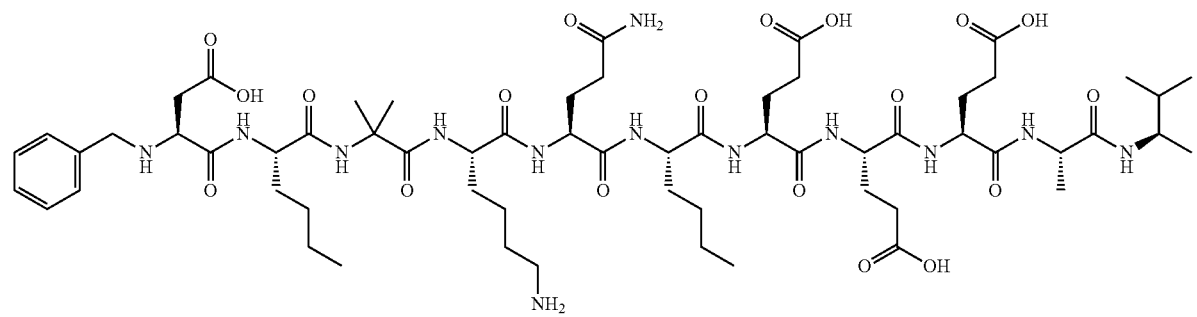
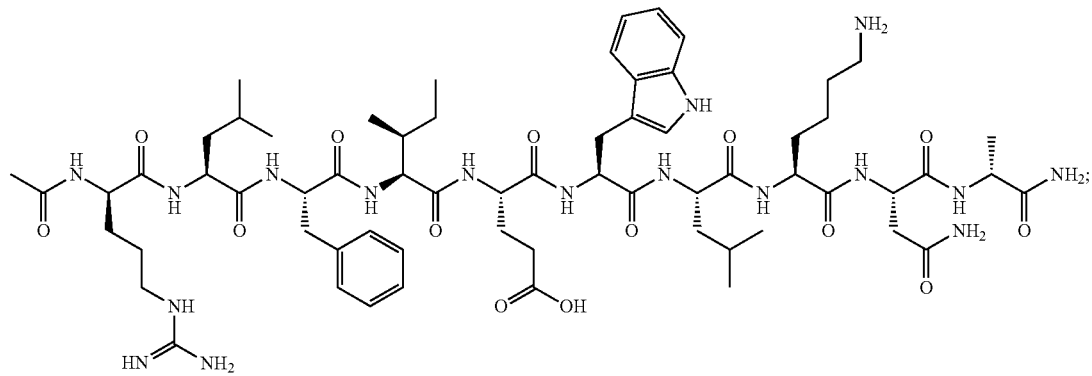
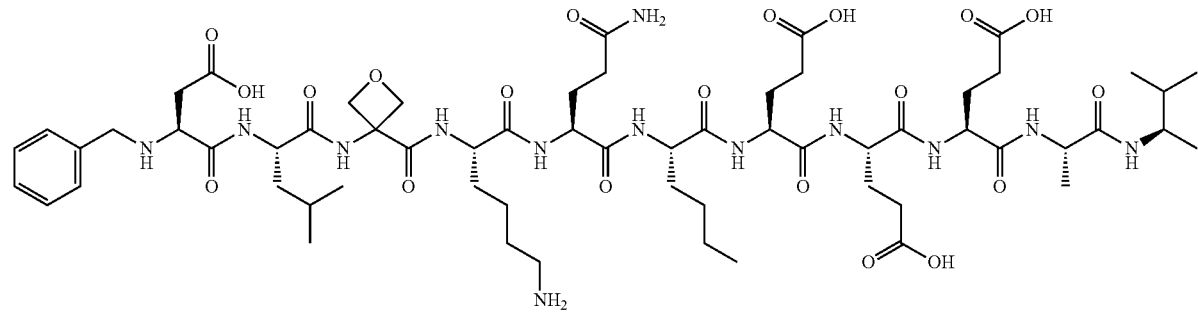

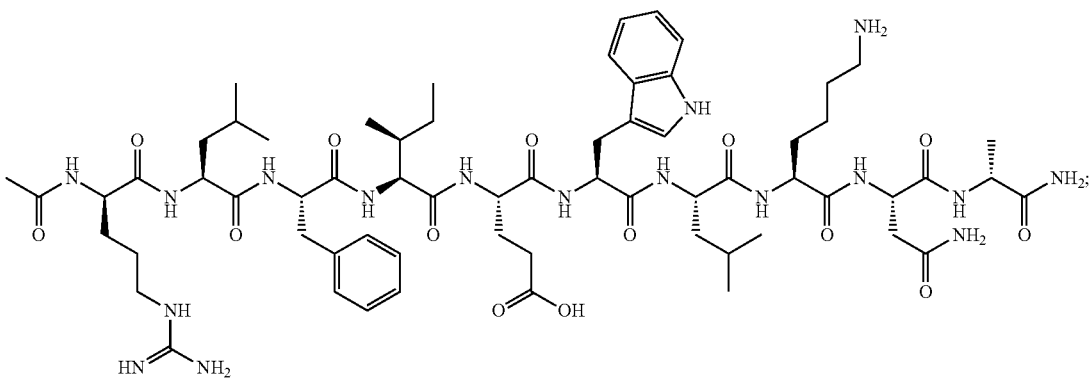
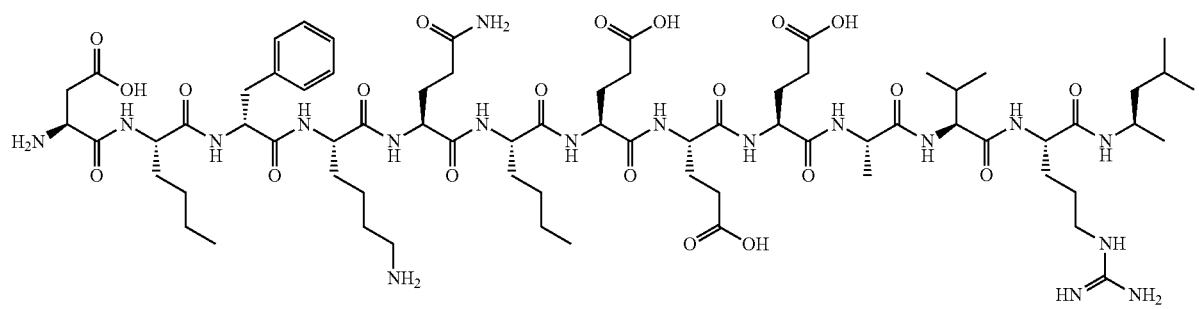
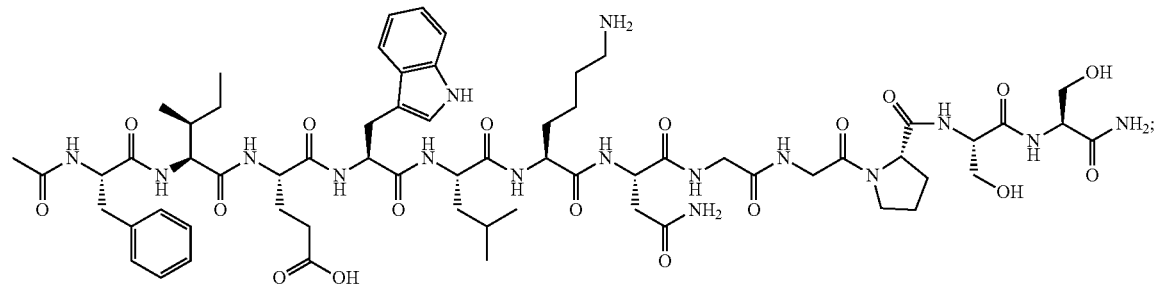
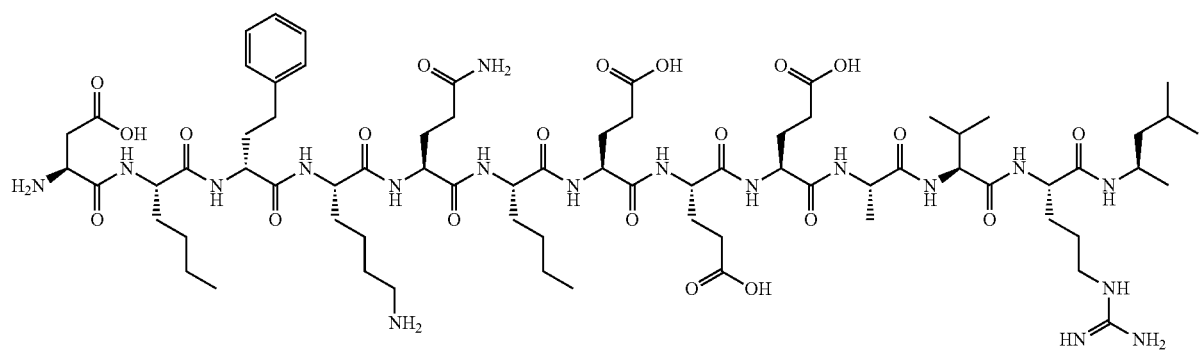
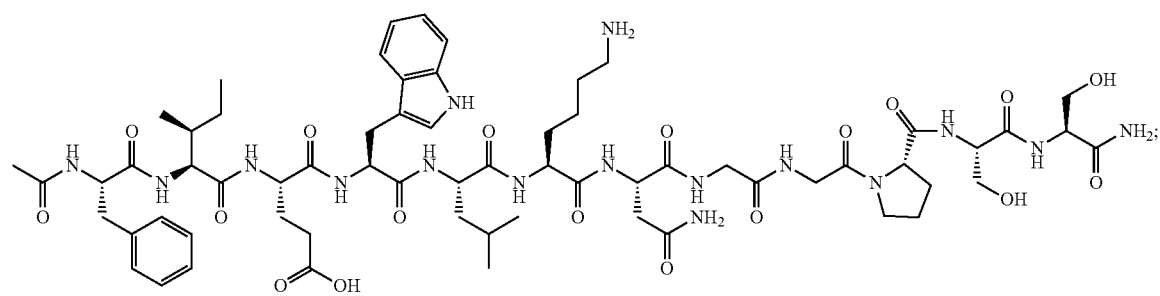

-continued
121
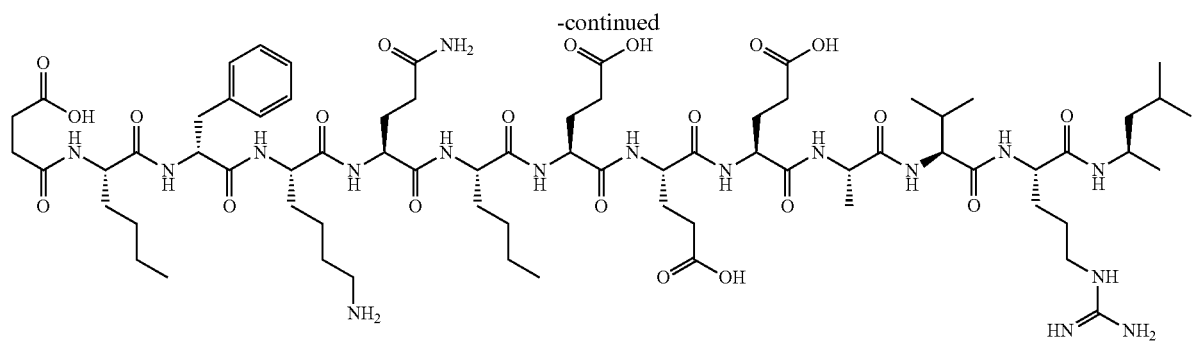
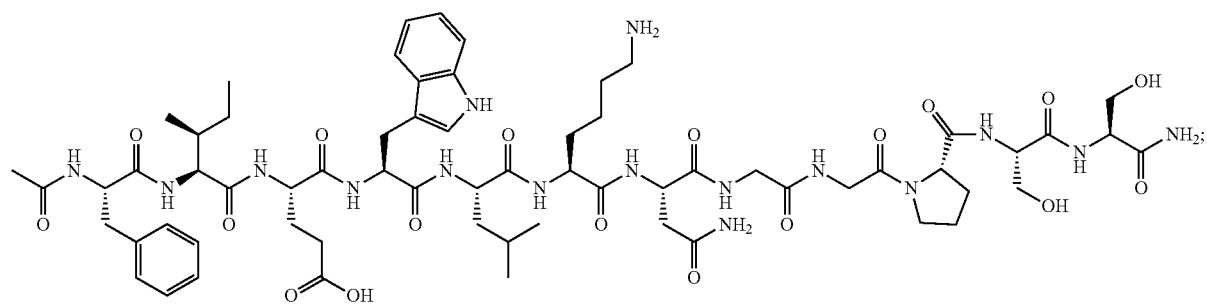
122
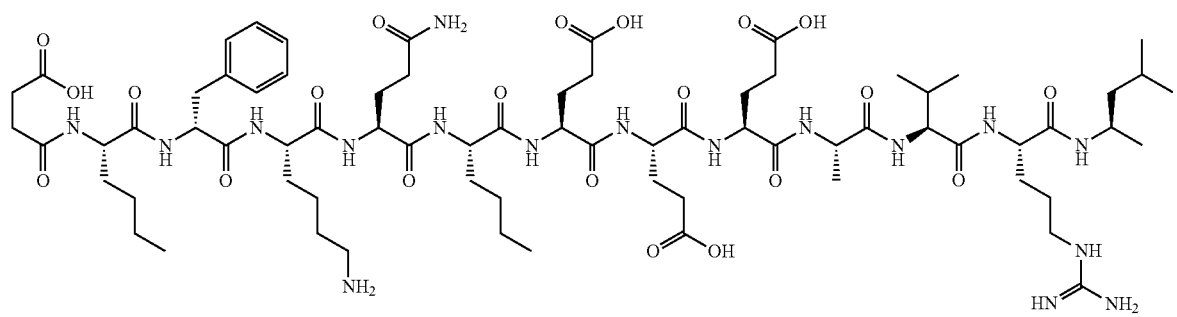
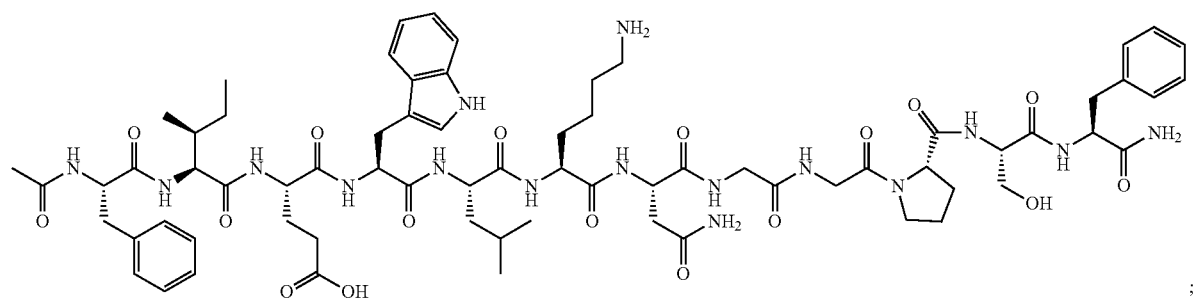
;

123
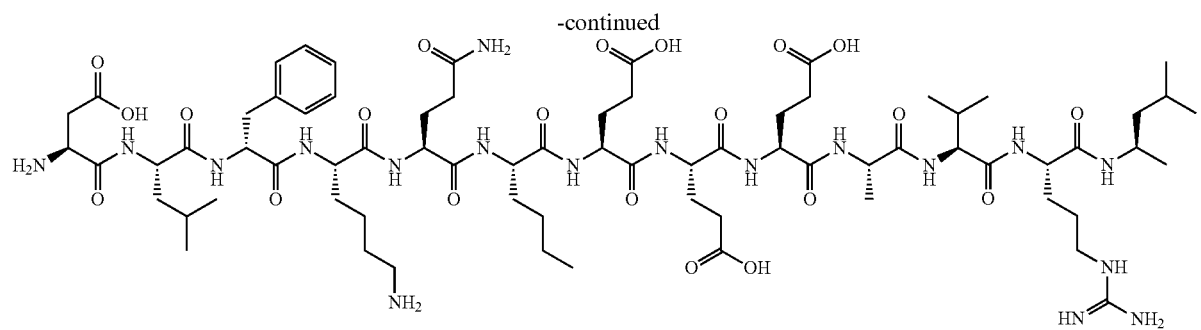
-continued
124
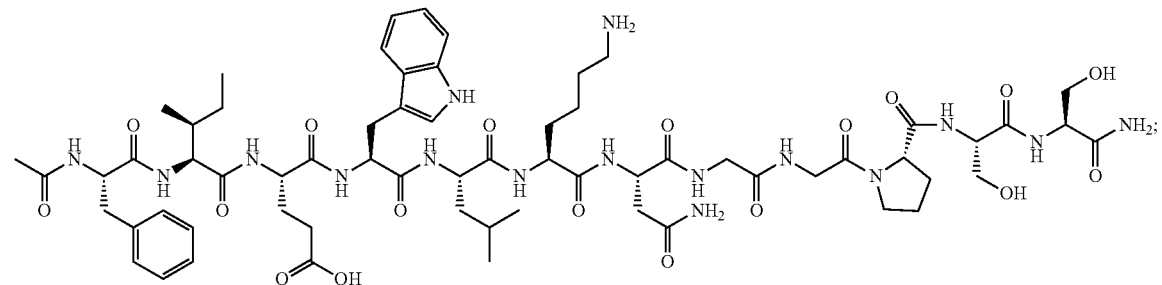
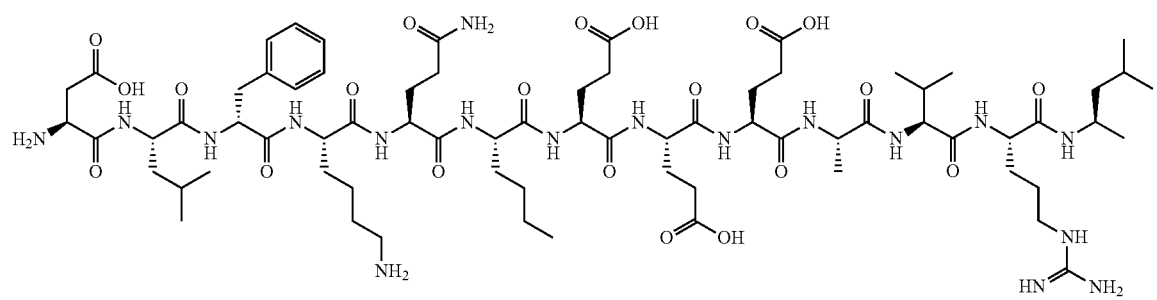
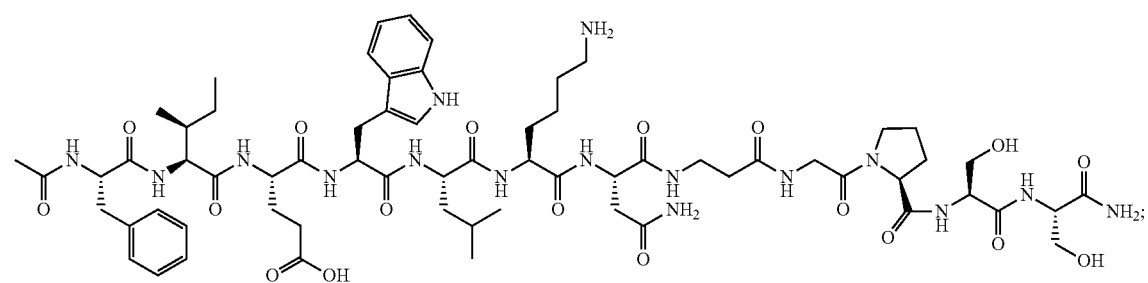

-continued
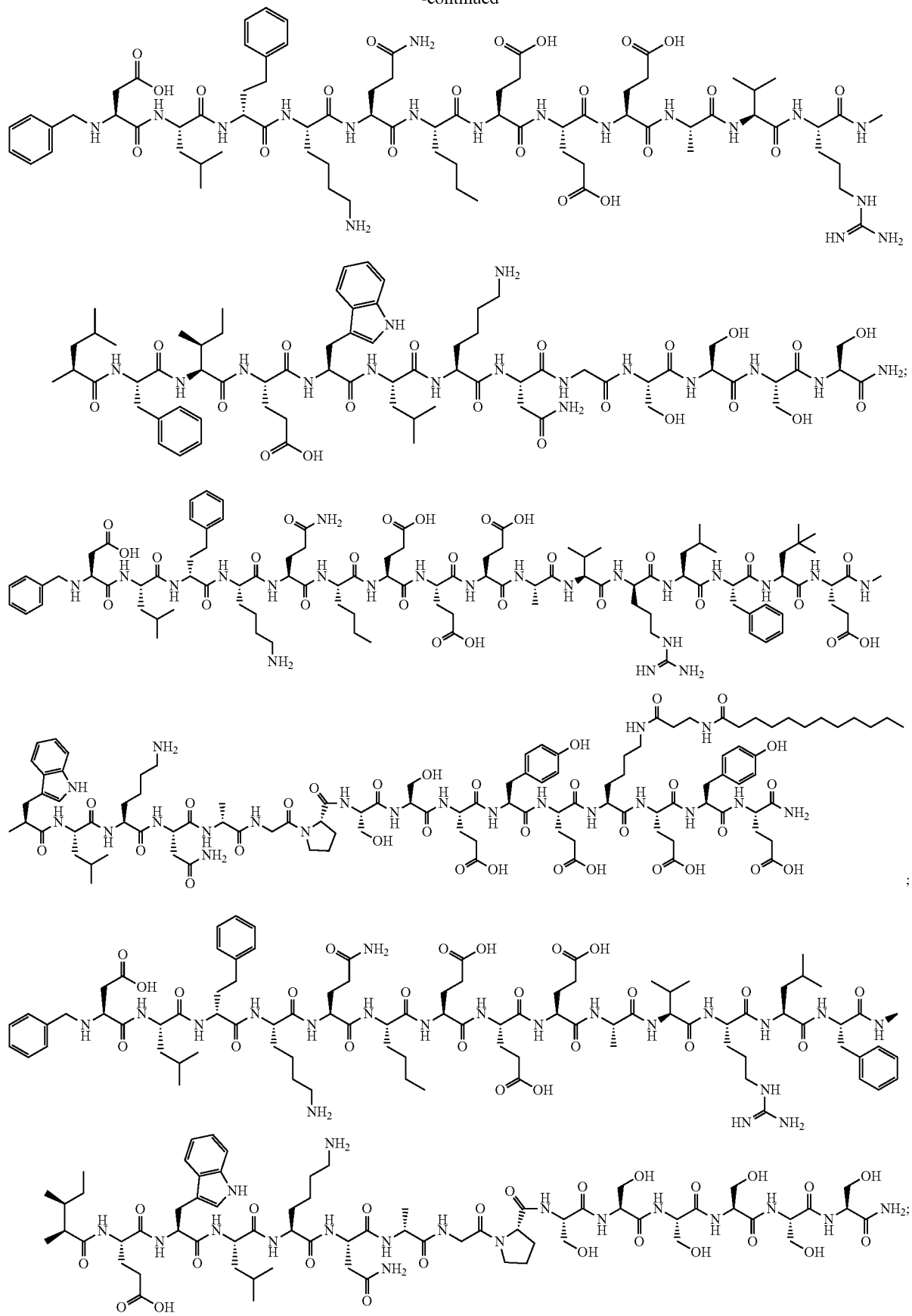

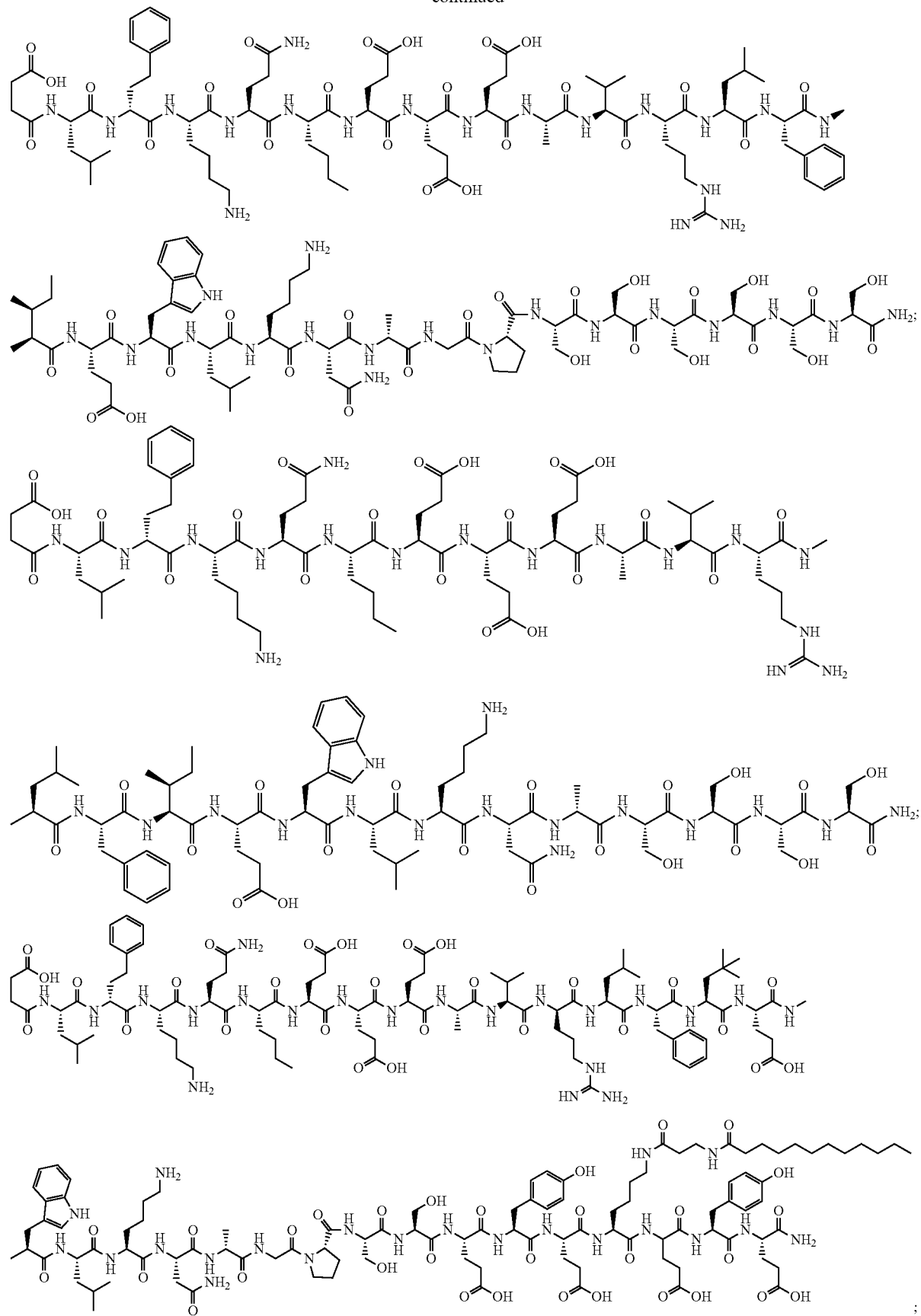

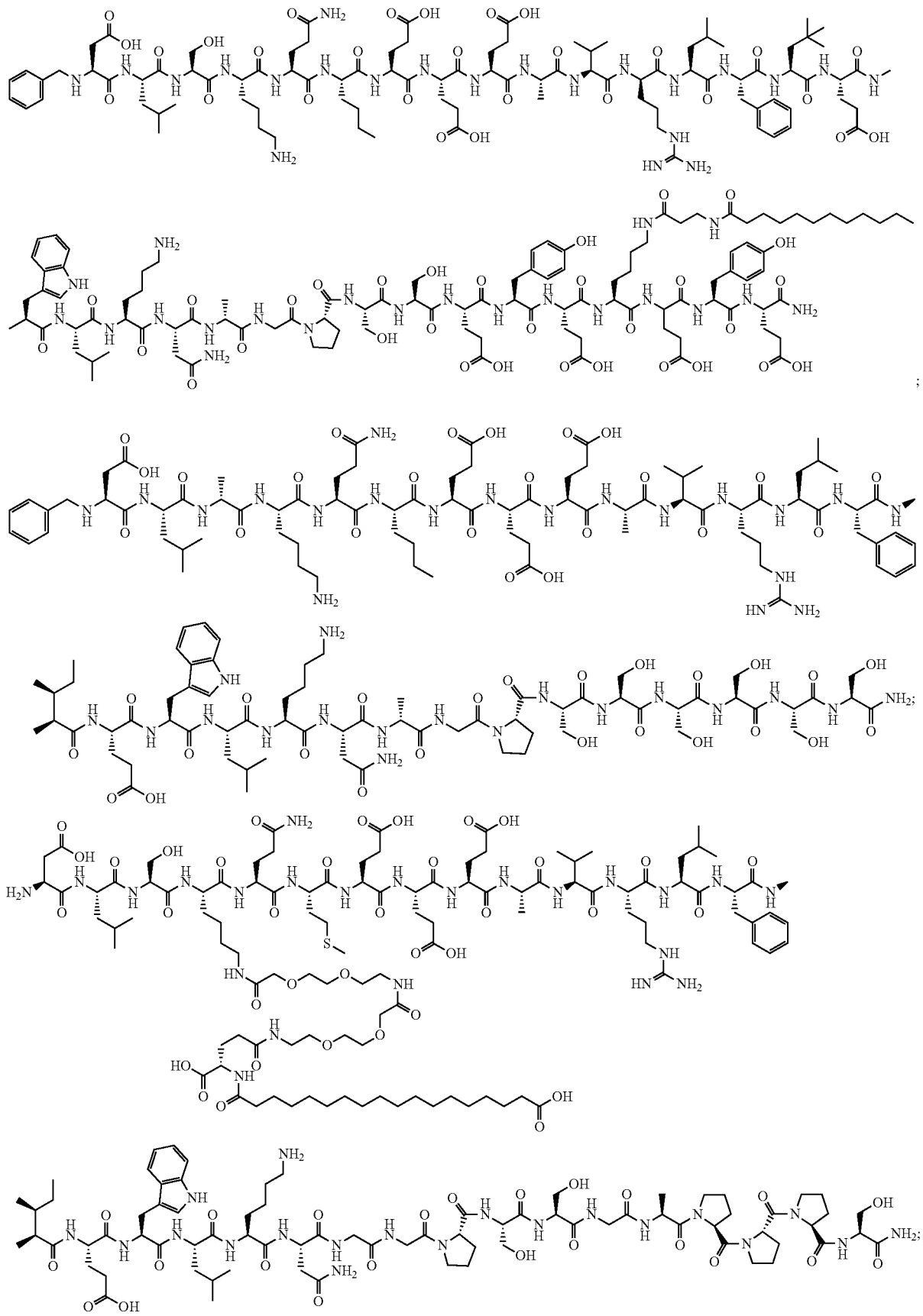

(SEQ ID NO: 2)
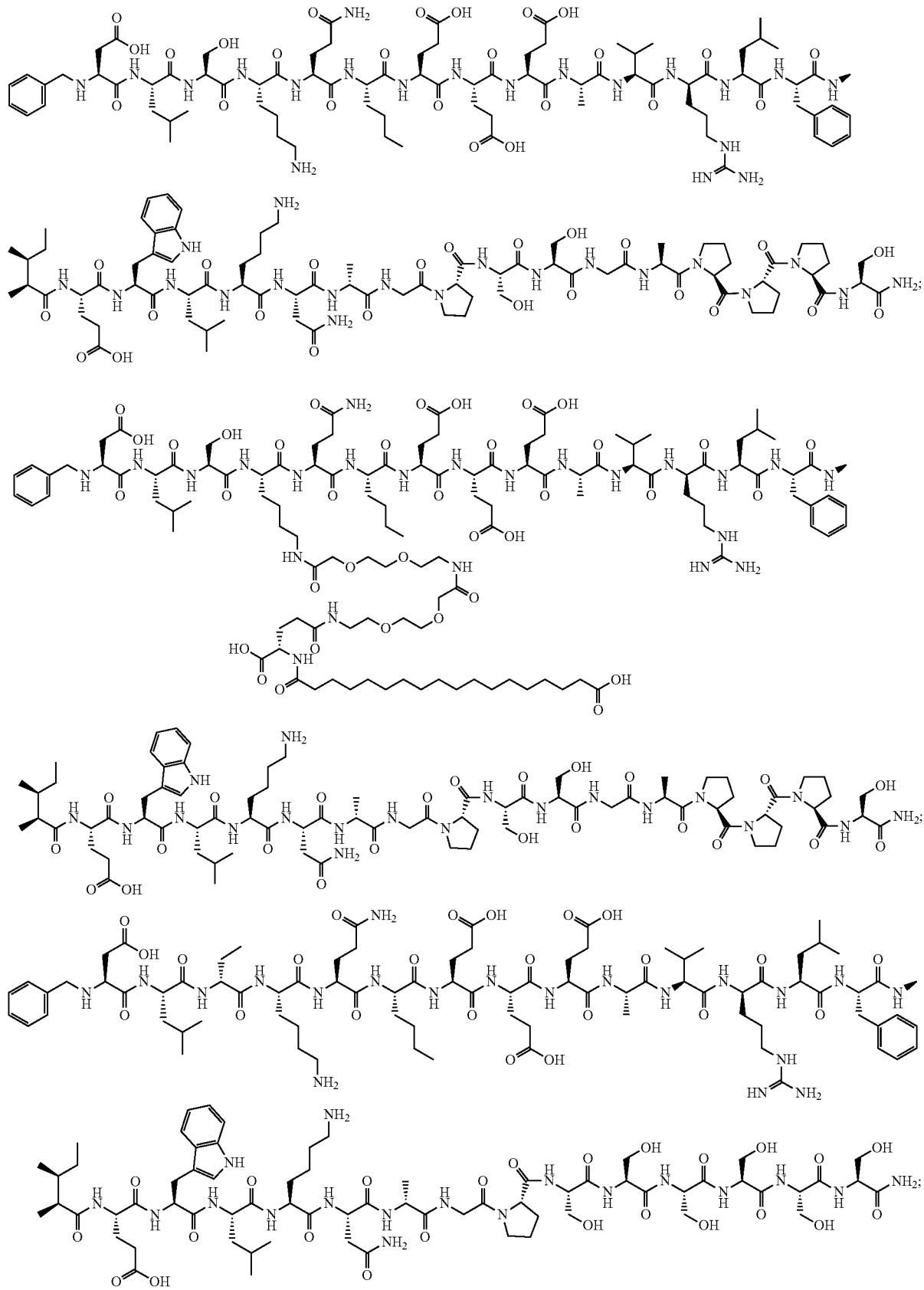

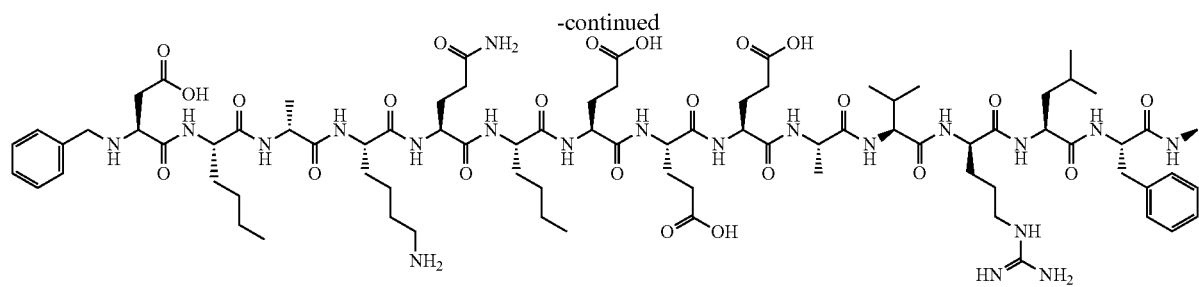
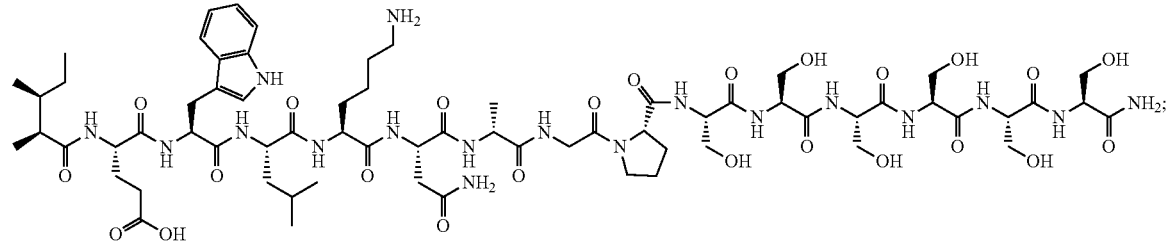
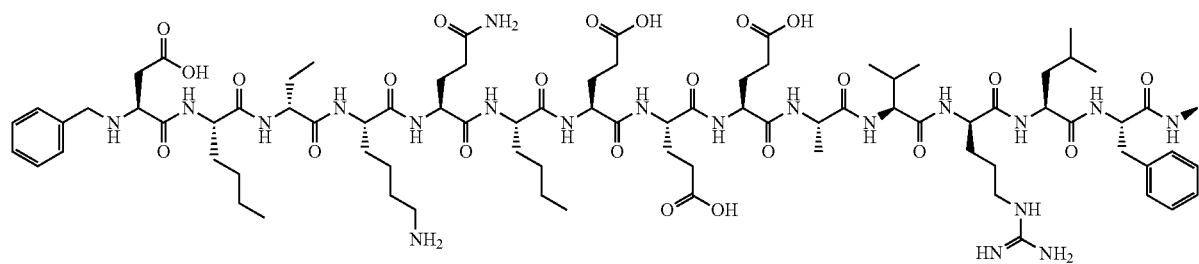
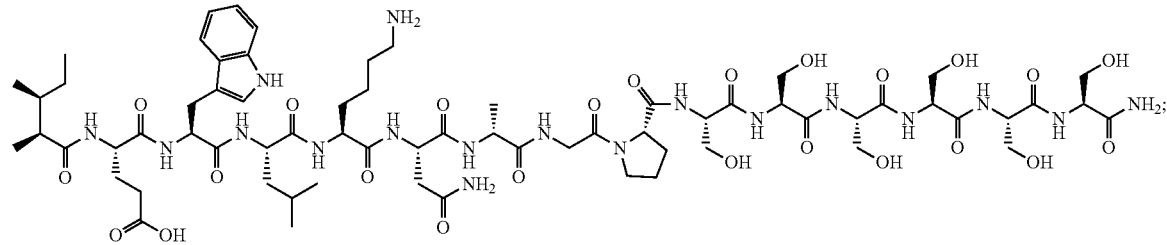
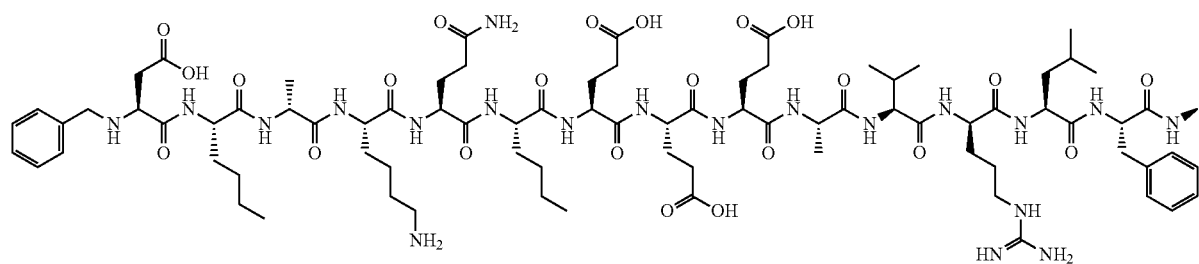
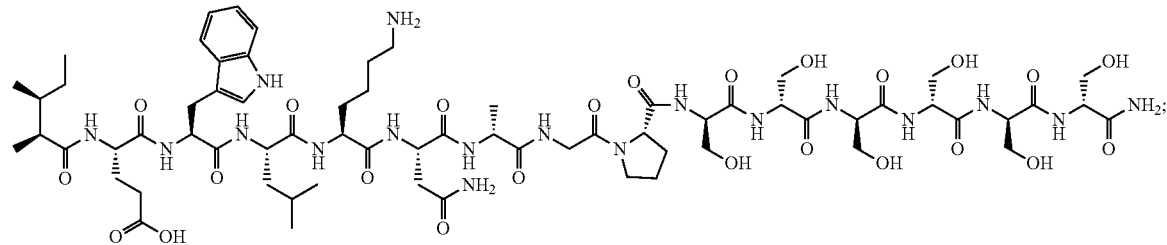

-continued
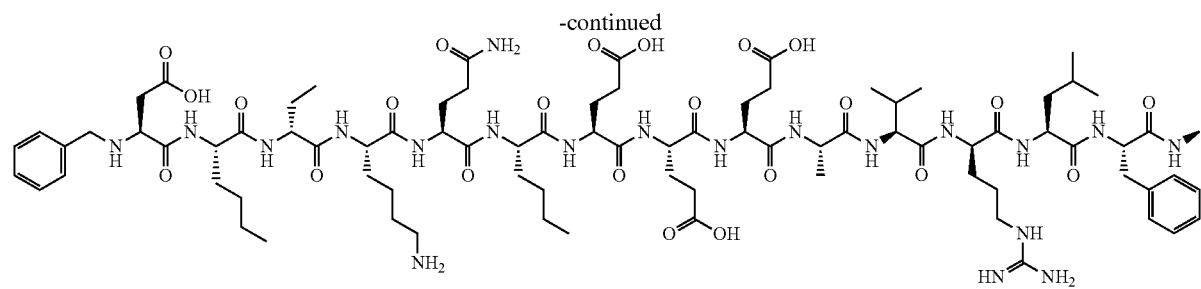
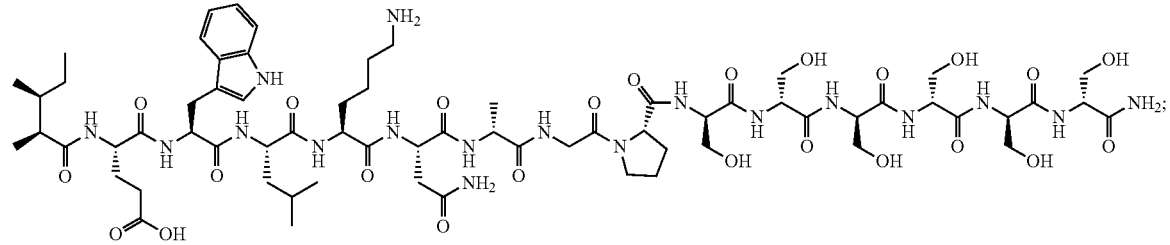
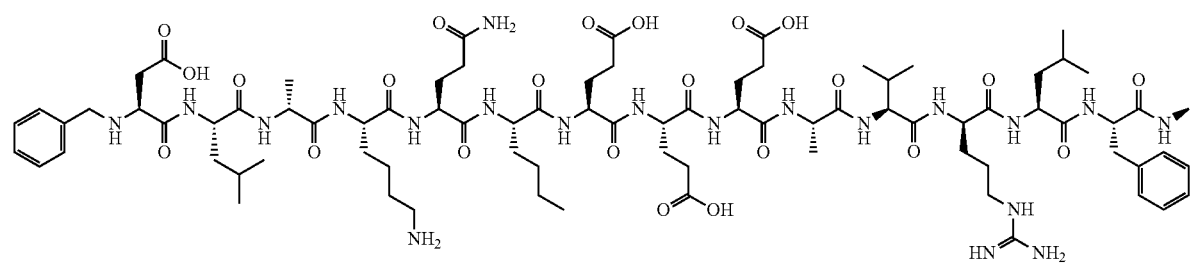
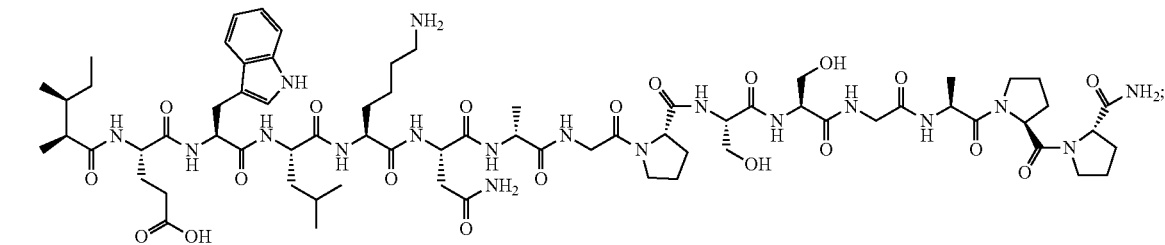
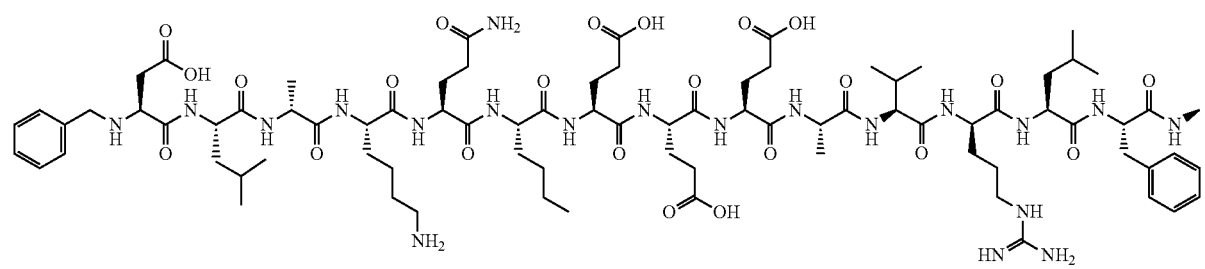
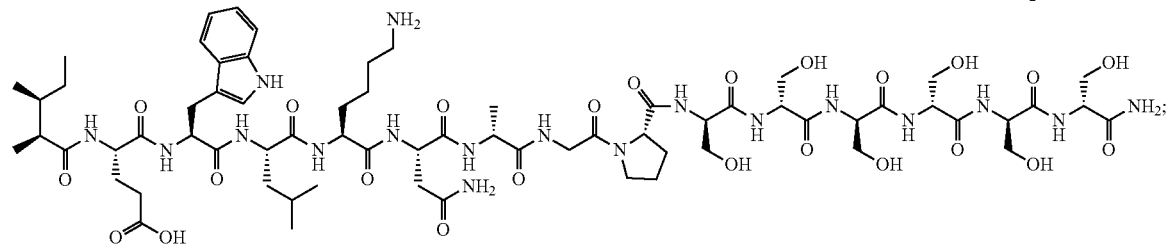

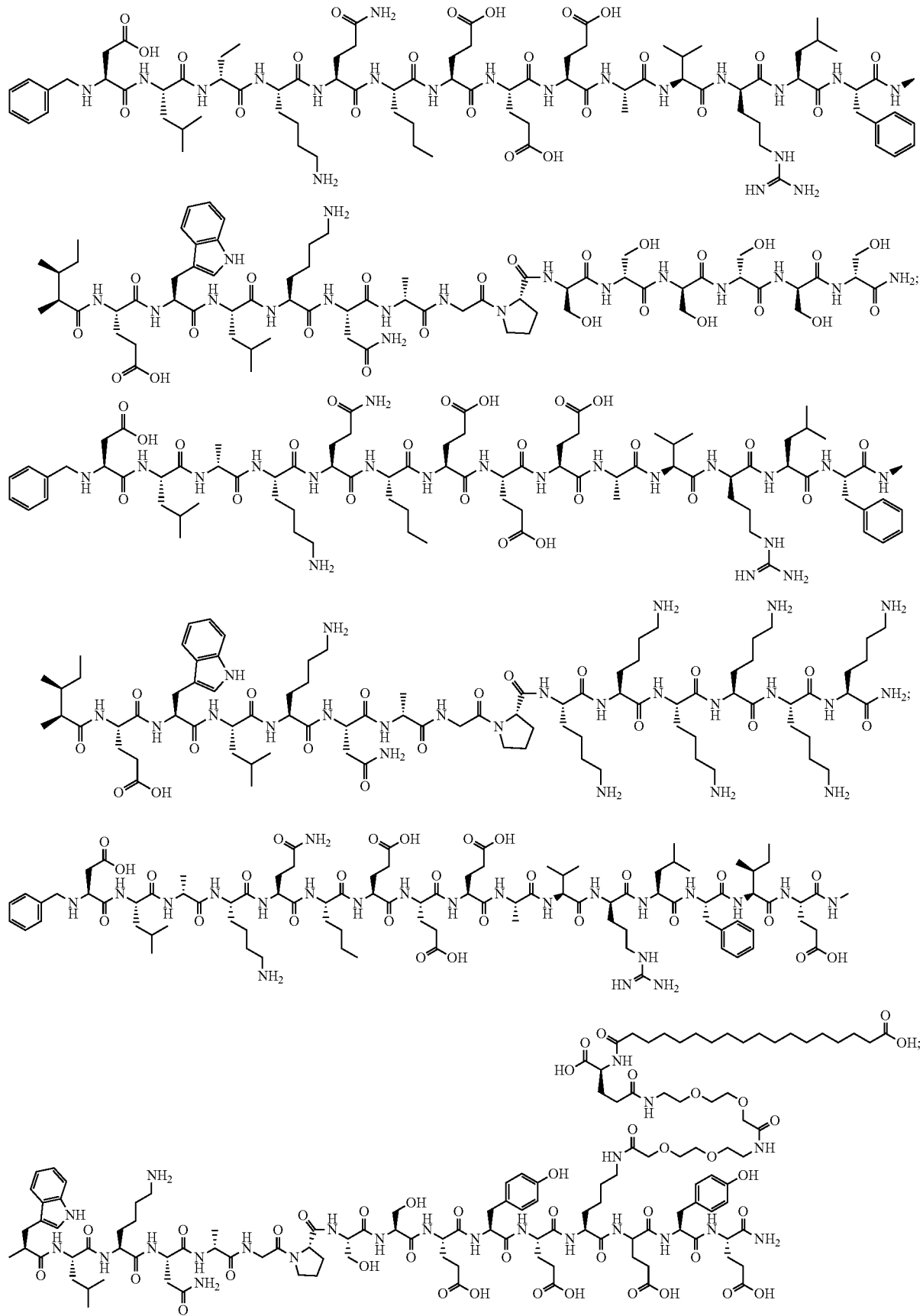

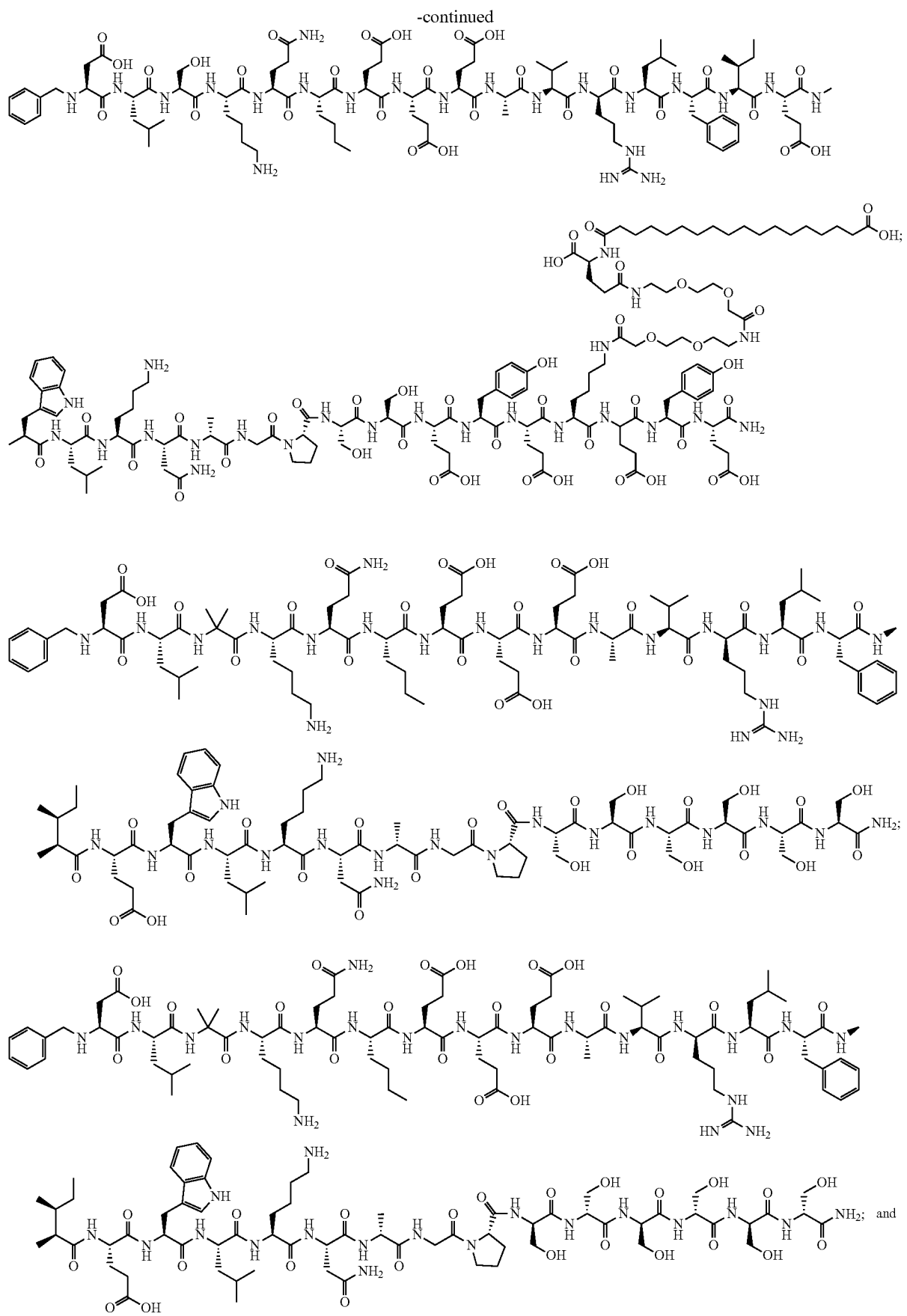

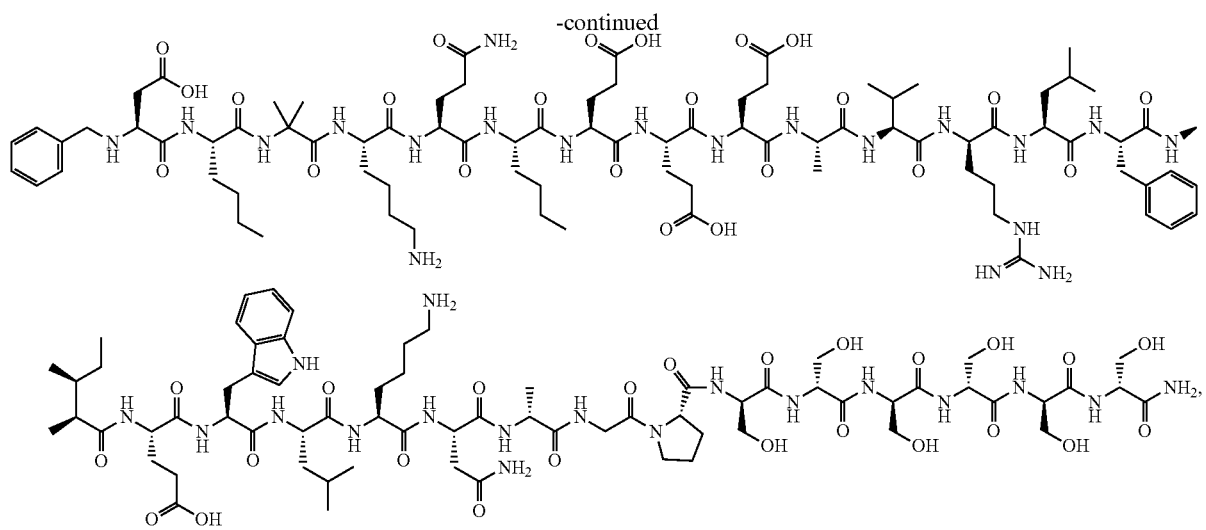
or a tautomeric or stereochemically isomeric form thereof,
or a prodrug, salt, or zwitterion thereof.
16. The compound according to claim 1, which is selected from the group consisting of:
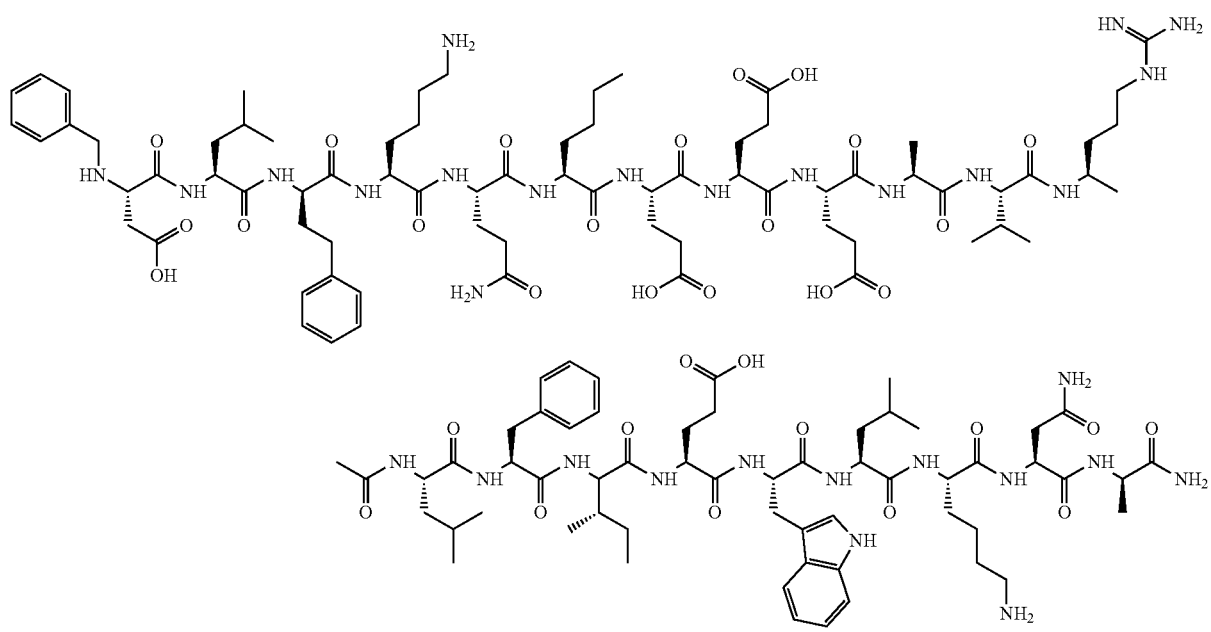
Example 24
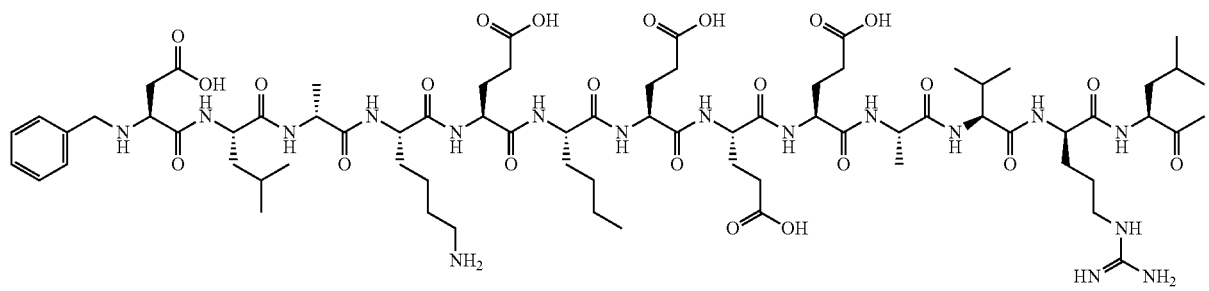
Example 34

-continued
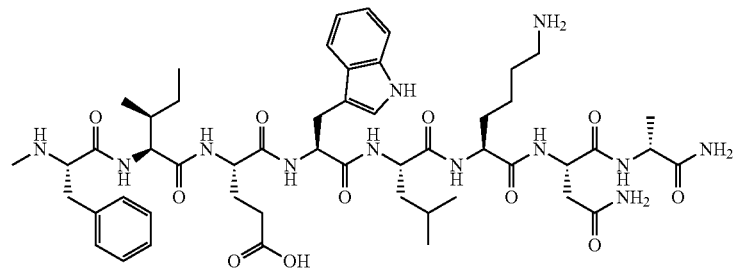
Example 38
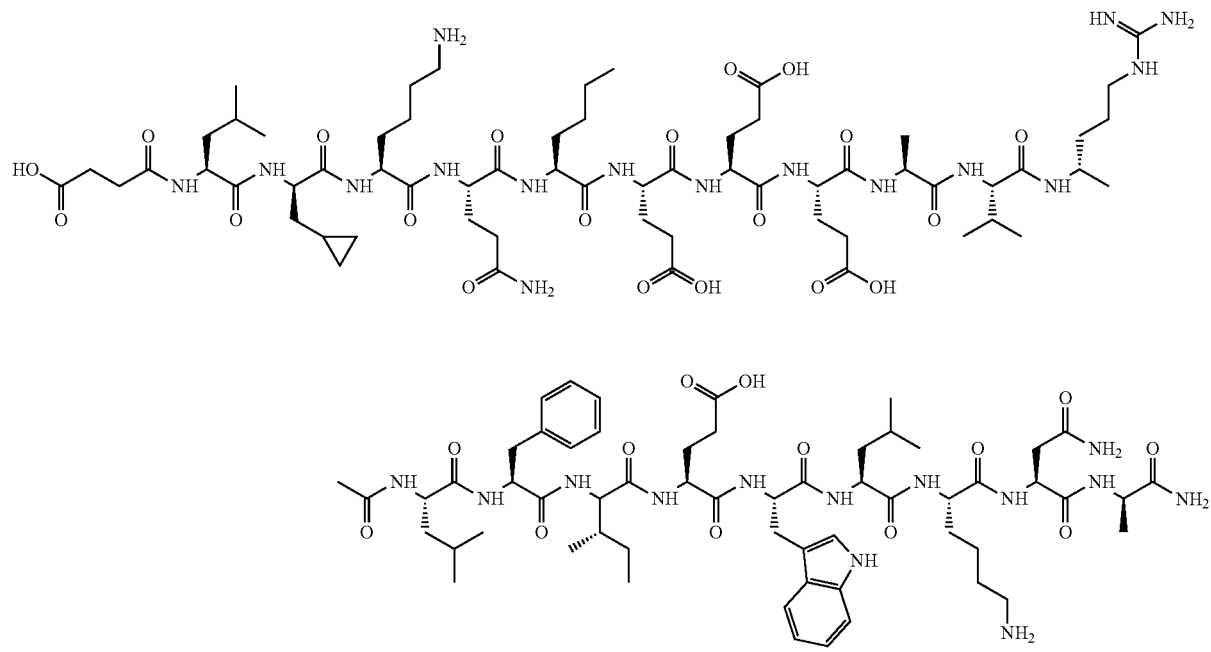
Example 44
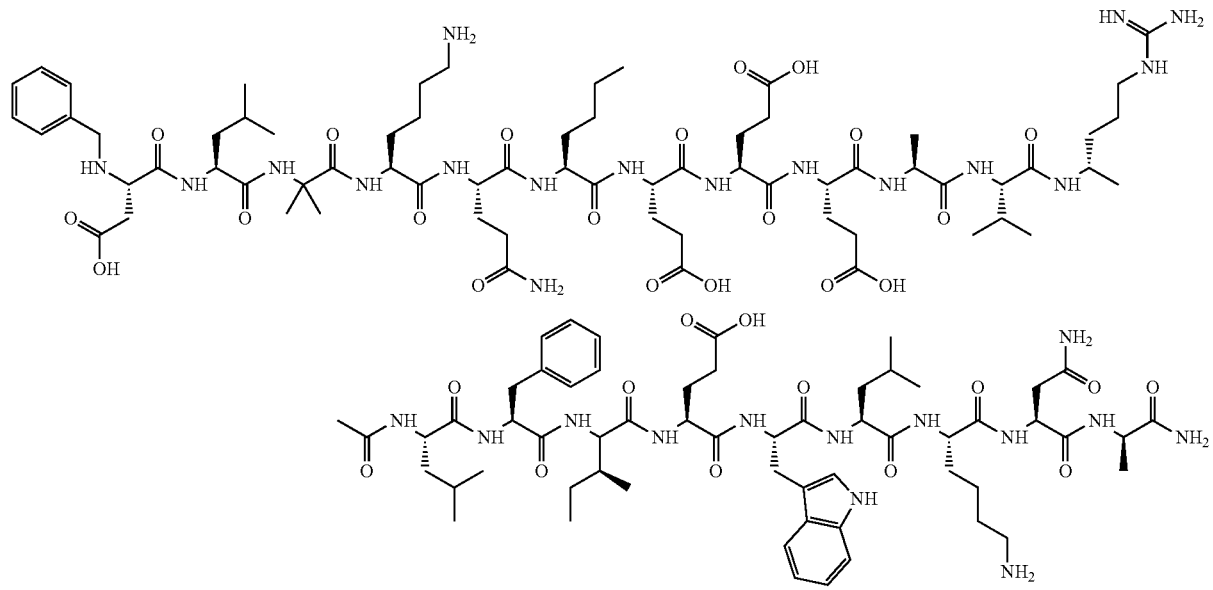

-continued
Example 53
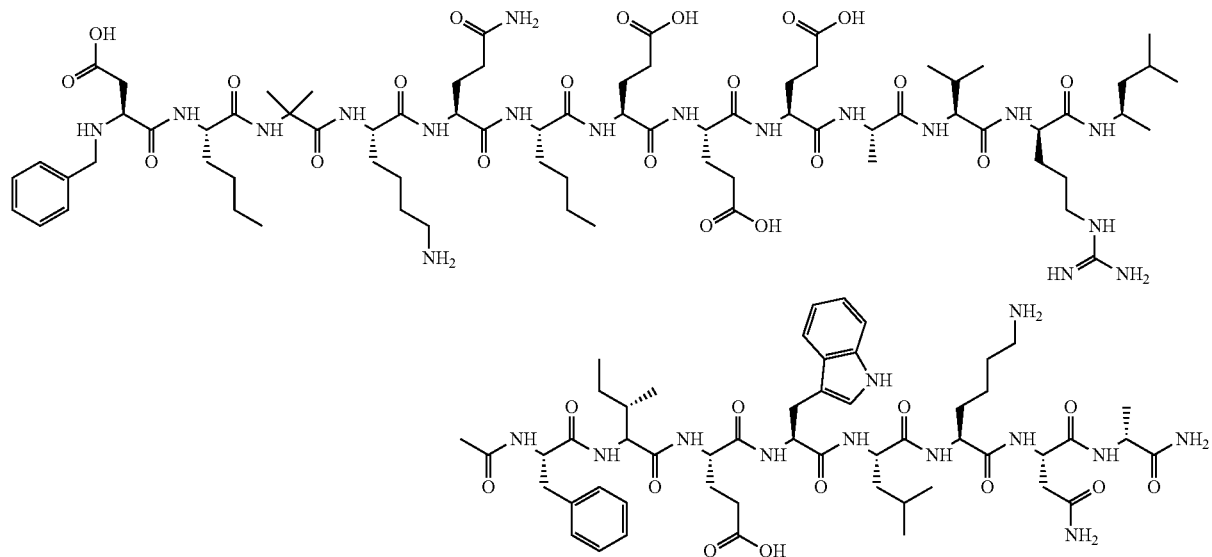
Example 63
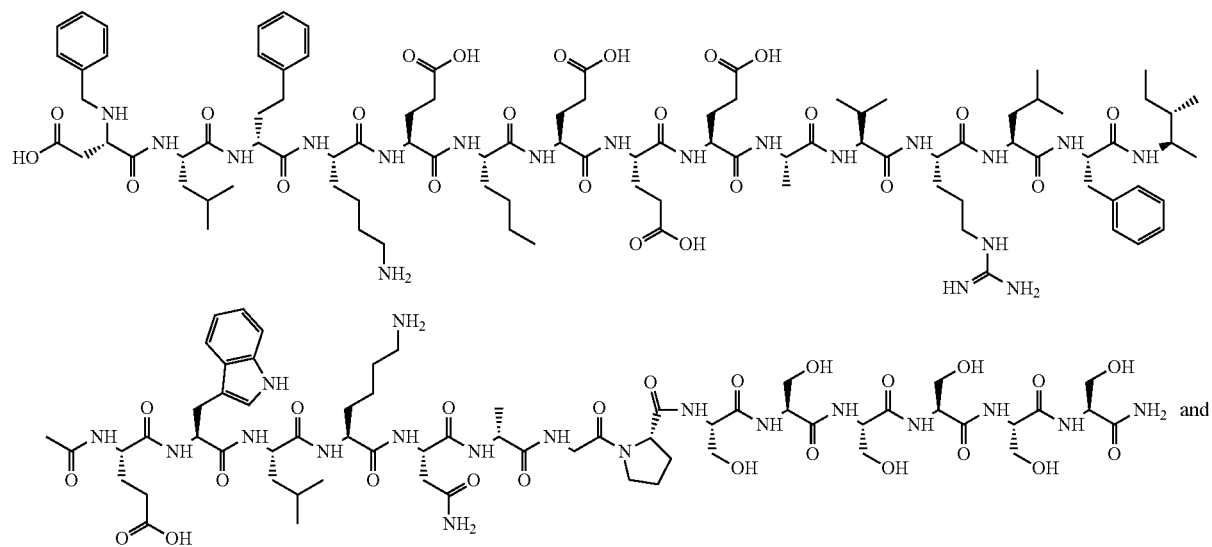
Example 85
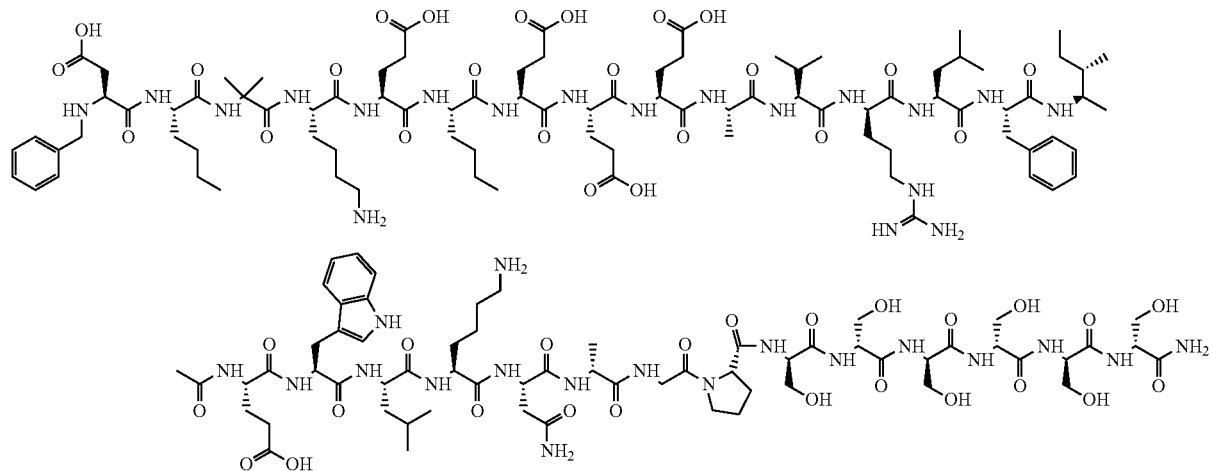
and or a tautomeric or stereochemically isomeric form thereof,
or a prodrug, salt or zwitterion thereof.

17. A pharmaceutical composition comprising a compound as defined in claim 1 and a pharmaceutically acceptable excipient.

* * * * *